United States Patent
Szoke

(10) Patent No.: US 7,707,727 B1
(45) Date of Patent: May 4, 2010

(54) FOLIAGE TRIMMERS WITH ADJUSTABLE CURVATURE OF CUTTING SECTIONS

(76) Inventor: Anthony A. Szoke, 523 Cedar St., West Hempstead, NY (US) 11552

( * ) Notice: Subject to any disclaimer, the term of this patent is extended or adjusted under 35 U.S.C. 154(b) by 554 days.

(21) Appl. No.: 11/057,640

(22) Filed: Feb. 14, 2005

(51) Int. Cl.
*B26B 19/06* (2006.01)
*B26B 19/00* (2006.01)

(52) U.S. Cl. ............................ 30/199; 30/197; 30/166.3

(58) Field of Classification Search ................. 30/144, 30/233, 216, 228, 382, 220, 223, 215, 208, 30/166.3, 211, 194, 196, 199, 381, 100, 378, 30/520, 387, 392–394; D8/8, 9; 56/233, 56/236, 234, 237, 289, 239, 12.7, 242, 400.21, 56/296, 240, 241; 83/746, 751, 613, 837, 83/747

See application file for complete search history.

(56) References Cited

U.S. PATENT DOCUMENTS

| | | | | | |
|---|---|---|---|---|---|
| 498,713 | A | * | 5/1893 | Gordon | 56/233 |
| 553,116 | A | * | 1/1896 | Gordon | 56/233 |
| 1,115,328 | A | * | 10/1914 | Murran | 30/223 |
| 1,507,460 | A | * | 9/1924 | Carroll | 37/302 |
| 1,607,784 | A | * | 11/1926 | Spangler | 37/302 |
| 2,081,318 | A | * | 5/1937 | Wright | 30/223 |
| 3,487,614 | A | | 1/1970 | Uhor | |
| 3,491,631 | A | * | 1/1970 | Skinner | 83/875 |
| 3,613,662 | A | * | 10/1971 | Chrysostomides | 600/568 |
| 3,646,675 | A | * | 3/1972 | Wezel | 30/217 |
| 3,692,073 | A | * | 9/1972 | Easterwood | 83/838 |
| 3,913,304 | A | | 10/1975 | Jodoin | |
| 3,999,295 | A | * | 12/1976 | Du Bois | 30/195 |
| 4,383,401 | A | * | 5/1983 | Lessard et al. | 56/236 |
| 4,574,481 | A | * | 3/1986 | Ericsson | 30/296.1 |
| 4,777,787 | A | * | 10/1988 | Warren | 56/235 |
| 4,782,592 | A | * | 11/1988 | Altamore | 30/195 |
| 4,970,791 | A | | 11/1990 | Vergara | |
| 5,050,373 | A | * | 9/1991 | Asatsuma | 56/17.6 |
| 5,659,958 | A | * | 8/1997 | Goings | 30/124 |
| 6,151,876 | A | * | 11/2000 | Van Der Burg | 56/234 |
| 6,516,522 | B2 | * | 2/2003 | Schneider | 30/298 |
| 6,964,151 | B2 | * | 11/2005 | Ezendam et al. | 56/235 |
| 6,988,433 | B2 | * | 1/2006 | LeClair | 81/487 |
| 2004/0103631 | A1 | | 6/2004 | Ezendam et al. | |
| 2008/0172892 | A1 | * | 7/2008 | Henrickson | 30/392 |

FOREIGN PATENT DOCUMENTS

| | | | |
|---|---|---|---|
| BE | 1014974 | * | 7/2004 |
| JP | 2005-261275 | * | 3/2004 |
| SU | 1664159 | * | 7/1991 |

* cited by examiner

*Primary Examiner*—Boyer D. Ashley
*Assistant Examiner*—Laura M. Lee

(57) ABSTRACT

The invention comprises of a trimmer body with pivotally mounted handle mechanism attached to a flexible curvature adjuster band going through a plurality of cutting units articulately arranged side by side with a flexible scissor type mechanism attached to every cutting unit and trimmer body to maintain equidistant spacing between cutting units and to prevent the formation of an uneven curvature. The curvature of the cutting section is adjusted with the release of the restraining mechanism with the thumb of one hand and the pivotal movement of the front handle mechanism with the other hand. The one hand operated foliage trimmer's cutting blades are arcually reciprocated by electromagnets. The elongated foliage trimmer's head body and cutting section's hemispherical spatial orientation is adjustable and restrainable with the rear handle mechanism.

11 Claims, 38 Drawing Sheets

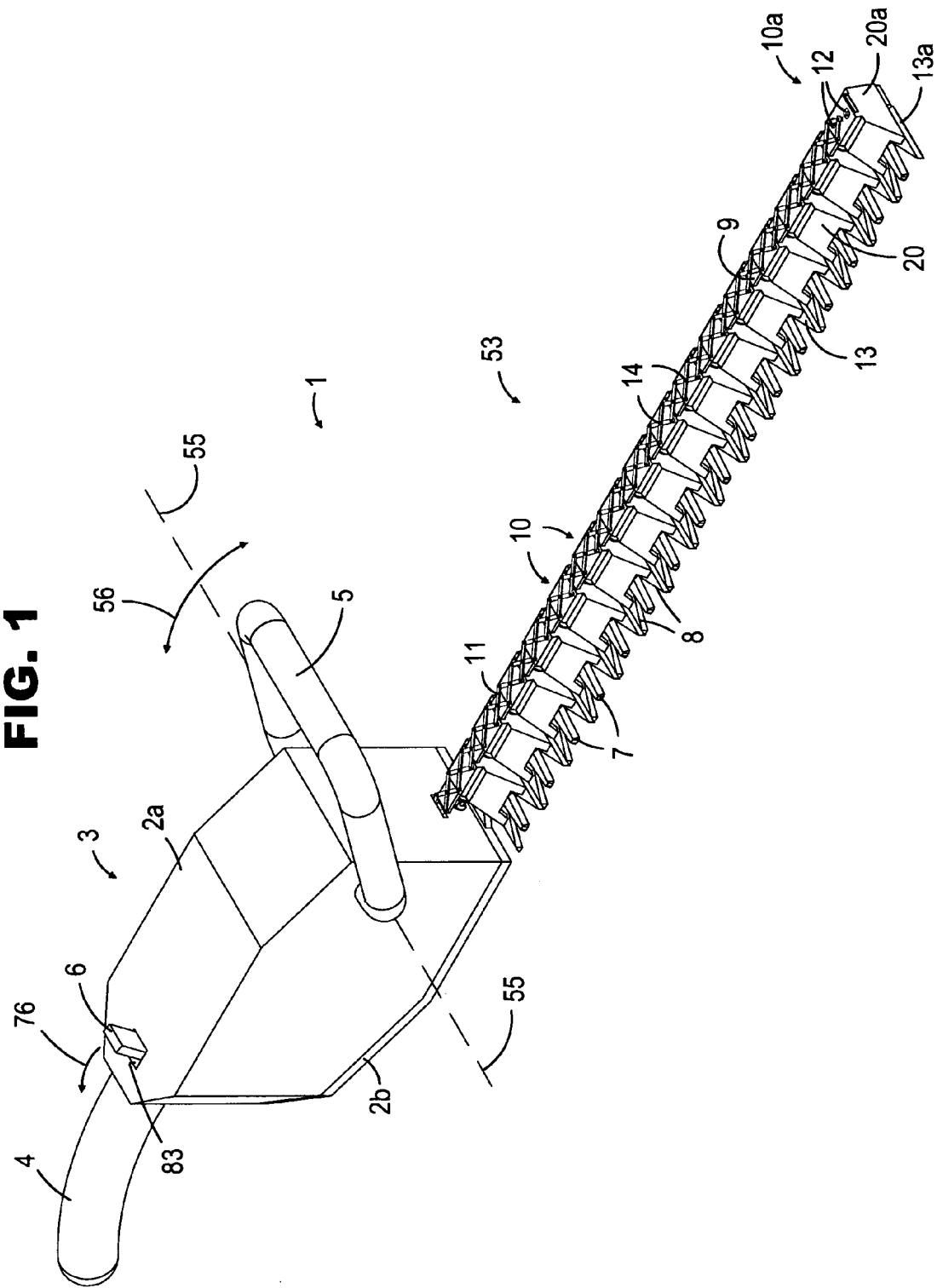

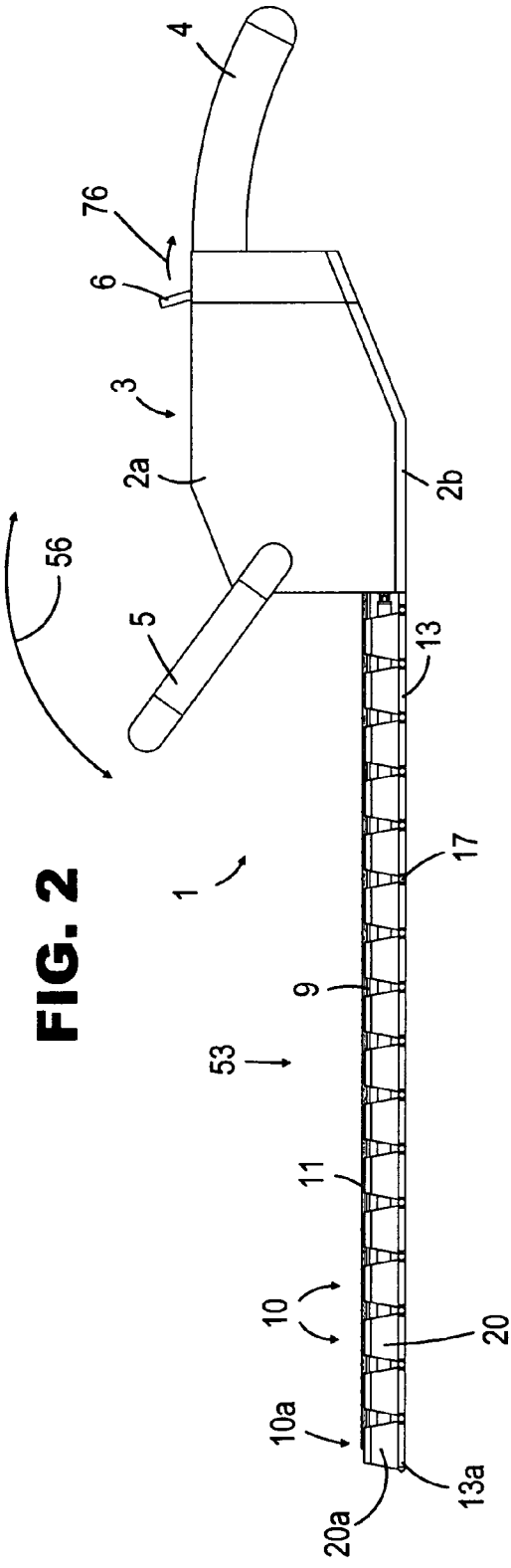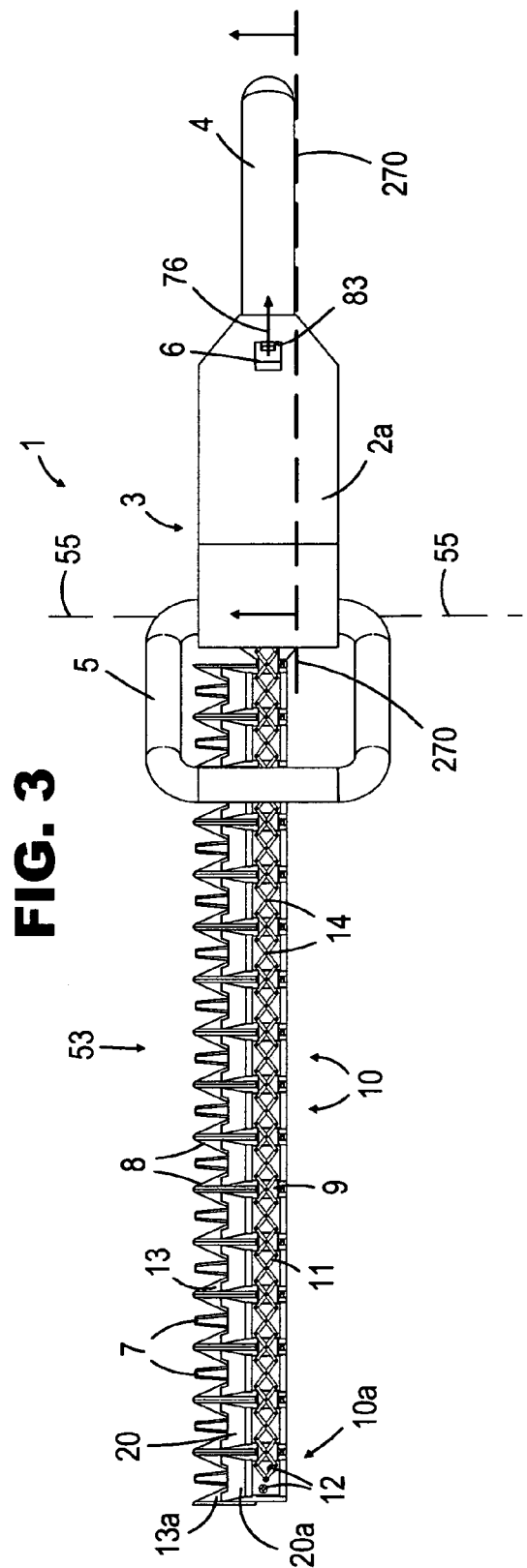

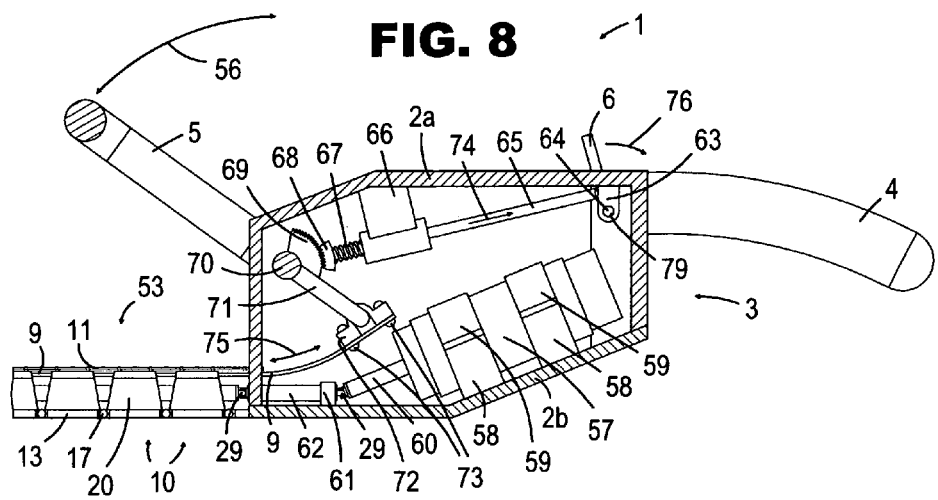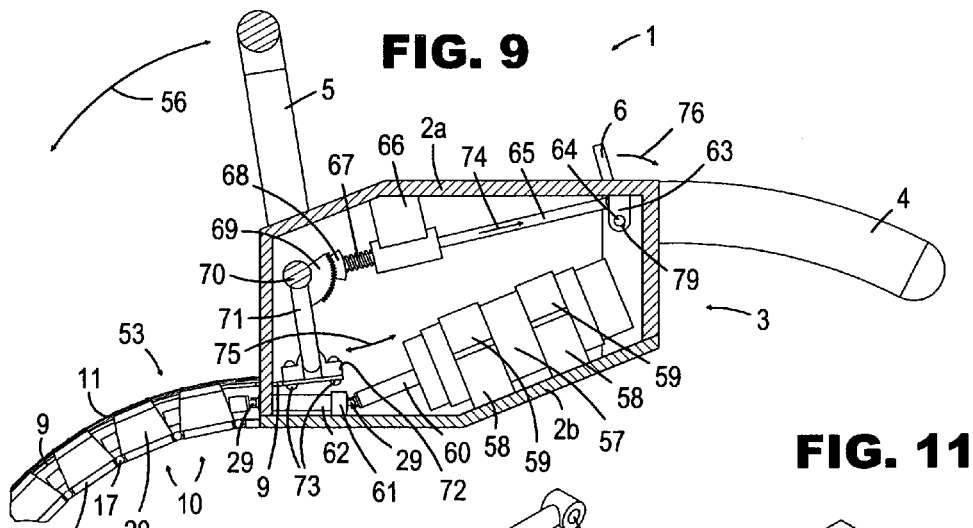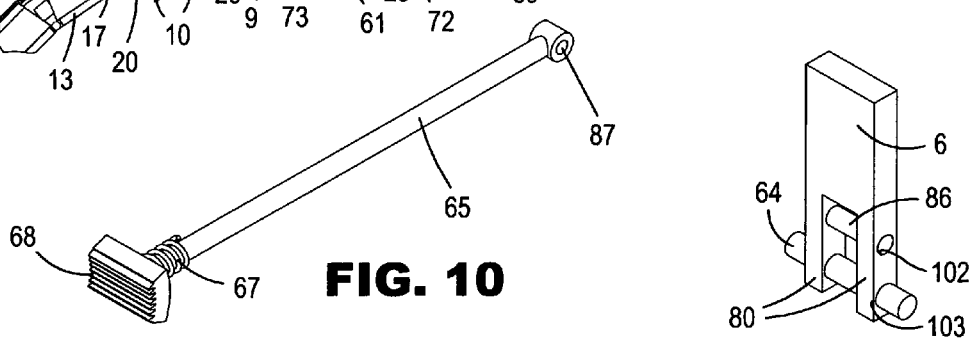

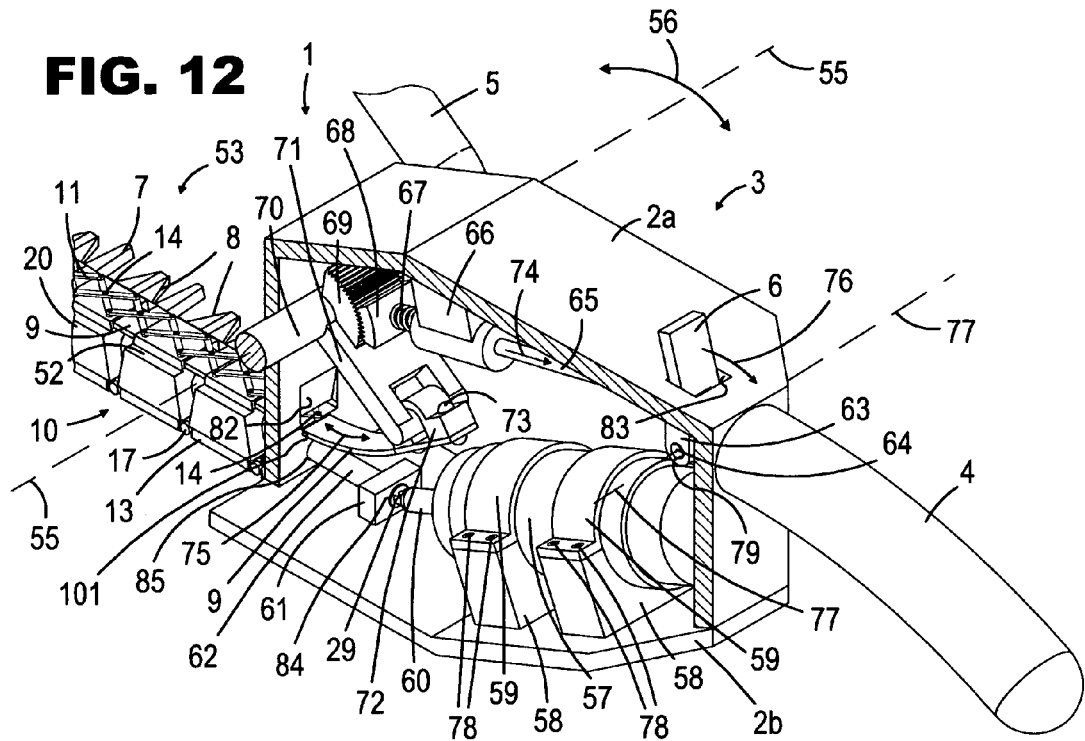
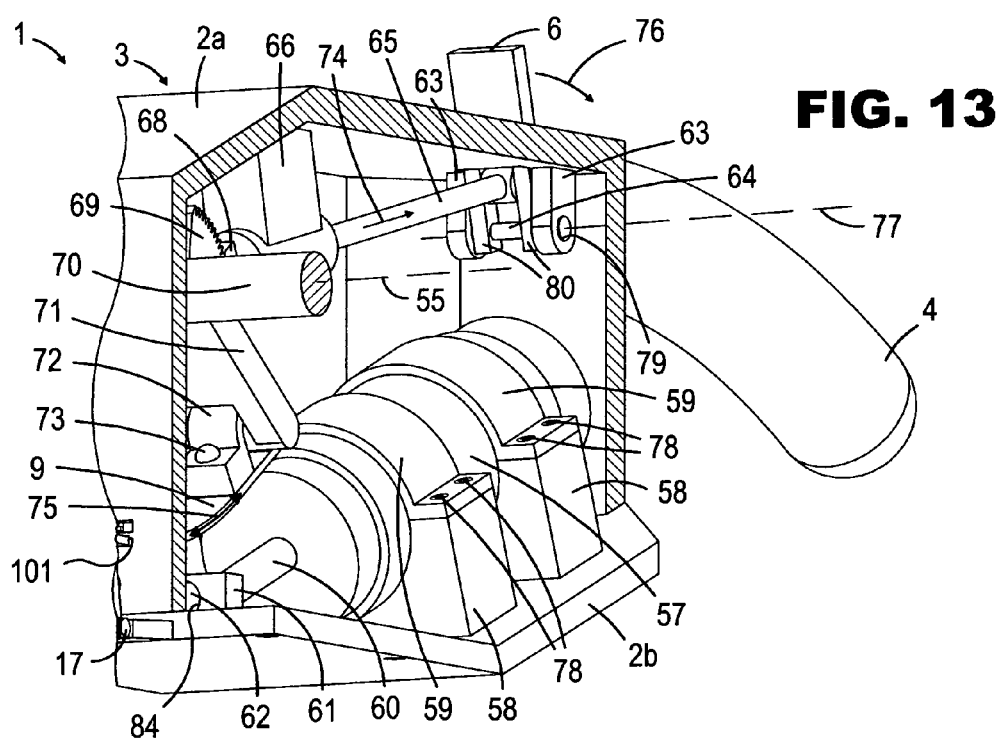

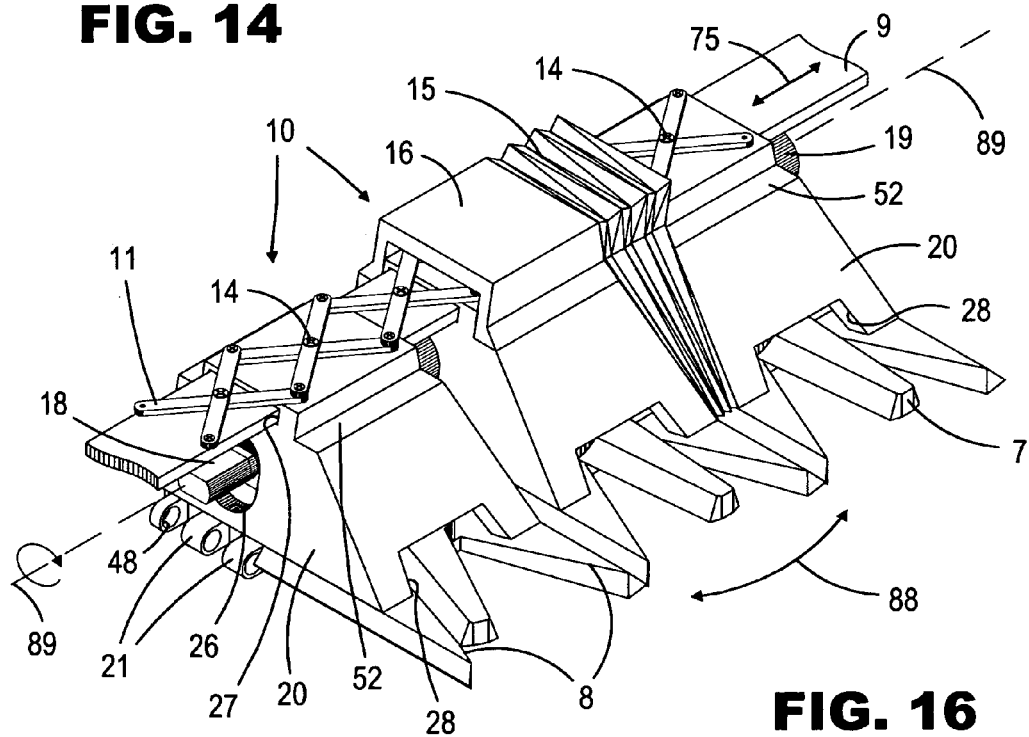
FIG. 14
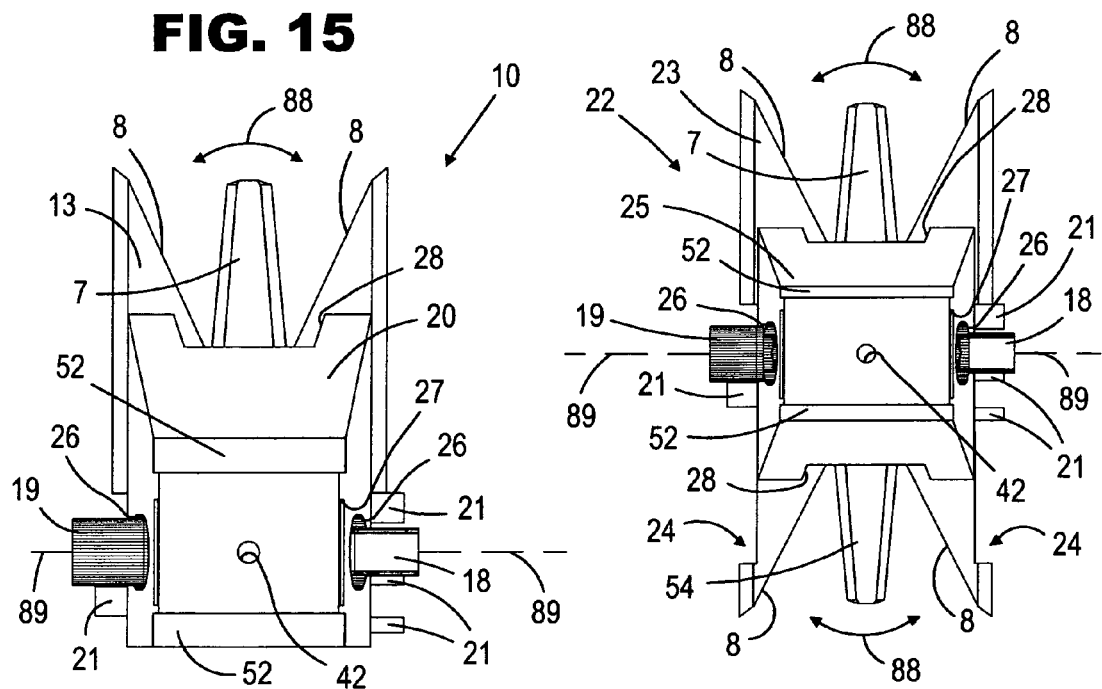
FIG. 15
FIG. 16

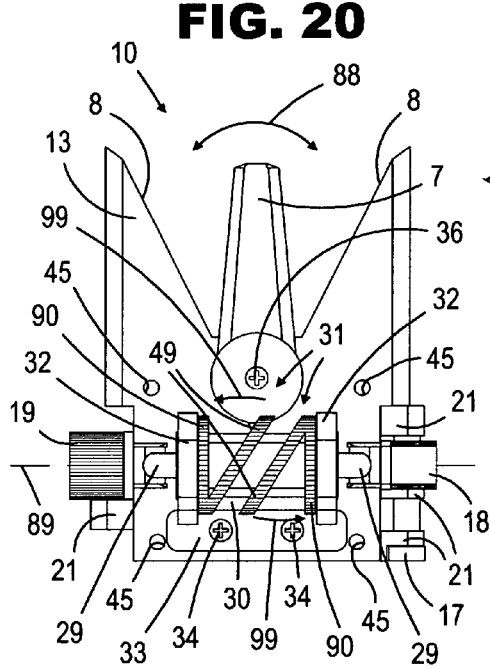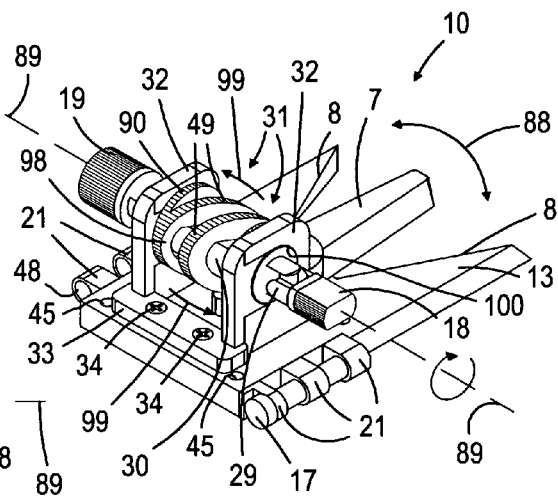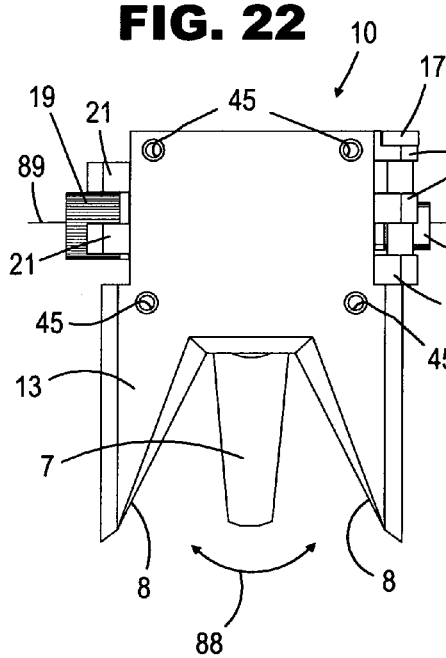

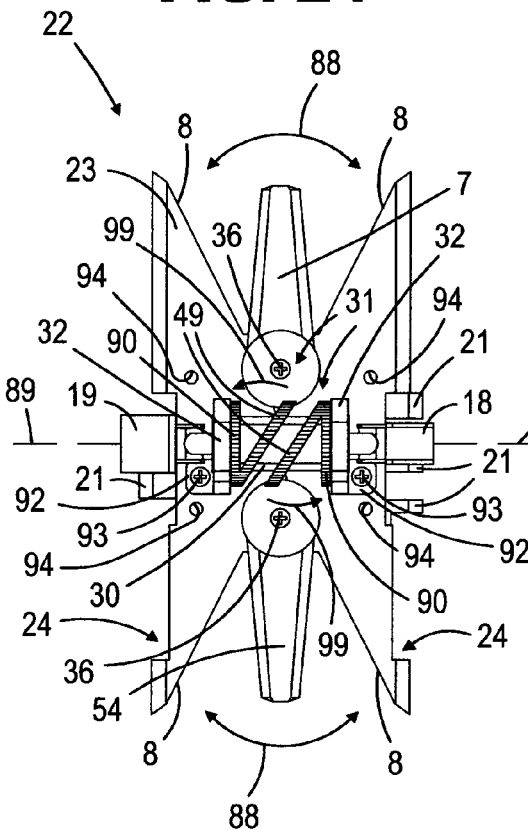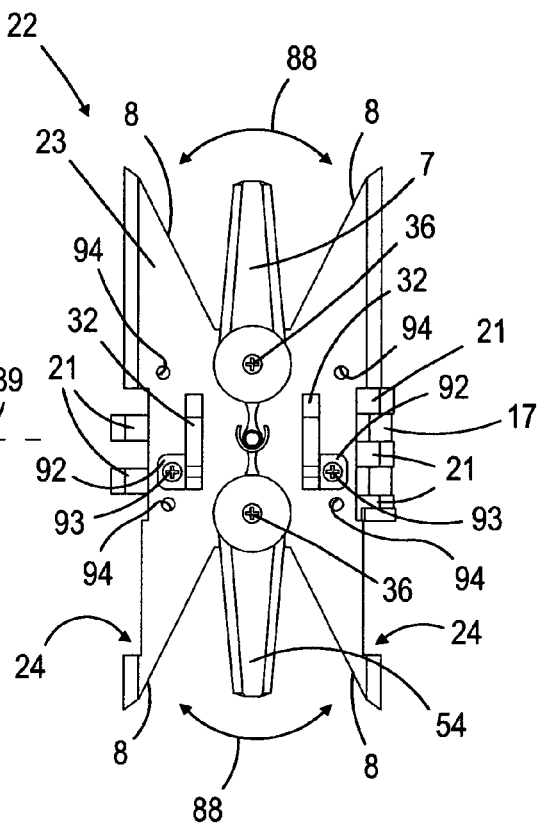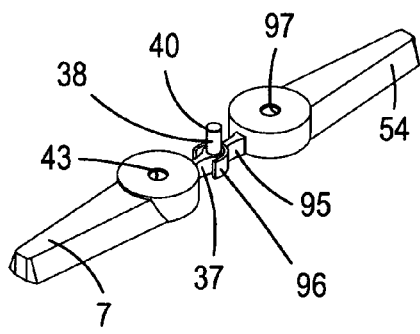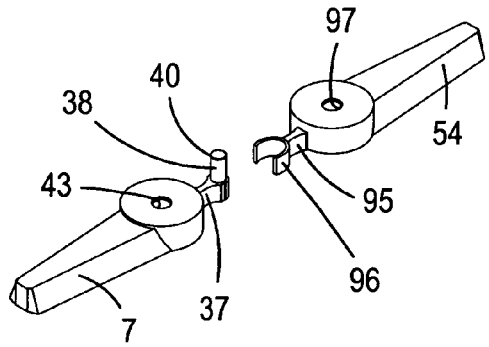

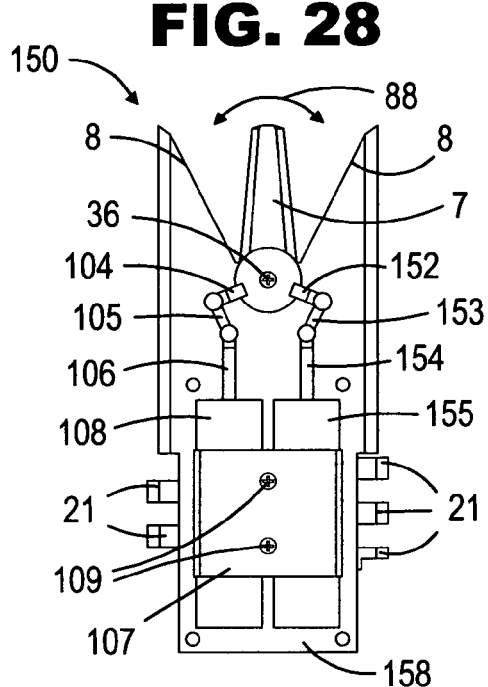
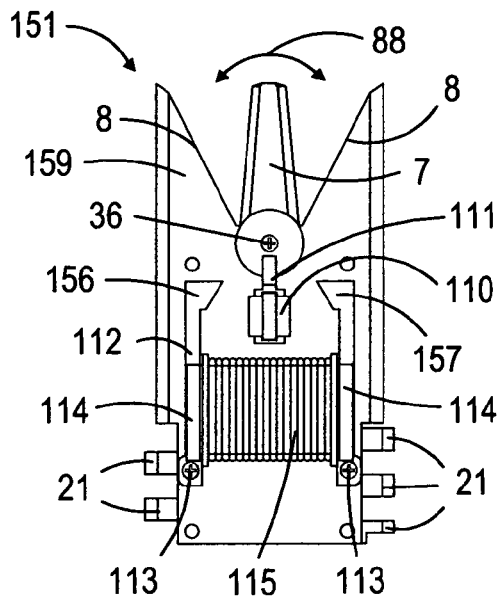
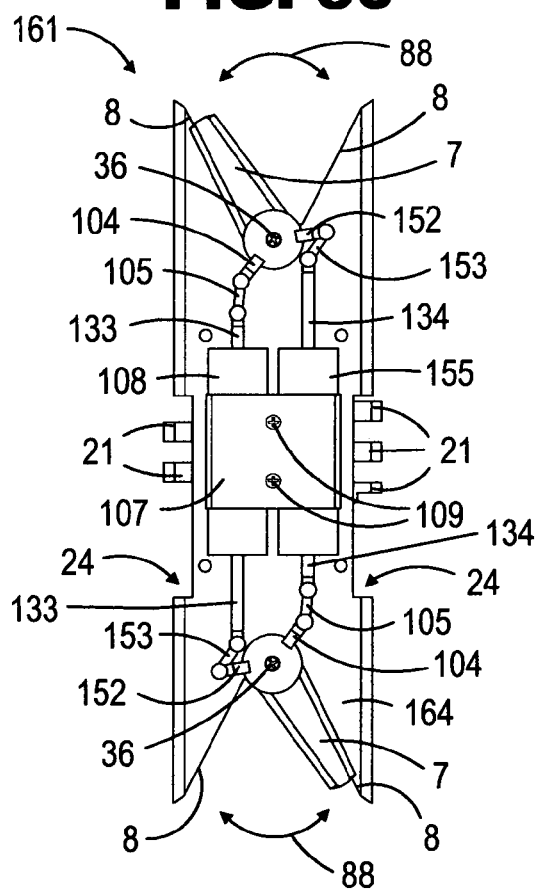
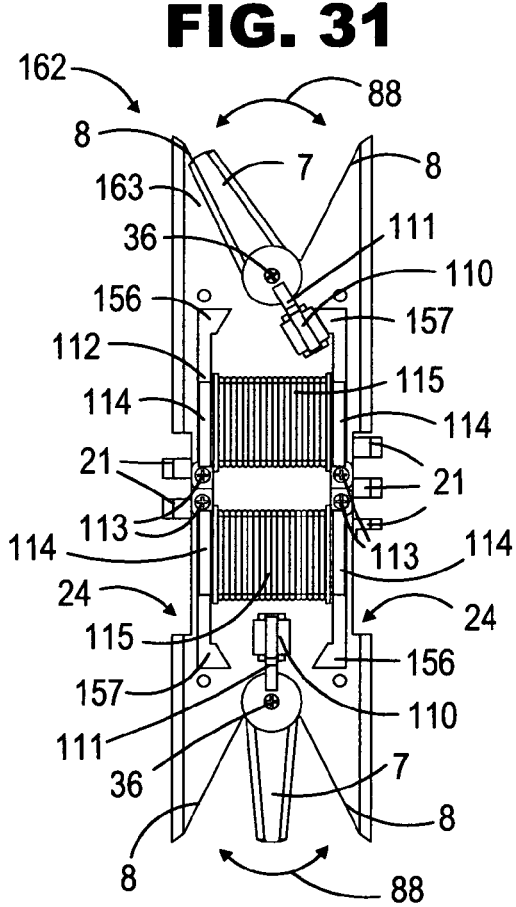

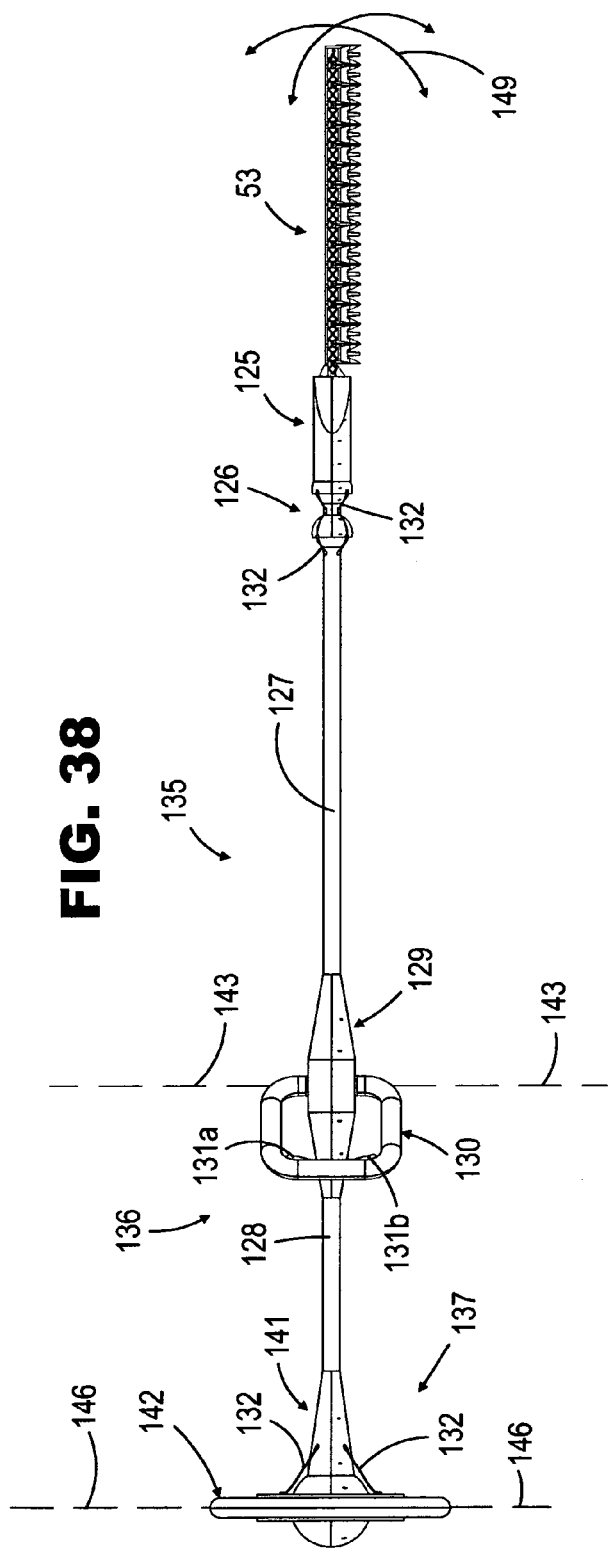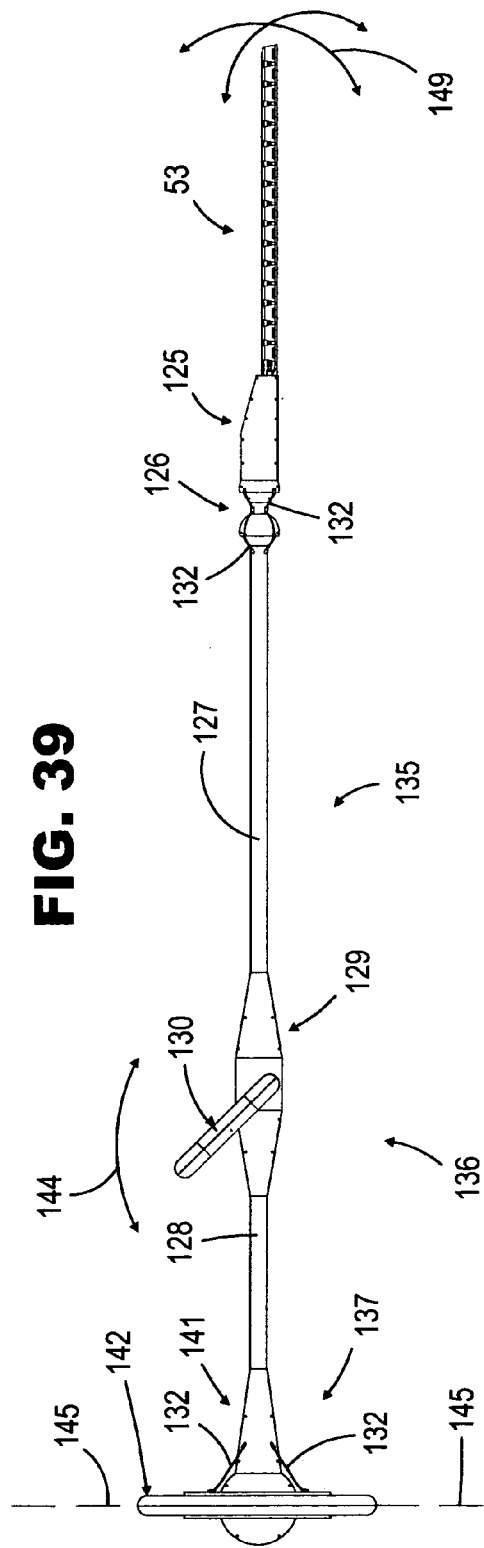

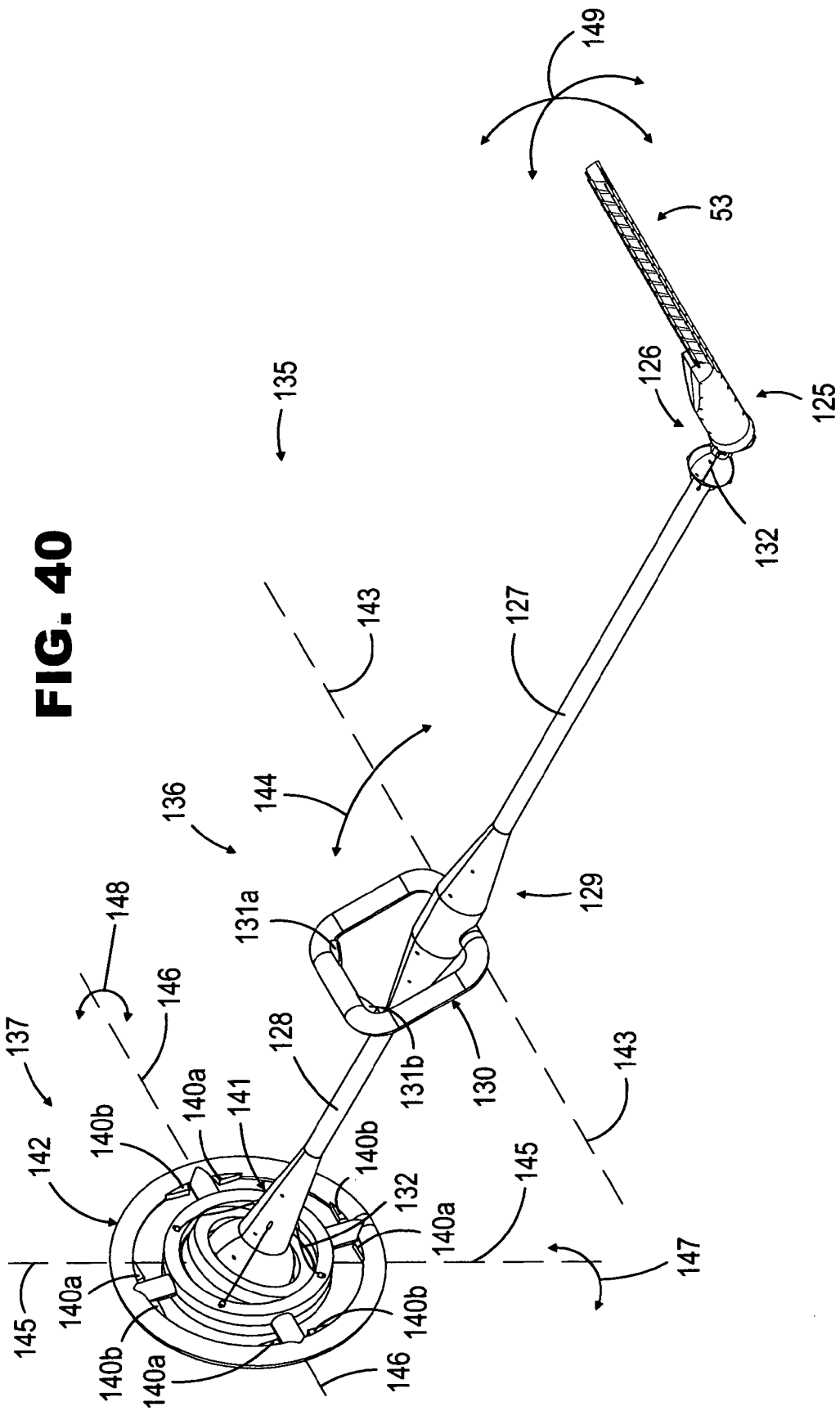

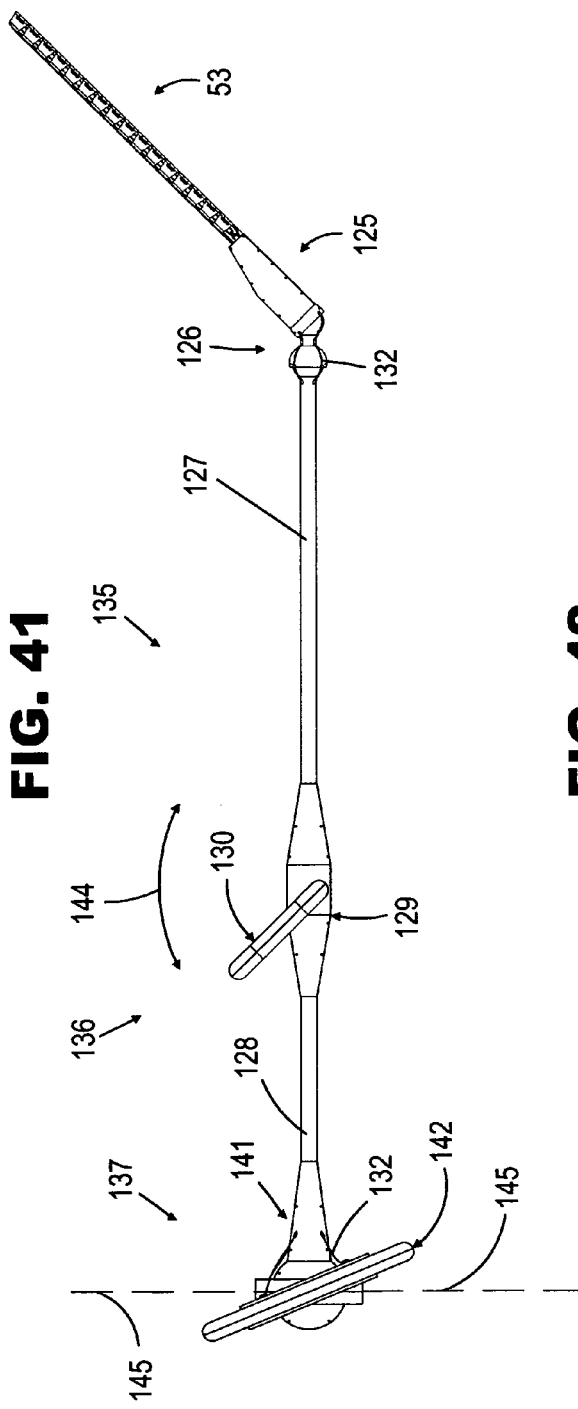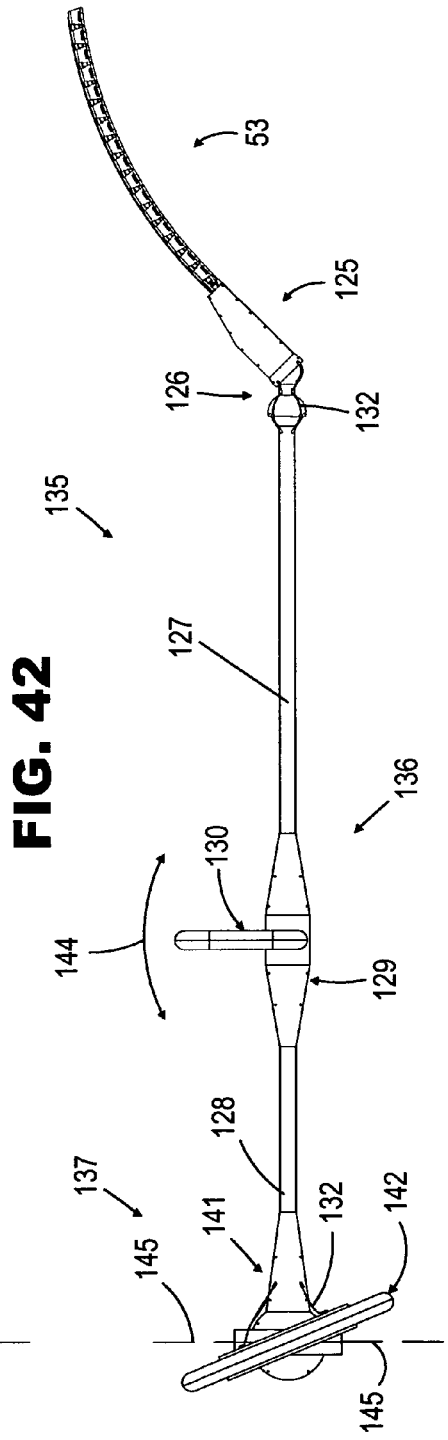

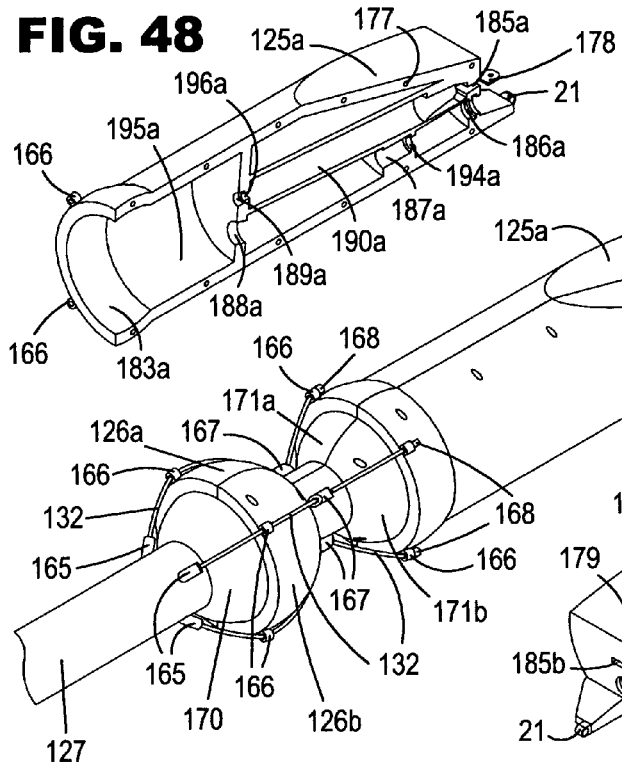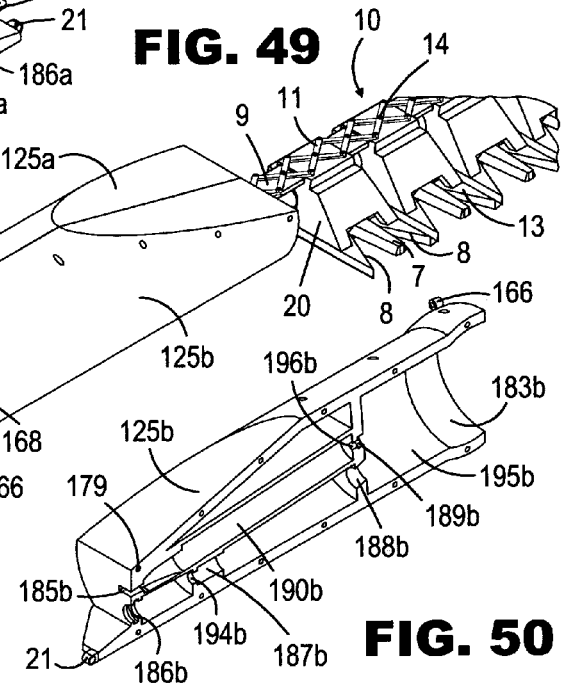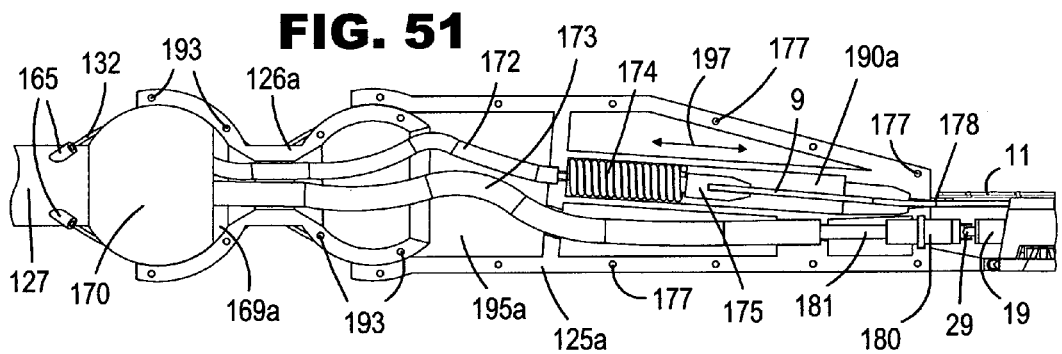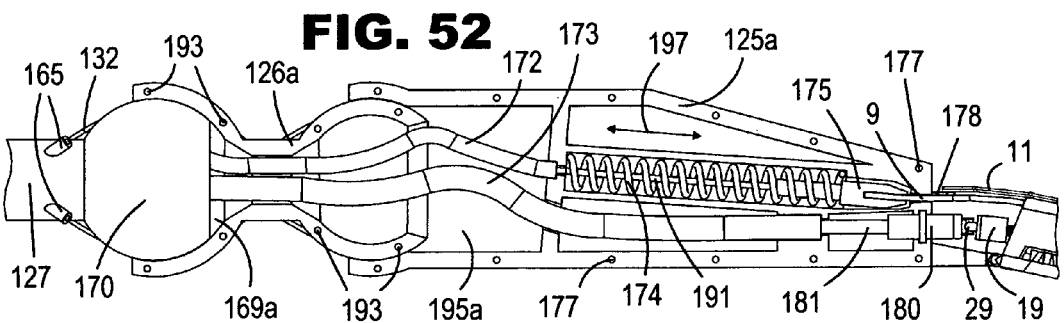

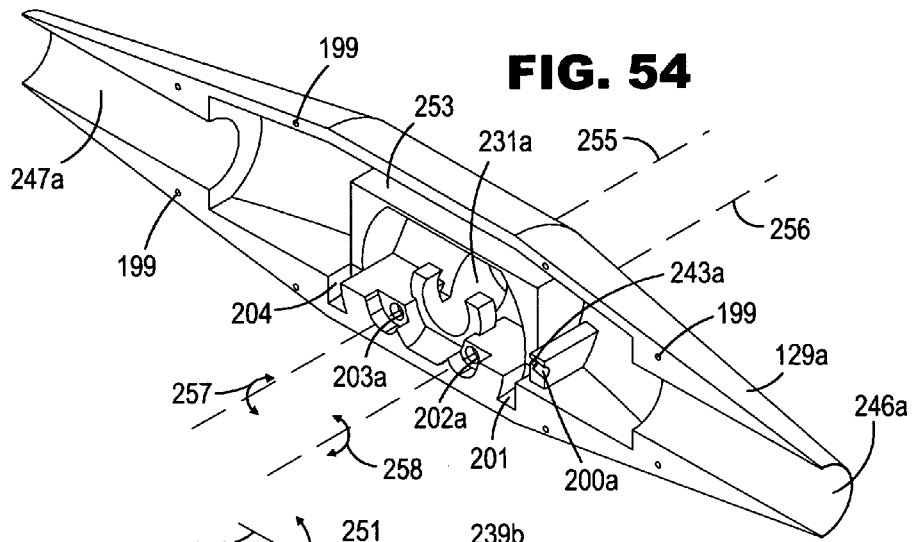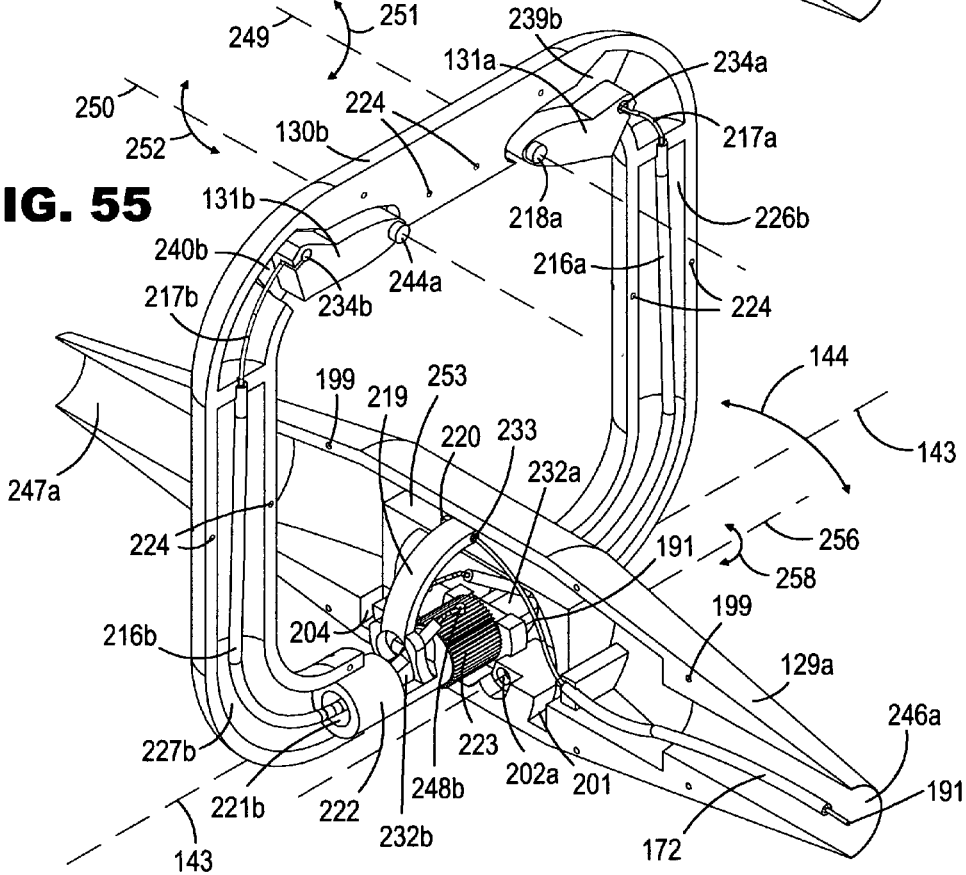

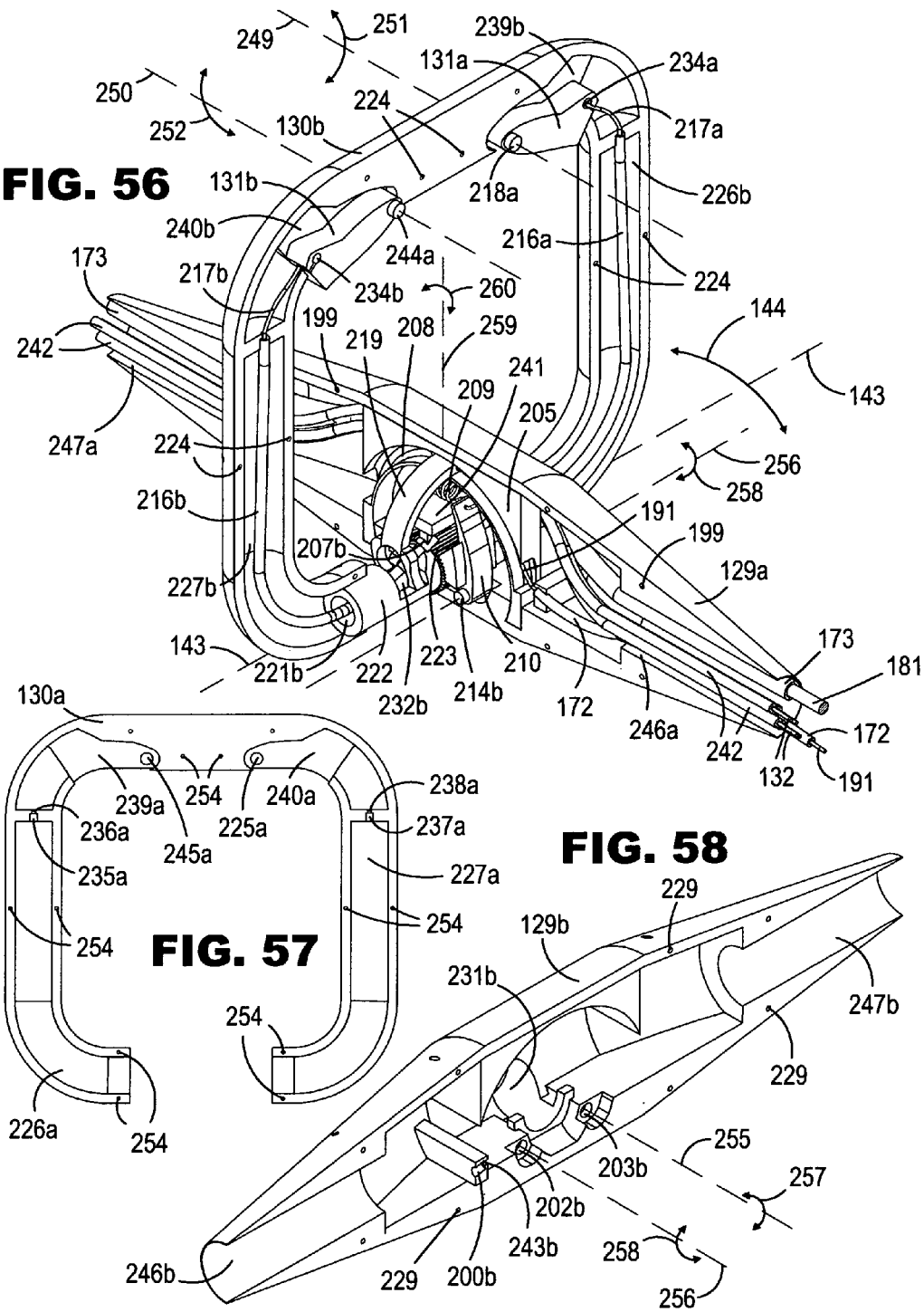

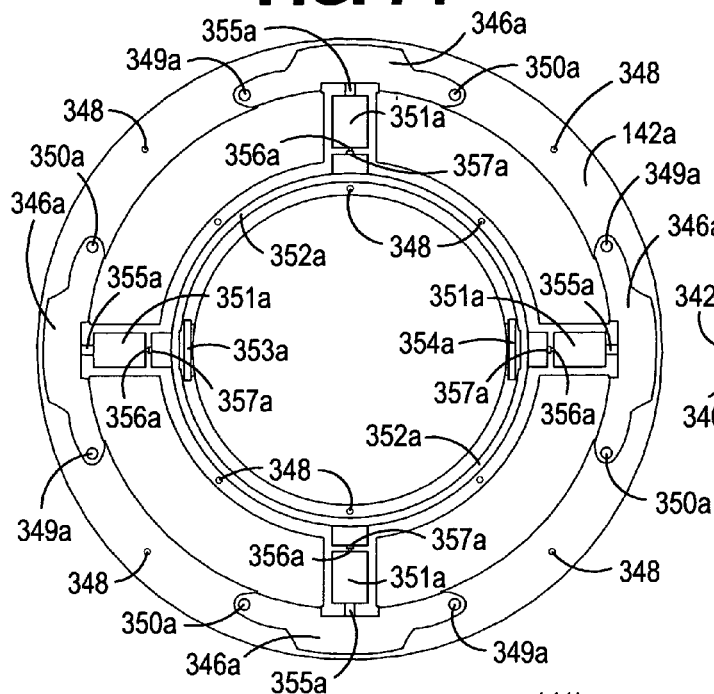
FIG. 74
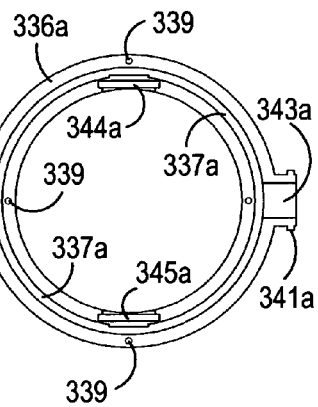
FIG. 75
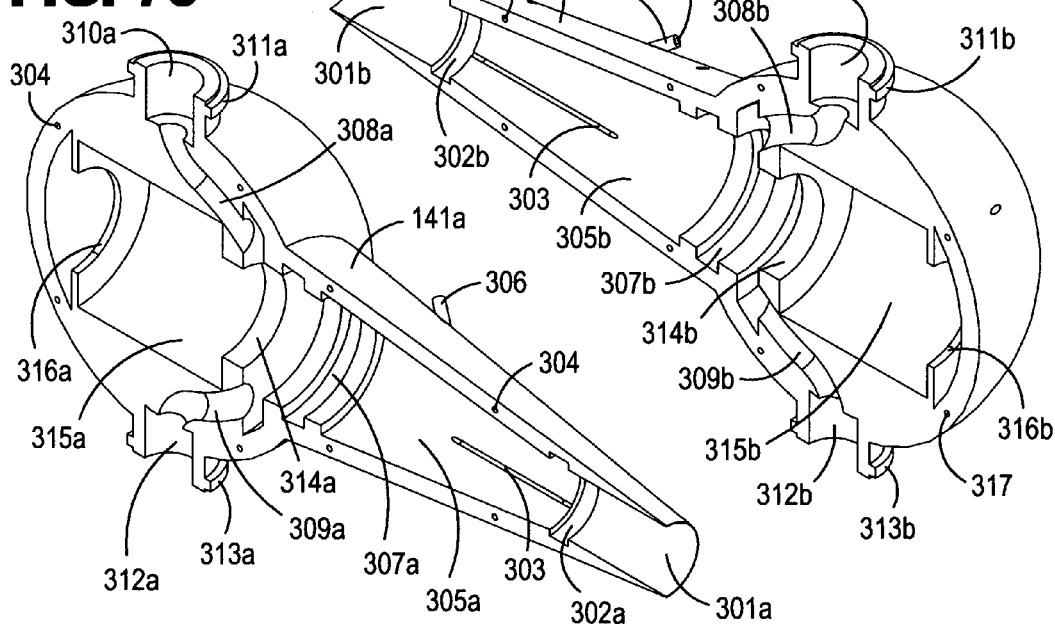
FIG. 76
FIG. 77

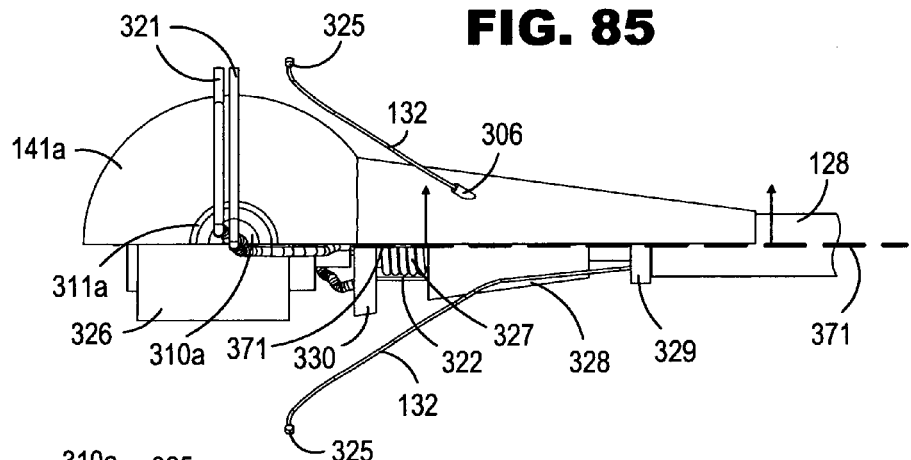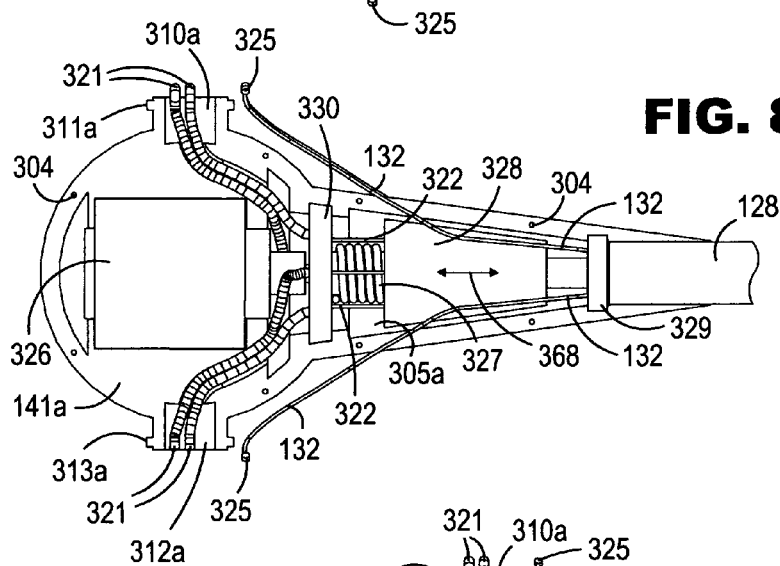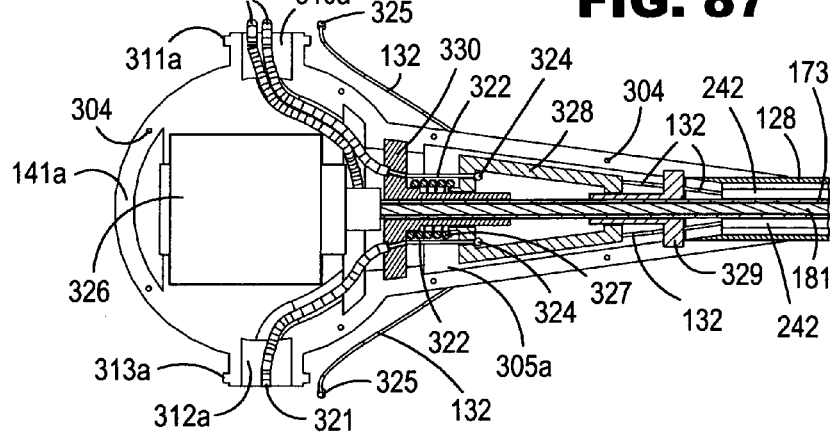

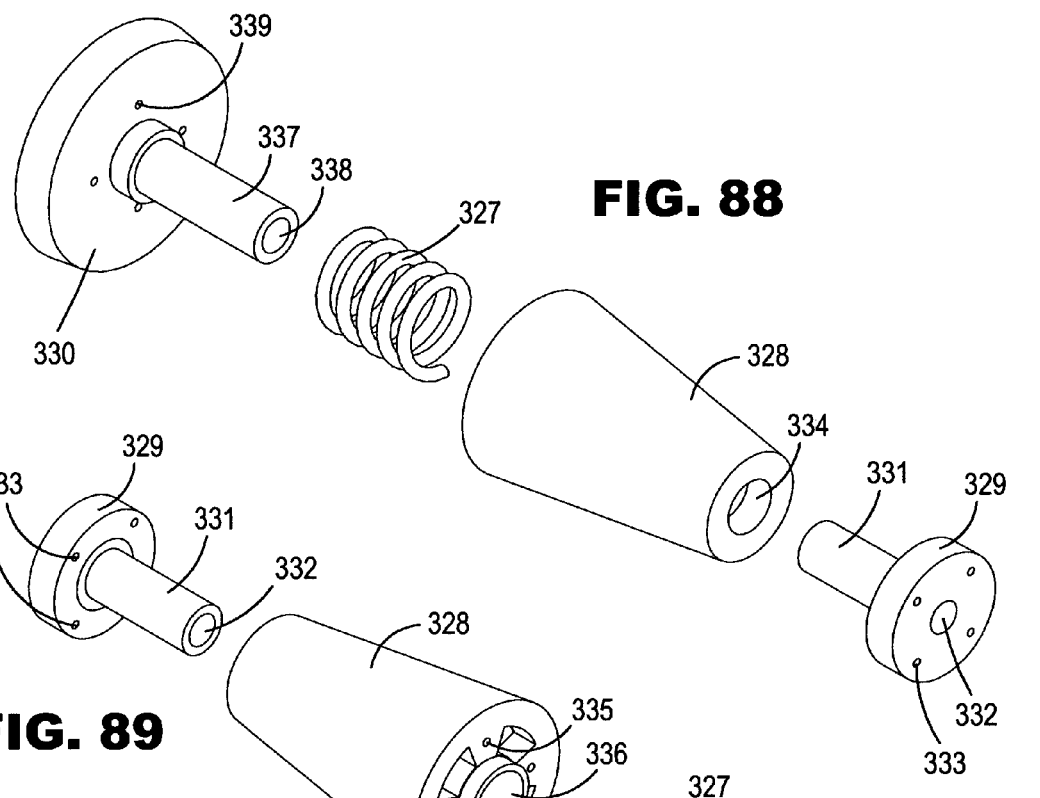
FIG. 88
FIG. 89
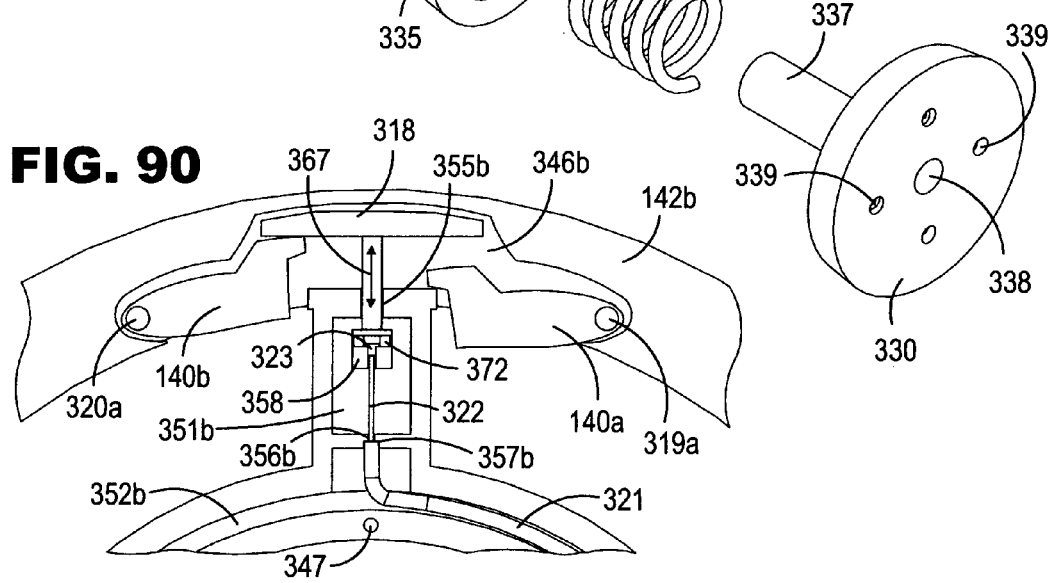
FIG. 90

FOLIAGE TRIMMERS WITH ADJUSTABLE CURVATURE OF CUTTING SECTIONS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to foliage trimmers designed for cutting the leaves and branches of asymmetrically convex plants, bushes, shrubs, hedges and the like. Trimming asymmetrically convex shrubs, or the like, manually to a desired shape is very arduous and time consuming operation.

There have been attempts in the past to invent a device to cut convex shapes. Examples of such foliage trimming devices are shown in U.S. Pat. No. 3,487,614, invented by E. Uhor; and U.S. Pat. No. 3,913,304, invented by Paul Jodoin; and U.S. Pat. No. 4,970,791, invented by Florentino S. Vergara; and U.S. Pat. No. 6,151,876, invented by William Van Der Burg; and U.S. Pat. Application No. US 2004/0103631 A1, invented by Jan Pontianus Ezendam and Nicodemus Assisius Ezendam. Unfortunately all these inventions are designed to cut symmetrically convex shapes, thus they are useless in everyday gardens that are made up of asymmetrically convex bushes and furthermore the gardens are not created to accommodate the machinery associated with these trimmers.

Therefore landscapers and others still use conventional linear trimmers that cut in a flat linear plane to trim asymmetrically convex shrubs and the like. Conventional linear foliage trimmers comprise of two straight flat blades situated in facial engagement, with overlapped teeth protruding along their registering edges. A motor means is arranged at one end of the blade assembly to move one of the blades reciprocally or both blades counter reciprocally so the registering teeth slide across one another to cut the foliage projecting through the spaces between the teeth.

In order to cut asymmetrically convex shapes, it is necessary to periodically adjust the angle between the conventional linear trimmer blade assembly and the foliage surface. And multiple passes have to be made to create an asymmetrically convex contour. In many cases the conventional linear trimmer cuts into the foliage contour or creates a flat spot, thus requiring removal of more foliage than is desired. The final condition of the foliage is often not what was initially intended.

BRIEF SUMMARY OF THE INVENTION

The present invention is designed to be foliage trimmers that can cut asymmetrically convex shapes such a way that the curvature of the trimmer's cutting section determines the final contour of the foliage being trimmed. It is not necessary to make multiple passes, with different angular orientation, with the trimmer in order to create a convex foliage contour. One pass with the trimmer will create a convex foliage contour within the width of the trimmer's cutting section.

The preferred embodiments of the invention comprises of a trimmer body with pivotally mounted handle mechanism attached to a flexible curvature adjuster band going through a plurality of cutting units articulately arranged side by side with a flexible scissor type mechanism attached to every cutting unit and trimmer body to maintain equidistant spacing between cutting units and to prevent the formation of an uneven curvature. The blades of the cutting units are arcually reciprocated by a drive mechanism coupled to every cutting unit's drive mechanism and to the motor means located in trimmer body. The blades of the cutting units can also be arcually reciprocated by electromagnets located in the cutting units, thus eliminating the need for a motor means in the body. The curvature of the cutting section is adjusted with the release of the restraining mechanism with the thumb of one hand and the pivotal movement of the front handle mechanism with the other hand. A cover is situated on top of each cutting unit to protect the scissor type mechanism from debris. And a bellows mechanism is situated between each cutting unit to prevent dust and debris to get inside the couplings and drive mechanism.

The one hand operated foliage trimmer's cutting unit's blade is arcually reciprocated by electromagnets. Each cutting unit has a strap attached thereto for the purpose of securing it to the operator's hand. The one hand operated foliage trimmer is perfect for trimming topiaries such as "pom-pom", "spirals", "double spirals" and other oddly shaped topiaries.

The elongated version of the foliage trimmer gives the operator the opportunity to trim foliage that is not reachable by the normal trimmers. An other advantage is that the elongated foliage trimmer's head body and cutting section's hemispherical spatial orientation is adjustable and restrainable with the rear handle mechanism.

BRIEF DESCRIPTION OF THE SEVERAL VIEWS OF DRAWING

FIG. 1 is a front perspective view of the foliage trimmer having the cutting section in a linear position.

FIG. 2 is a side elevational view of the foliage trimmer having the cutting section in a linear position.

FIG. 3 is a plan view of the foliage trimmer having the cutting section in a linear position.

FIG. 8 is a detail cross sectional view of the foliage trimmer body, taken on line 270-270 of FIG. 3 showing the cutting section in the linear position.

FIG. 9 is a detail cross sectional view of the foliage trimmer body, taken on line 270-270 of FIG. 3 showing the cutting section in the semi circular position.

FIG. 10 is a front perspective view of the restraining rod.

FIG. 11 is a front perspective view of the restraining rod lever.

FIG. 12 is a rear perspective view, partly in section of the foliage trimmer body.

FIG. 13 is a front perspective view, partly in section of the foliage trimmer body.

FIG. 14 is a perspective view of three of the cutting units.

FIG. 15 is a plan view of an individual cutting unit.

FIG. 16 is a plan view of an individual double bladed cutting unit.

FIG. 20 is a plan view of an individual cutting unit without the body.

FIG. 21 is a perspective view of an individual cutting unit without the body.

FIG. 22 is a bottom plan view of an individual cutting unit.

FIG. 23 is a perspective view of an individual cutting unit without the body.

FIG. 24 is a plan view of an individual double bladed cutting unit without the body.

FIG. 25 is a plan view of an individual double bladed cutting unit without the body showing the two blades.

FIG. 26 is a perspective view of the two blades.

FIG. 27 is a perspective exploded view of the two blades.

FIG. 28 is a plan view of an individual cutting unit without the body, showing a single blade actuated by two electromagnets.

FIG. 29 is a plan view of an individual cutting unit without the body, showing a single blade actuated by one electromagnet.

FIG. 30 is a plan view of an individual double bladed cutting unit without the body, showing two blades actuated by two electromagnets in the cutting position.

FIG. 31 is a plan view of an individual double bladed cutting unit without the body, showing two blades actuated separately by two electromagnets and one of the blades is in the cutting position.

FIG. 38 is a plan view of an elongated foliage trimmer.

FIG. 39 is a side elevational view of an elongated foliage trimmer.

FIG. 40 is a front perspective view of an elongated foliage trimmer, having the cutting section oriented in an angle relative to the rest of the foliage trimmer.

FIG. 41 is a side elevational view of an elongated foliage trimmer, having the cutting section oriented in an angle relative to the rest of the foliage trimmer.

FIG. 42 is a side elevational view of an elongated foliage trimmer, having the cutting section oriented in an angle relative to the rest of the foliage trimmer and having the cutting section in a convex position.

FIG. 48 is a rear perspective view of the right clamshell of the trimmer head body.

FIG. 49 is a rear perspective view of the trimmer head body.

FIG. 50 is a front perspective view of the left clamshell of the trimmer head body.

FIG. 51 is a sectional view of the trimmer head body, showing the spring in a compressed position.

FIG. 52 is a sectional view of the trimmer head body, showing the spring in an uncompressed position.

FIG. 54 is a front perspective view of the right clamshell of the curvature adjuster mechanism.

FIG. 55 is a front perspective view of the curvature adjuster mechanism.

FIG. 56 is a front perspective view of the curvature adjuster mechanism.

FIG. 57 is a rear elevational view of the front half section of the front handle.

FIG. 58 is a front perspective view of the left clamshell of the curvature adjuster mechanism.

FIG. 74 is a rear elevational view of the front half of the rear handle.

FIG. 75 is a rear elevational view of the front half of the pivoting member.

FIG. 76 is a front perspective view of left clamshell of the rear handle mechanism.

FIG. 77 is a rear perspective view of right clamshell of the rear handle mechanism.

FIG. 85 is plan view of the rear handle mechanism, showing the cable securing cone in the unlocked position.

FIG. 86 is a side elevational view of the rear handle mechanism, showing the cable securing cone in the unlocked position.

FIG. 87 is a side elevational view and fragmentary sectional view, taken on line 371-371 of FIG. 85, of the internal parts of the restraining mechanism, showing the cable securing cone in the unlocked position.

FIG. 88 is an exploded view of the internal parts of the rear handle mechanism.

FIG. 89 is an alternate exploded view of the internal parts of the rear handle mechanism.

FIG. 90 is a partial front elevational view showing one of the release levers in the depressed position.

DETAILED DESCRIPTION OF THE INVENTION

Figure 4:
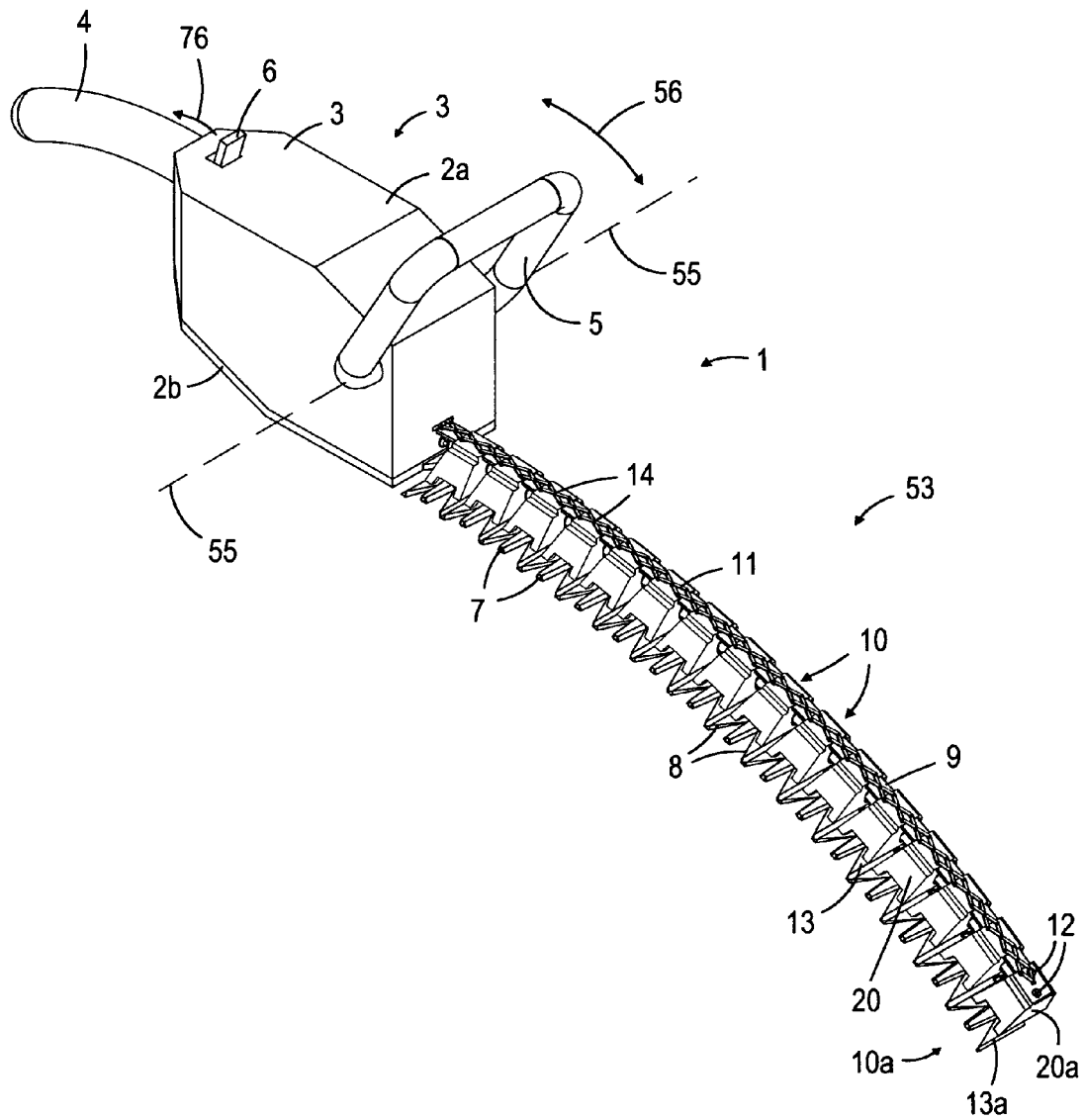
FIG. 4 is a front perspective view of the foliage trimmer having the cutting section in a convex position.
Figure 5:
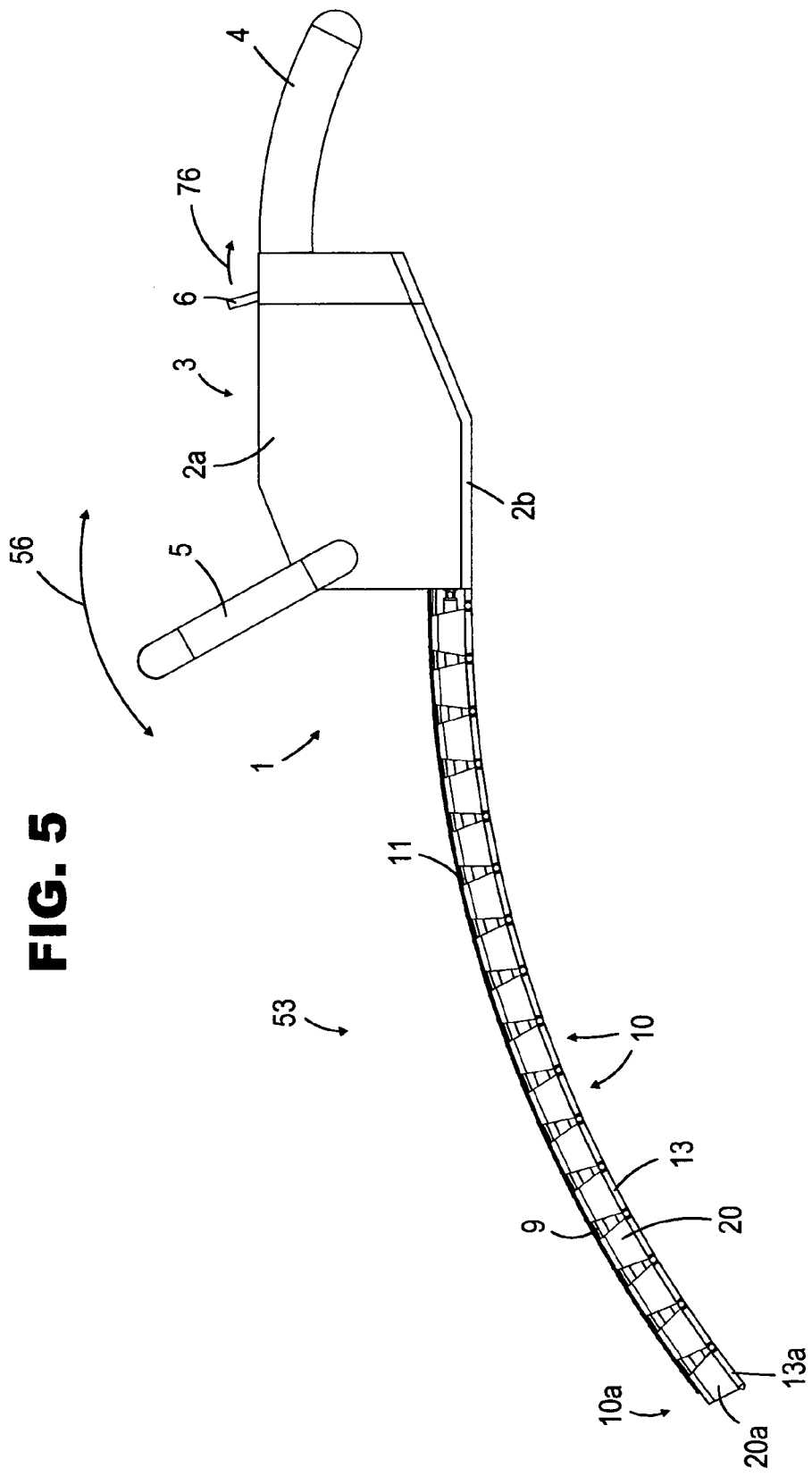
FIG. 5 is a side elevational view of the foliage trimmer having the cutting section in a convex position.
Figure 6:
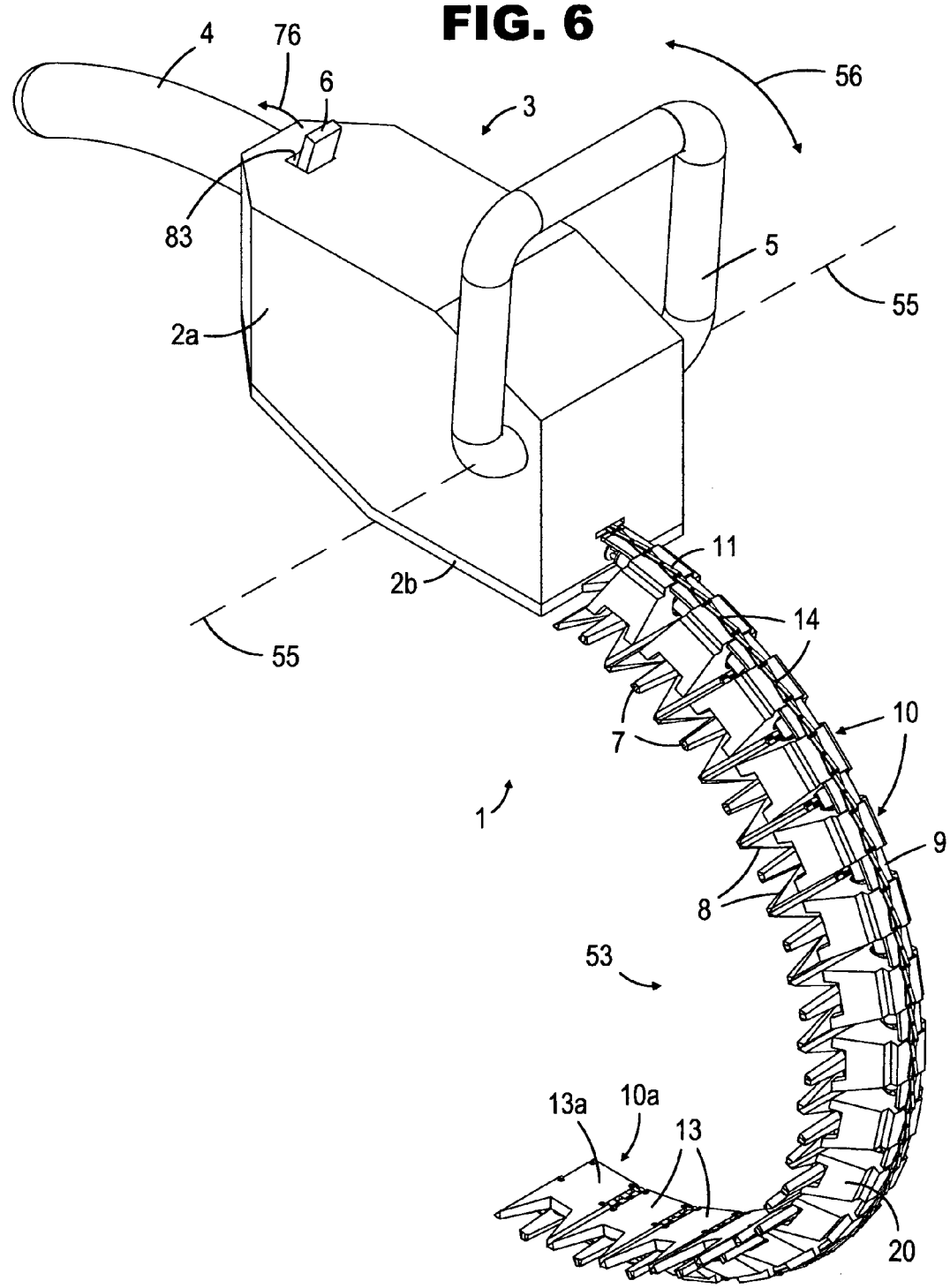
FIG. 6 is a front perspective view of the foliage trimmer having the cutting section in a semicircle position.
Figure 7:
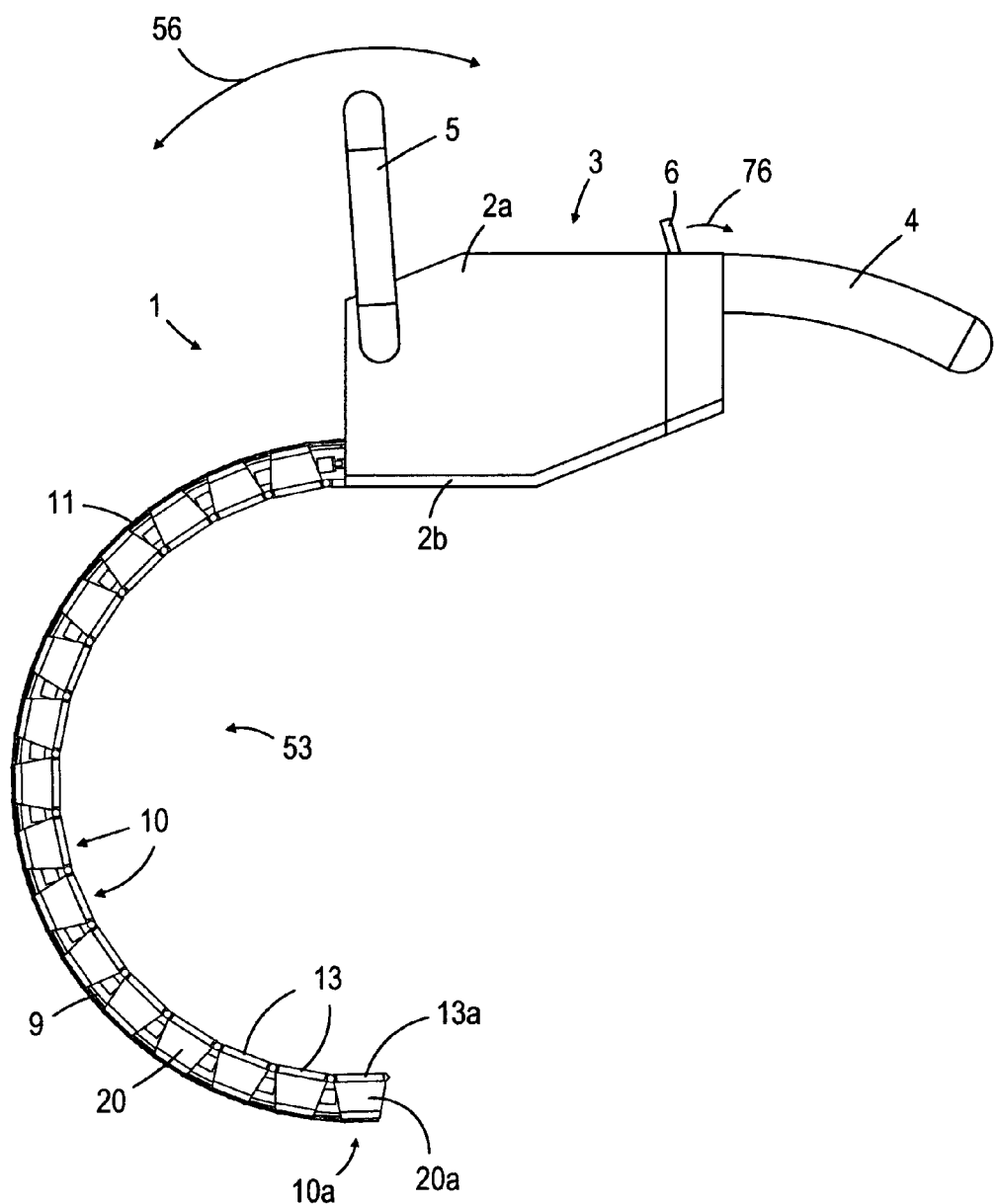
FIG. 7 is a side elevational view of the foliage trimmer having the cutting section in a semicircle position.
Figure 17:
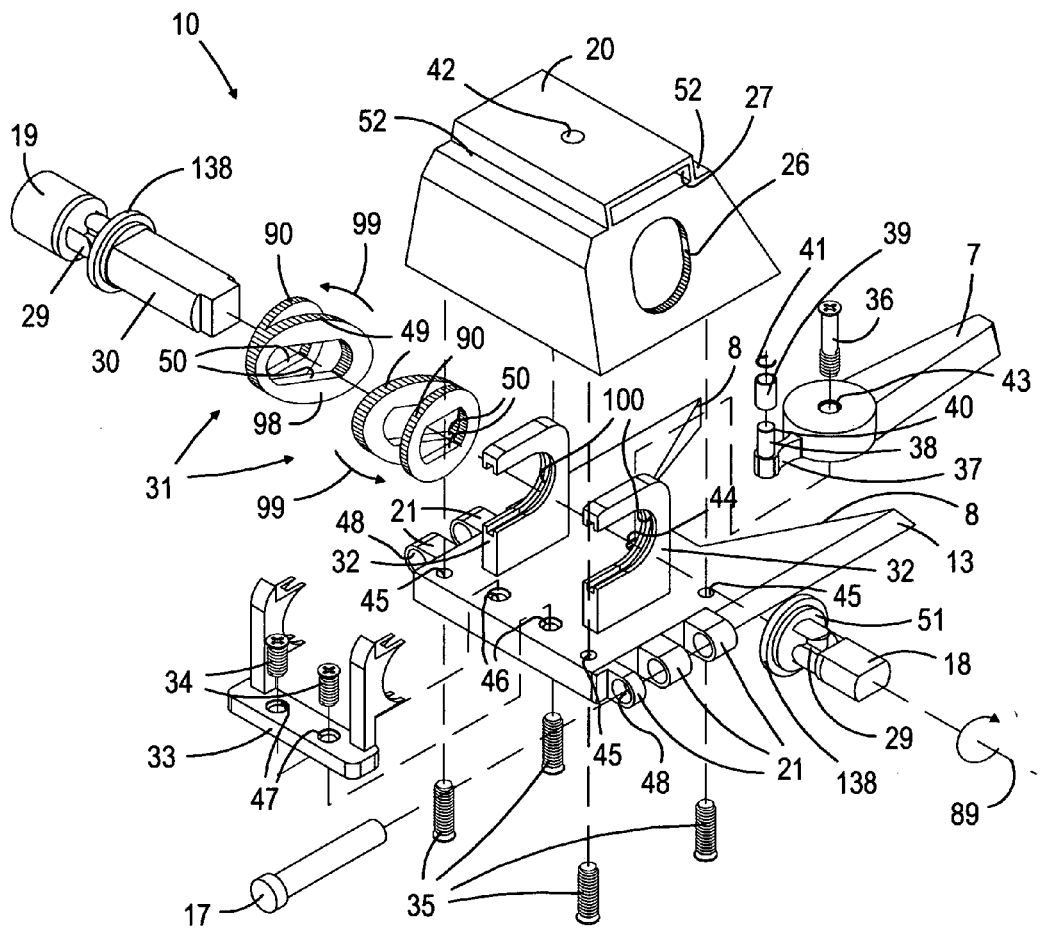
FIG. 17 is a perspective exploded view of an individual cutting unit.
Figure 18:
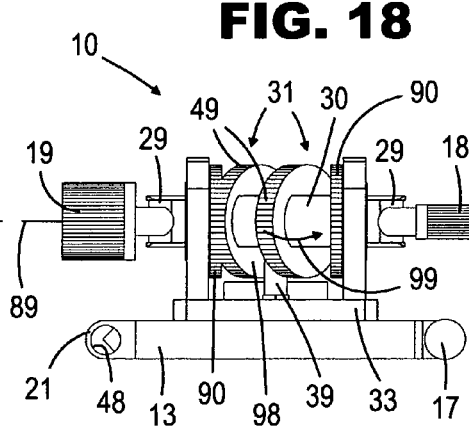
FIG. 18 is a rear view of an individual cutting unit without the body.
Figure 19:
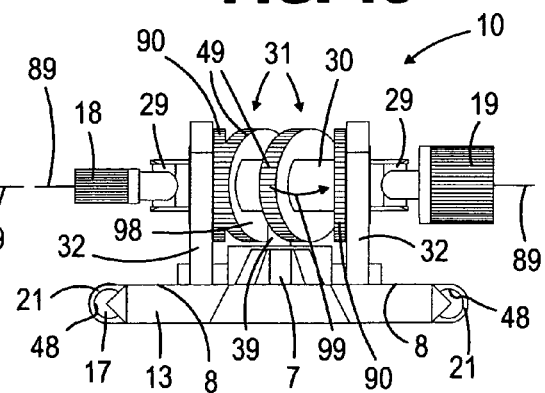
FIG. 19 is a front view of an individual cutting unit without the body.
Figure 32:
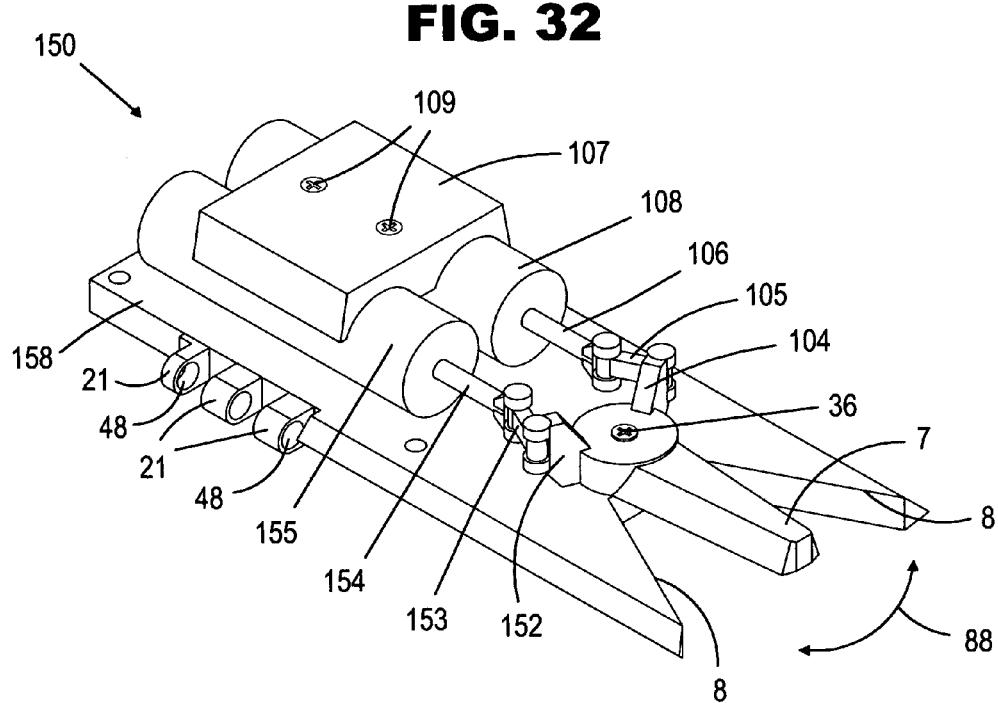
FIG. 32 is a perspective view of an individual cutting unit without the body, showing a single blade actuated by two electromagnets.
Figure 33:
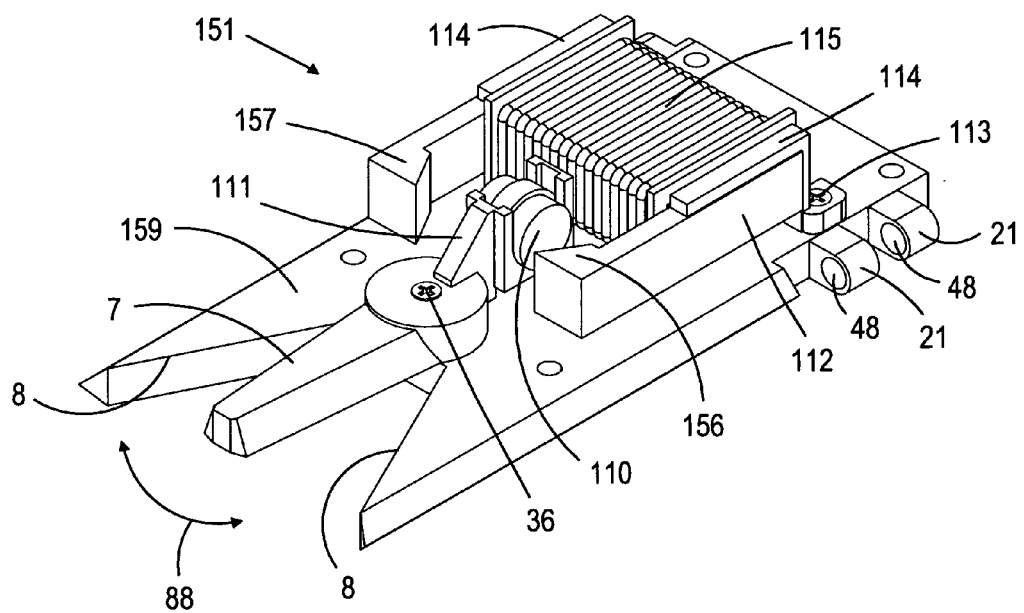
FIG. 33 is a perspective view of an individual cutting unit without the body, showing a single blade actuated by one electromagnet.

A foliage trimmer (1) (shown in FIGS. 1-7), having a body (3), made of a housing (2a) with a rear handle (4) integrally formed onto the housing (2a), a base (2b) attached to the housing (2a) via screws (not shown), a front handle curvature adjuster mechanism (5) pivotally mounted to housing (2a), and pivotally positional around axis (55), and a cutting section (53) made up of a plurality of cutting units (10) articulately connected to each other and base (2b) via pins (17). The cutting units (10) are also connected to each other and housing (2a) via a flexible scissor type mechanism (11) secured to top of cutting unit (10) bodies (20) with screws (14) into openings (42). A recess (82) (shown in FIG. 12) formed in the housing (2a) is provided to allow the securing of the end of the scissor type mechanism (11) to housing (2a) with a screw (14). The purpose of the flexible scissor type mechanism (11) is to maintain equidistant spacing between cutting units (10) to prevent the distortion of cutting section (53) in its linear position and to facilitate the formation of an even curvature of cutting section (53). The flexible scissor type mechanism (11) flexes and conforms to a convex shape as the cutting section (53) is adjusted (as shown in FIGS. 4-7).

The curvature of the cutting section (53) is adjusted with one hand on the front handle curvature adjuster mechanism (5) and the other hand on rear handle (4) with thumb engagingly pulling on lever (6) protruding through opening (83), which is pivotally mounted by pin (64) to brackets (63) of housing (2a) through openings (79) and through openings (103) in arm members (80) of lever (6), and is displaced in the direction indicated by arrow (76), around pivot axis (77), thus causing the restraining rod (65), which is rotatably connected to lever (6) through the opening (87) via pin (86) through the openings (102) in arm members (80) of lever (6), to move slidably through the mount (66) in a linear direction indicated by arrow (74), (shown in FIGS. 8-13), and to push against resiliently restraining spring (67) which rests against mount (66), thus forcing the resiliently restraining spring (67) to compress, thereby disengaging the concave gear teeth face (68) of restraining rod (65) from the convex gear teeth face (69) of front handle curvature adjuster mechanism (5), thereby allowing pivotal movement of shaft (70) of front handle curvature adjuster mechanism (5) around pivot axis (55) in the direction indicated by arrow (56) (shown in FIG. 9). A movement applied with one hand to front handle curvature adjuster mechanism (5) in direction of arrow (56) will translate into an opposite movement indicated by arrow (75) of the flexible curvature adjuster band (9) attached to arm (71) of front handle curvature adjuster mechanism (5) with a clamp (72) and rivets (73), thereby causing the cutting section (53) to change its shape from linear to convex and vice versa. The flexible curvature adjuster band (9) slidably transverses through opening (101) of housing (2a) and transversely through opening (27) of each cutting unit (10) body (20) and secures to the outermost cutting unit (10a) body (20a) via screws (12). When the desired curvature of cutting section (53) is established, with the release of lever (6) through the restraining rod (65) the stored force in the spring (67) pushes the concave gear teeth face (68) towards the convex gear teeth face (69) of front handle curvature adjuster mechanism (5) in an engaging position, therefore securing the curvature of the cutting section (53) into the desired fixed position.

Attached to base (2b) on mounts (58) is a motor (57) secured in place by screws (78) through clamps (59). The motor (57) can be electric and be powered by rechargeable batteries (not shown) or electricity from any outlet (not shown) or from an electricity generator (not shown). The foliage trimmer (1) can also be powered by a gasoline engine (not shown) or compressed air generated by an air compressor (not shown). Also not depicted and not described are the on-off switch, including the conventional dual switching mechanism which is customary on such equipment to ensure the safe operation of the equipment, and the electrical wiring and other electrical and mechanical components which are necessary for the proper operation of the foliage trimmer (1), but are well known to those skilled in the art. The motor (57) is connected to drive shaft (60) and attached via a universal joint (29) to a power transfer shaft (62) rotatably through shaft mount (61) and rotatably through opening (85) of housing (2a) attached via another universal joint (29) connected to a female coupling (19) slidably engaging the male coupling (18) of cutting unit (10) contiguous to housing (2a). When the foliage trimmer (1) is operated with the cutting section (53) in the linear but most likely in the convex position, the power output of motor (57) is transmitted from cutting unit (10) to adjacent cutting unit (10) via the slidable engagement of male coupling (18) through the opening (91) of female coupling (19) (shown in FIG. 23) and permitted by the flexibility of universal joints (29).

The cutting unit (10) (shown in FIGS. 17-23) has hinge members (21) incorporated into the opposing lateral edges of base (13). The adjacent cutting units (10) are articulately connected to each other via the pins (17) secured through openings (48) of the pivotally interlocking hinge members (21). There are two stationary cutting blades (8) formed into base (13). Attached to base (13) via screw (36) through opening (43) and secured into opening (44) of base (13) is the double edged cutting blade (7) having an arm (37), with a driving pin (38). A cylindrical bushing (39) is rotatably connected around driving pin (38) and secured in place via a flat retaining ring (41) secured within an annular slot (40) formed into driving pin (38). And two brackets (32) also protrude from base (13). The brackets (32) with securing bracket (33) attached via screws (34) through openings (47) and secured into openings (46) of base (13) of cutting unit (10) form two circular openings (100) in which the circular collars (138) of the cam shaft (30) and terminating member (51), is rotatably mounted. The female coupling (19) connected to the cam shaft (30) via universal joint (29). The cam shaft (30) transverses two opposing resiliently flexible cams (31) through their openings (50) in the stationary members (90) and openings (50) in the resiliently flexible members (49) and is attached to terminating member (51), which is connected to male coupling (18) via universal joint (29). As the cam shaft (30) rotates the two opposing resiliently flexible cams (31) on rotational axis (89), the rotational motion is transferred into reciprocating linear motion, through the cylindrical bushing (39) engagingly riding in between the two opposing faces (98) of the resiliently flexible cams (31) and causing the double edged cutting blade (7) to arcually reciprocate along arrow (88), thus severing any leaves or branches that are positioned in between the double edged cutting blade (7) and stationary blades (8). In order to prevent any damage to the individual cutting units (10) and to the foliage trimmer (1) caused by the accidental positioning of metallic or other hard non-foliage objects in between the double edged cutting blade (7) and stationary blades (8), that the foliage trimmer (1) is not design to cut, therefore resiliently flexible cams (31) are provided with resiliently flexible members (49) that flex and deflect in the direction indicated by arrow (99) when an obstacle is encountered between the double edged cutting blade (7) and stationary blades (8), thus allowing the rotation of the camshaft (30) to proceed without causing any damage to the cutting unit (10) or foliage trimmer (1). Thus the foliage trimmer (1) operator is given a chance to remove the obstacle and to continue the foliage trimming process without having to repair the foliage trimmer (1). The resiliently flexible cams (31) are designed and formed from materials that allow flexing and deflecting of the resiliently flexible members (49) only when a resistance force greater than what is required to cut normal foliage is transferred through the double edged cutting blade (7) and cylindrical bushing (39) via face (98) to the resiliently flexible member (49) of the resiliently flexible cam (31).

The cutting unit (10) body (20) having a recess (28) formed therein to allow the reciprocation of double edged cutting blade (7) is secured to the base (13) via four screws (35) through openings (45) of base (13). Two oval openings (26) are formed into cutting unit (10) body (20) on the two opposing lateral surfaces to allow the male coupling (18) and female coupling (19) to operatively rotate therethrough. Two indentations (52) are also formed into two top edges of cutting unit (10) body (20) to allow for snap fit of cover (16) thereon to protect scissor type mechanism (11) from debris (shown in FIG. 14). The cutting unit (10) body (20) has an opening (27) formed therewithin the top portion to allow the flexible curvature adjuster band (9) to slidably operate therethrough. Also a bellows mechanism (15) is situated in between the cutting units (10) to protect from debris. The outermost terminating cutting unit (10a) does not have a female coupling (19) and the universal joint (29) connected on the outermost side to the cam shaft (30). And also one oval opening (26) on the outermost side is omitted from the outermost terminating cutting unit (10a) body (20a), since it is unnecessary.

The cutting section (53) can also be comprised of double bladed cutting units (22) (shown in FIG. 16 and FIGS. 24-27) to be manufactured with foliage trimmer (1) if so desired. The double bladed cutting unit (22) has hinge members (21) incorporated into the opposing lateral edges of the base (23). The adjacent double bladed cutting units (22) are articulately connected to each other via the pins (17) secured through openings (48) of the pivotally interlocking hinge members (21). Recesses (24) are formed into the opposing lateral edges of base (23) to allow space for the removal and insertion of pin (17). There are four stationary cutting blades (8) formed into base (23). Attached to base (23) via screw (36) through opening (43) and secured into opening (44) (not shown) of base (23) is the double edged cutting blade (7) having an arm (37), with a driving pin (38). A cylindrical bushing (39) is rotatably connected around driving pin (38) and secured in place via a flat retaining ring (41) secured within an annular slot (40) formed into driving pin (38). Attached on the opposite side to base (23) via screw (36) through opening (97) and secured into opening (44) (not shown) of base (23) is the secondary double edged cutting blade (54) having an arm (95), with a yoke (96) formed thereon. And two brackets (32) also protrude from base (13). The brackets (32) with securing brackets (92) attached via screws (93) onto base (23) of double bladed cutting unit (22) form two circular openings (100) in which the cam shaft (30) is rotatably mounted. The transfer of rotational motion to reciprocating linear motion is identical to the single blade cutting unit (10) in all respects except that arm (37) of the double edged cutting blade (7) also engagingly drives the secondary double edged cutting blade (54) via a yoke (96). The cutting unit body (25) (shown in FIG. 16), having two recesses (28) formed therein to allow the reciprocation of the double edged cutting blade (7) and the secondary double edged cutting blade (54), is secured to the base (23) via four screws (35) (not shown) through openings (94) of base (23). Two oval openings (26) are formed into the double bladed cutting unit (22) body (25) on the two opposing lateral surfaces to allow the male coupling (18) and female coupling (19) to operatively rotate therethrough. Two indentations (52) are also formed into two top edges of the double bladed cutting unit (22) body (25) to allow for snap fit of cover (not shown) similar to cover (16) (shown in FIG. 14) to protect scissor type mechanism (11) from debris. The double bladed cutting unit (22) body (25) has an opening (27) formed therewithin the top portion to allow the flexible curvature adjuster band (9) to slidably operate therethrough. Also a bellows mechanism (not shown) similar to bellows mechanism (15) (shown in FIG. 14) is situated in between the double bladed cutting units (22) to protect from debris. The outermost terminating double bladed cutting unit (not shown) does not have a female coupling (19) and does not have a universal joint (29) connected on the outermost side of the cam shaft (30). And also one oval opening (26) is omitted from the outermost side of the outermost terminating double bladed cutting unit (22) body (25), since it is unnecessary.

The cutting section (53) can also be comprised of electromagnetically reciprocated cutting units, be it single bladed (150, 151), or double bladed cutting units (161, 162) shown in FIGS. 28-33. The cutting units (150, 151, 161, 162) have hinge members (21) incorporated into the opposing lateral edges of their respective bases (158, 159, 163, 164). The adjacent cutting units (150, 151, 161, 162), in their respective cutting sections (53) that are made up of only one type of cutting unit (150, 151, 161, 162), are articulately connected to each other via the pins (17) secured through openings (48) of the pivotally interlocking hinge members (21). In the single bladed cutting units (150,151) there are two stationary cutting blades (8) formed into their respective bases (158, 159). In the double bladed cutting units (161, 162) there are four stationary cutting blades (8) formed into their respective bases (163, 164). Recesses (24) are formed into the opposing lateral edges of the bases (163, 164) to allow space for the removal and insertion of pin (17). Attached to bases (158, 159) via screws (36) through openings (not shown) and secured into openings (not shown) of their respective bases (158, 159) are the double edged cutting blades (7).

The single bladed cutting units (150, 151) have bodies (not shown) similar to body (20) of cutting unit (10), having a recess (28) formed therein to allow the reciprocation of double edged cutting blade (7). And the double bladed cutting units (161, 162) have bodies (not shown) similar to body (25) of cutting unit (22), having two recesses (28) formed therein to allow the reciprocation of both of the double edged cutting blades (7). The bodies (not shown) are secured to their respective bases (158, 159, 163, 164) via four screws (not shown). Two indentations (not shown) similar to indentations (52) are also formed into two top edges of the body (not shown) to allow for snap fit of cover (not shown) similar to cover (16) thereon to protect scissor type mechanism (11) from debris as shown in FIG. 14. The bodies (not shown) have openings (not shown) similar to opening (27) formed therewithin the top portion to allow the flexible curvature adjuster band (9) to slidably operate therethrough. Also a bellows mechanism (not shown) similar to bellows mechanism (15) is situated in between the electromagnetic cutting units (150, 151, 161, 162) respectively to protect from debris. And a bellows mechanism (not shown) situated in between the housing (2a) and contiguous electromagnetic cutting units (150, 151, 161, 162) respectively.

The cutting unit (150) shown in FIG. 28, 32, comprises of two cylindrical electromagnets (108, 155) secured to base (158) with screws (109) via clamp (107). The left cylindrical electromagnet (108) has a left longitudinally permanent magnetic rod (106), with a "NORTH POLE" end and a "SOUTH POLE" end, slidably situated therewithin. The left longitudinally permanent magnetic rod (106) is pivotally coupled to a non-magnetic connecting rod (105), which is pivotally coupled to the left arm (104) of the double edged cutting blade (7). The right cylindrical electromagnet (155) has a right longitudinally permanent magnetic rod (154), with a "NORTH POLE" end and a "SOUTH POLE" end, slidably situated therewithin. The right longitudinally permanent magnetic rod (154) is pivotally coupled to a non-magnetic connecting rod (153), which is pivotally coupled to the right arm (152) of the double edged cutting blade (7). Electric current is introduced into the magnetic coils of the left cylindrical electromagnet (108) and simultaneously an opposite polarity electric current is introduced into the magnetic coils of the right cylindrical electromagnet (155), inducing opposite polarity electromagnetic fields in the left and right cylindrical electromagnets (108, 155) respectively, thereby causing opposite longitudinal movements in the left and right longitudinally permanent magnetic rods (106, 154) respectively and through the left and right non-magnetic connecting rods (105, 153) coupled to the left and right arms (104, 152) respectively, causing arcual movement (88) of the double edged cutting blade (7) thereby cutting any foliage that gets between the stationary cutting blades (8) and the double edged cutting blade (7). To produce arcually reciprocating movement (88), alternating current is used at an optimum desired alternating cycle. The necessary electronic components that generate a desired alternating current such as wires, rectifiers, diodes, resistors, integrated circuits, switches, etc. are not shown, but are well known to those skilled in the art.

In FIG. 30 a double bladed cutting unit (161) is shown with both of the double edged cutting blades (7) in the cutting position. The double bladed cutting unit (161) comprises of two cylindrical electromagnets (108, 155) secured to base (164) with screws (109) via clamp (107). The left cylindrical electromagnet (108) has a left longitudinally permanent magnetic rod (133), with a "NORTH POLE" end and a "SOUTH POLE" end, slidably situated therewithin. The left longitudinally permanent magnetic rod (133) is pivotally coupled, on one end, to a non-magnetic connecting rod (105), which is pivotally coupled to the left arm (104) of the primary double edged cutting blade (7) and, on the other end, the left longitudinally permanent magnetic rod (133) is pivotally coupled to a non-magnetic connecting rod (153), which is pivotally coupled to the arm (152) of the secondary double edged cutting blade (7). The right cylindrical electromagnet (155) has a right longitudinally permanent magnetic rod (134), with a "NORTH POLE" end and a "SOUTH POLE" end, slidably situated therewithin. The right longitudinally permanent magnetic rod (134) is pivotally coupled, on one end, to a non-magnetic connecting rod (153), which is pivotally coupled to the right arm (152) of the primary double edged cutting blade (7) and, on the other end, the right longitudinally permanent magnetic rod (134) is pivotally coupled to a non-magnetic connecting rod (105), which is pivotally coupled to the arm (104) of the secondary double edged cutting blade (7). Electric current is introduced into the magnetic coils of the left cylindrical electromagnet (108) and simultaneously an opposite polarity electric current is introduced into the magnetic coils of the right cylindrical electromagnet (155), inducing opposite polarity magnetic fields in the left and right cylindrical electromagnets (108, 155) respectively, thereby causing opposite longitudinal movements in the left and right longitudinally permanent magnetic rods (133, 134) respectively and through the left and right non-magnetic connecting rods (105, 153) coupled to the arms (104, 152) respectively of both the primary and secondary double edged cutting blades (7), causing opposite arcual movements (88) of the double edged cutting blades (7) thereby cutting any foliage that projects between the stationary cutting blades (8) and the double edged cutting blades (7). To produce arcually reciprocating movements (88), alternating current is used at an optimum desired alternating cycle. Again, the necessary electronic components that generate a desired alternating current such as wires, rectifiers, diodes, resistors, integrated circuits, switches, etc. are not shown, but are well known to those skilled in the art.

The cutting unit (151) shown in FIG. 29, 33, comprises of an electromagnet (115) secured to base (159) with screws (113) via clamps (114). The electromagnet (115) has a ferrite core (112) with a left arm (156) and a right arm (157) integrally formed thereon. In the drive arm (111) of the double edged cutting blade (7) there is a laterally oriented permanent magnet (110), with a "NORTH POLE" end and a "SOUTH POLE" end, securely situated therewithin. Electric current is introduced into the magnetic coils of the electromagnet (115) inducing a magnetic field in between the left arm (156) and right arm (157) of the ferrite core (112) of the electromagnet (115), thereby causing the permanent magnet (110) secured to the drive arm (111) and attached to the double edged cutting blade (7) to move arcually (88) and thereby cutting any foliage that gets between the stationary cutting blades (8) and the double edged cutting blade (7). To produce arcually reciprocating movement (88), alternating current is used at an optimum desired alternating cycle. The necessary electronic components that generate a desired alternating current such as wires, rectifiers, diodes, resistors, integrated circuits, switches, etc. are not shown, but are well known to those skilled in the art.

In FIG. 31 a double bladed cuffing unit (162) is shown with one of the double edged cutting blades (7) in the cutting position. The double bladed cutting unit (162) comprises of a two electromagnets (115) secured to base (163) with screws (113) via clamps (114). The electromagnets (115) have a ferrite core (112) with a left arm (156) and a right arm (157) integrally formed thereinto. In the drive arms (111) of the double edged cutting blades (7) there is a laterally oriented permanent magnet (110), with a "NORTH POLE" end and a "SOUTH POLE" end, securely situated therewithin. Electric current is introduced into the magnetic coils of the electromagnets (115) inducing a magnetic field in between the left arm (156) and right arm (157) of the ferrite core (112) of the electromagnets (115), thereby causing the permanent magnet (110) secured to the drive arms (111) and attached to the double edged cutting blades (7) to move arcually (88) and thereby cutting any foliage that gets between the stationary cutting blades (8) and the double edged cutting blades (7). To produce arcually reciprocating movements (88), alternating current is used at an optimum desired alternating cycle. Again, the necessary electronic components that generate a desired alternating current such as wires, rectifiers, diodes, resistors, integrated circuits, switches, etc. are not shown, but are well known to those skilled in the art.

Figure 34:
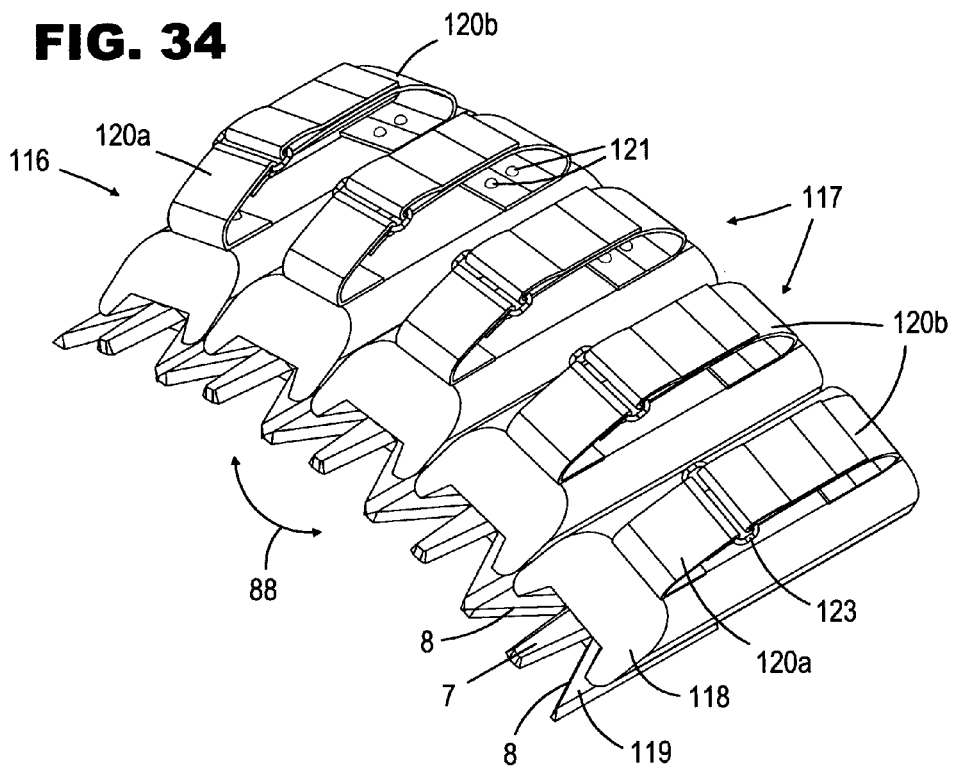
FIG. 34 is a perspective view of the one hand operated foliage trimmer in a convex position.
Figure 35:
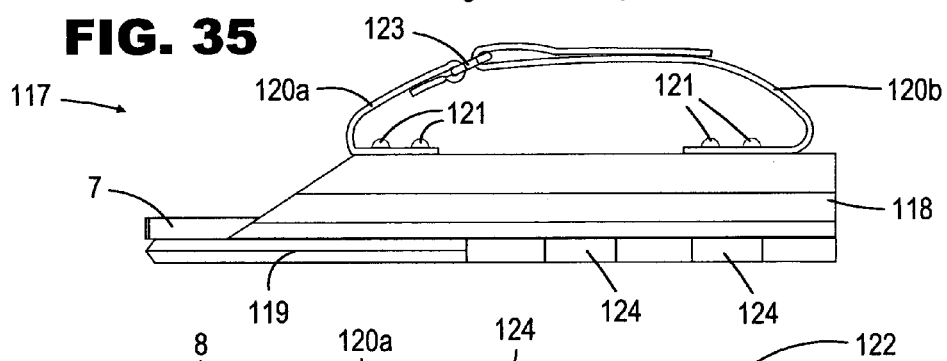
FIG. 35 is a side elevational view of an individual electromagnetic cutting unit.
Figure 36:
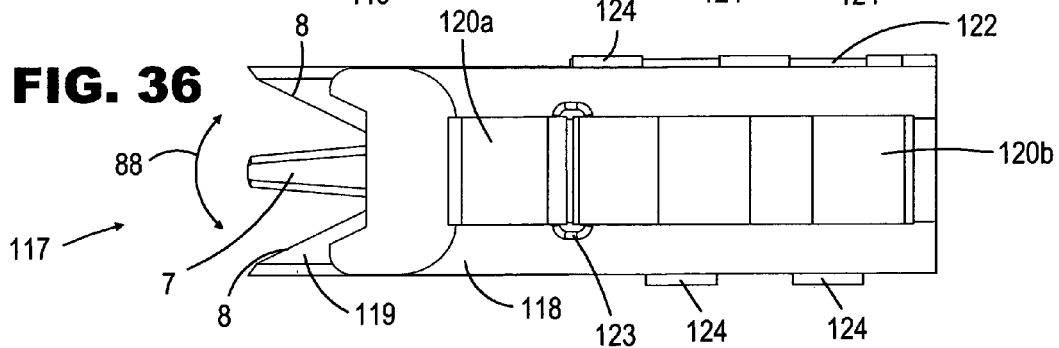
FIG. 36 is a plan view of an individual electromagnetic cutting unit.
Figure 37:
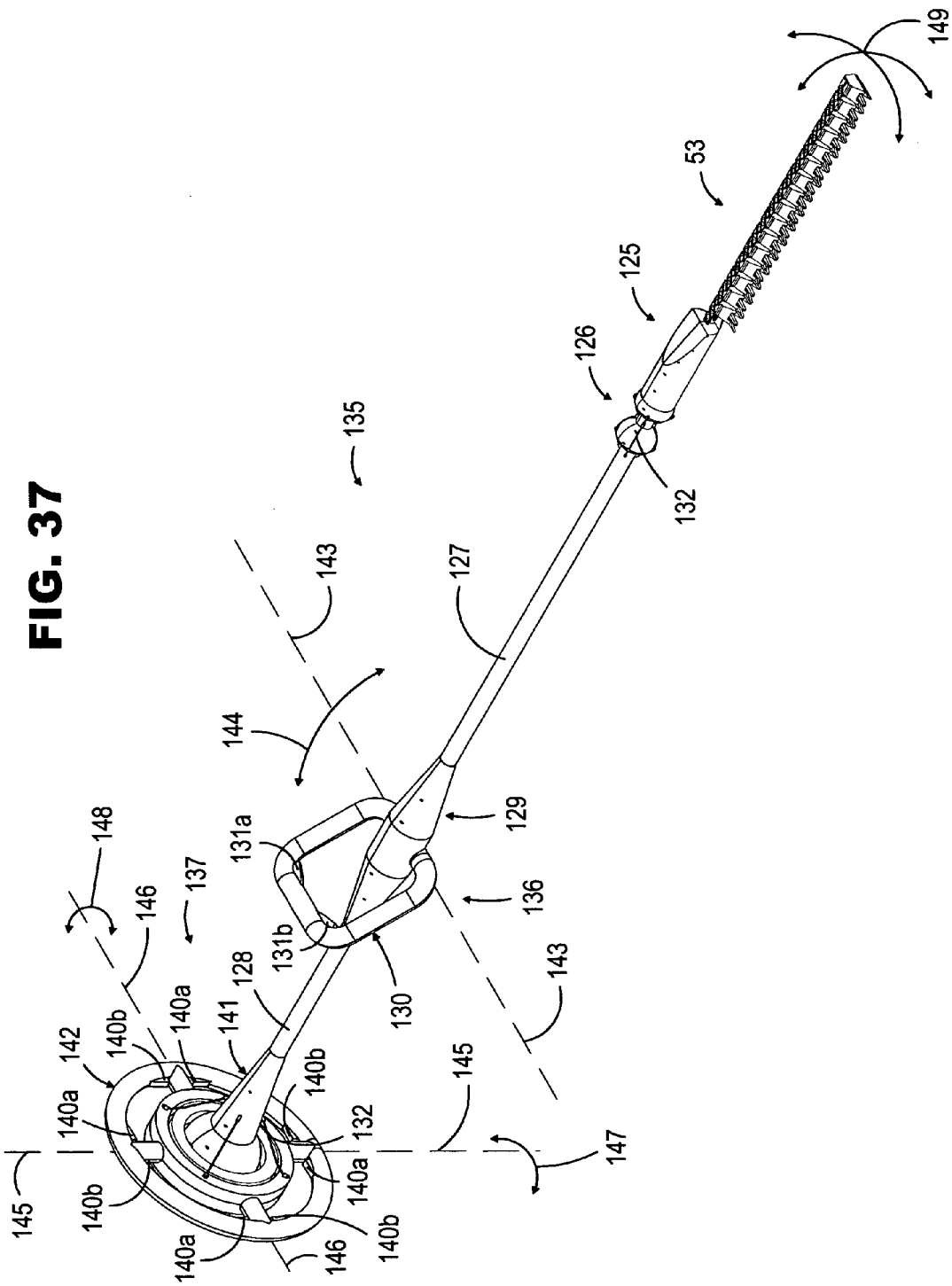
FIG. 37 is a front perspective view of an elongated foliage trimmer.
Figure 43:
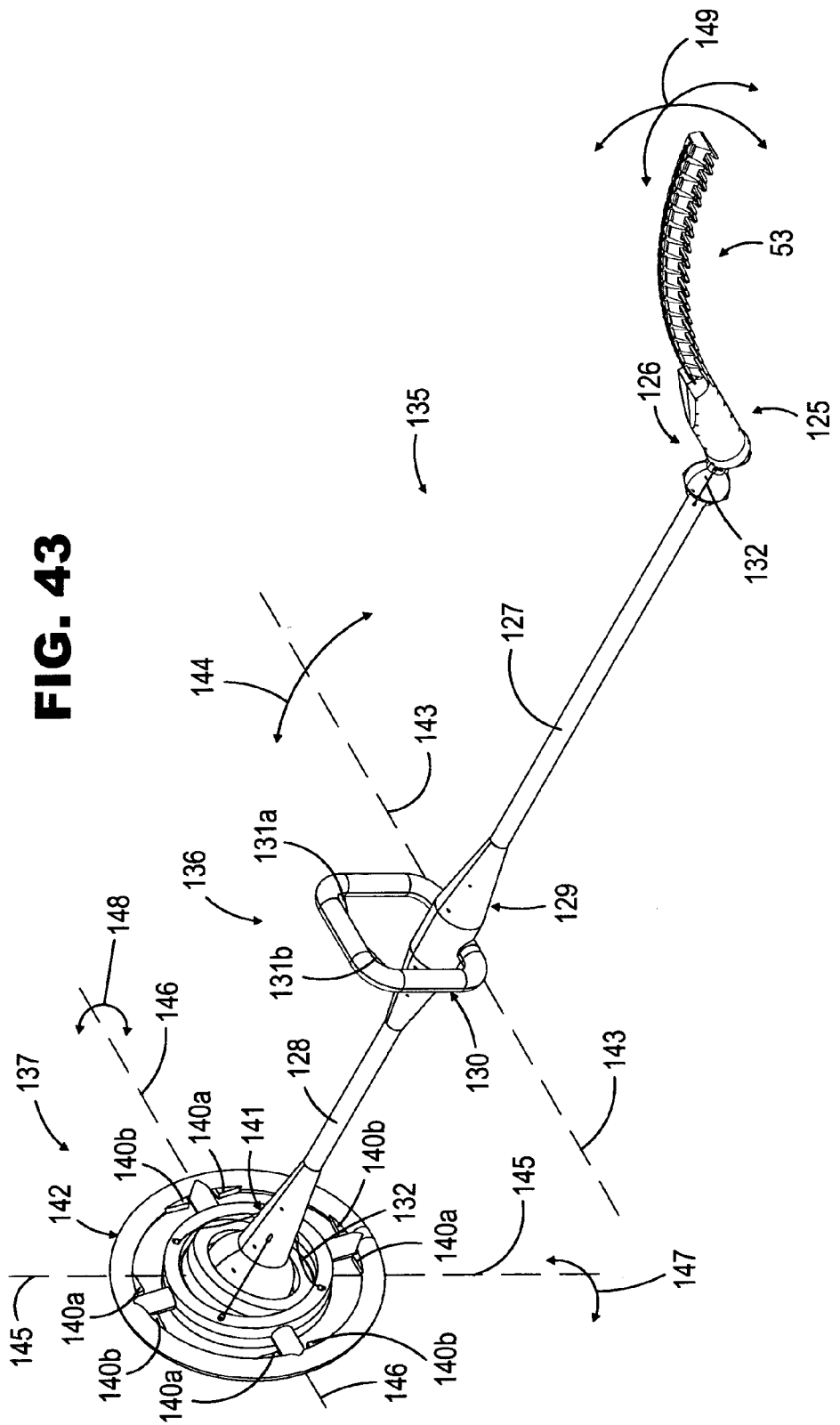
FIG. 43 is a front perspective view of an elongated foliage trimmer, having the cutting section oriented in an angle relative to the rest of the foliage trimmer and having the cutting section in a convex position.
Figure 44:
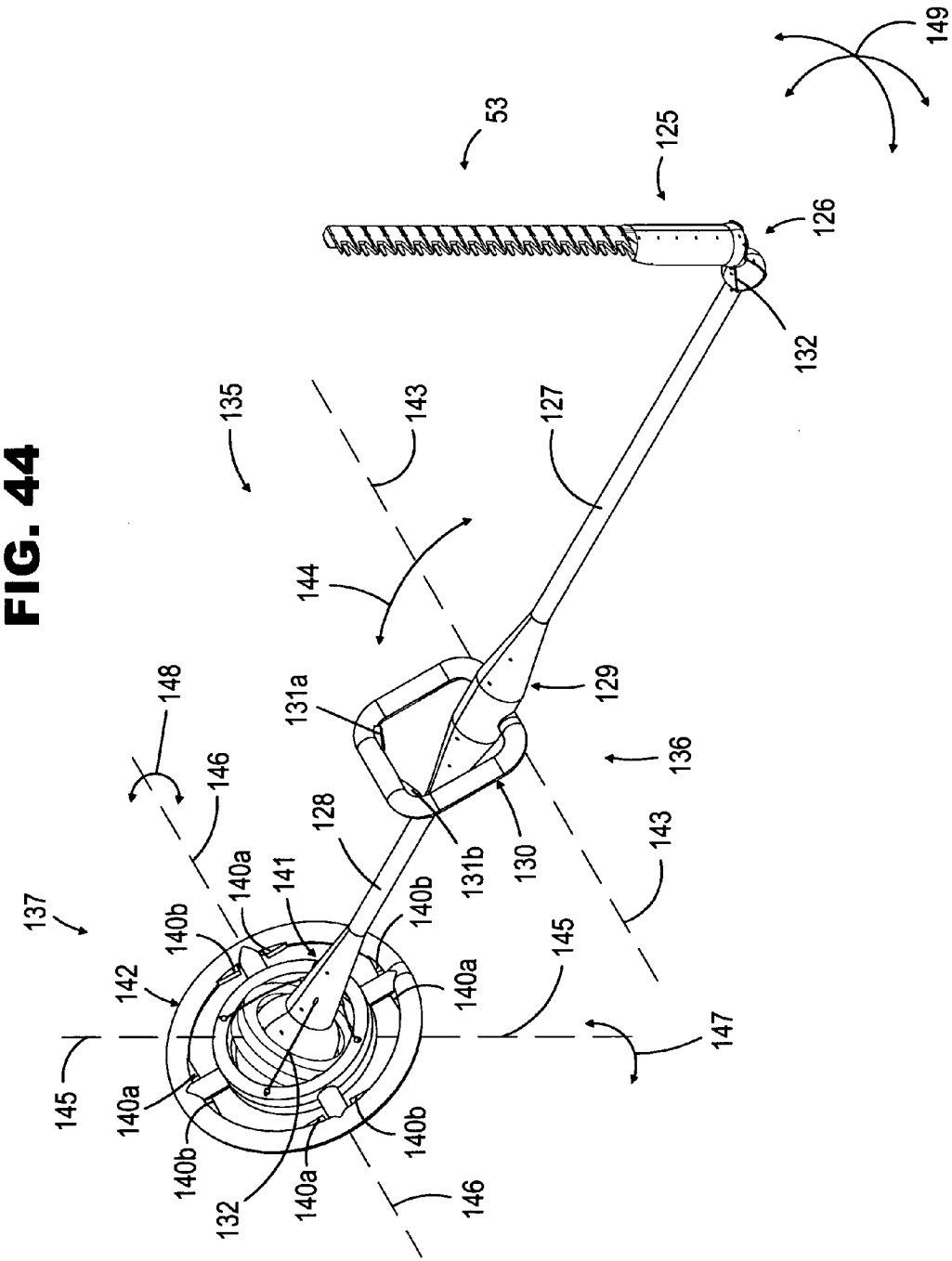
FIG. 44 is a front perspective view of an elongated foliage trimmer, having the cutting section oriented in a 90 degree upright angle relative to the rest of the foliage trimmer.
Figure 45:
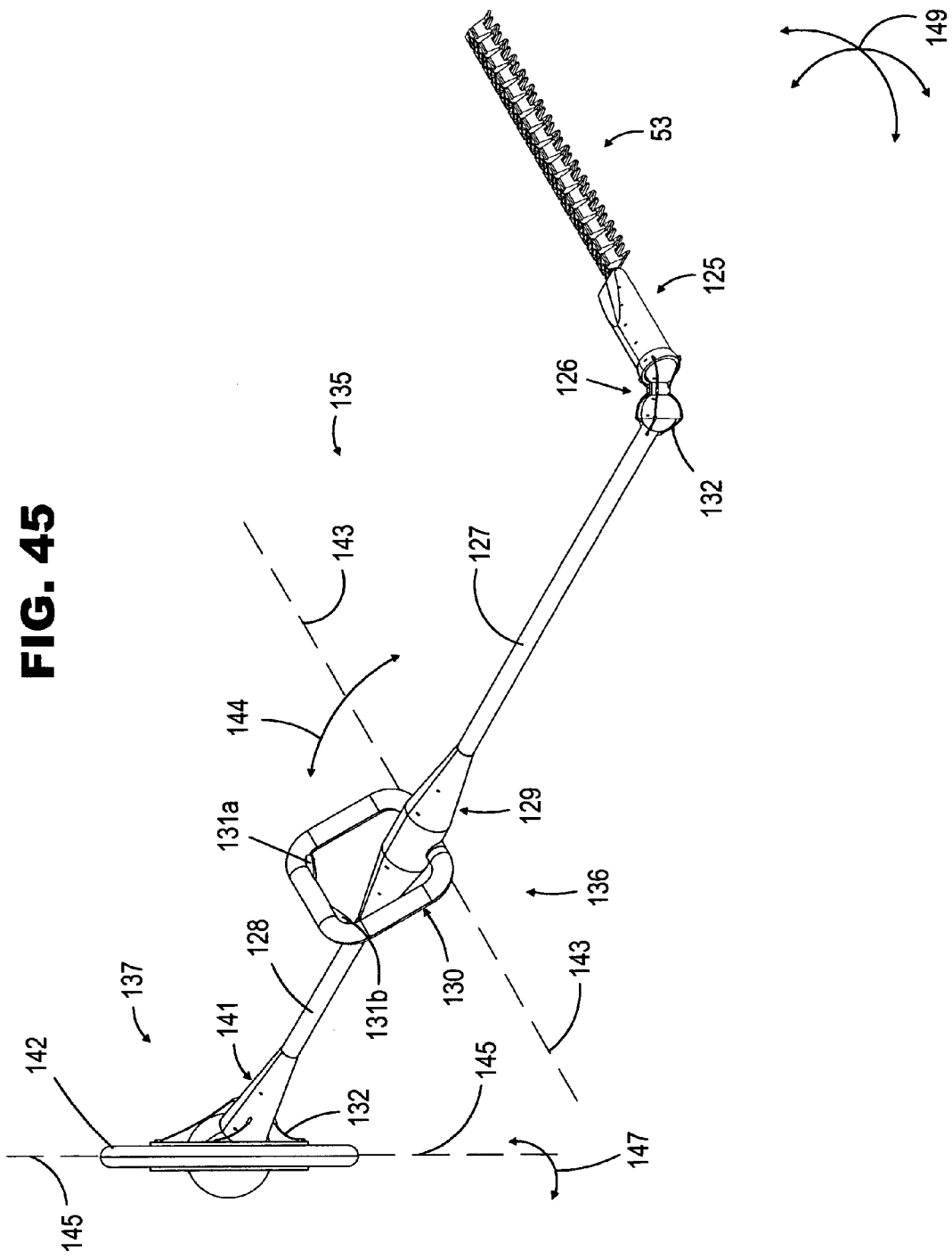
FIG. 45 is a front perspective view of an elongated foliage trimmer, having the cutting section oriented in a 90 degree sideways angle relative to the rest of the foliage trimmer.

A one-hand operated foliage trimmer (116) with adjustable curvature of cutting section as shown in FIGS. 34-36 comprising of a plurality of individual cutting units (117) articulately connected with pins (122) through interlocking hinge members (124) formed into the bases (119) of the cutting units (117). The cutting unit (117), comprises of an electromagnet (not shown) similar to the electromagnets (108, 155 or 115) shown in FIG. 28, 29, 32, 33 that arcually (88) reciprocate a double edged cutting blade (7) thereby causing any foliage to be severed between the double edged cutting blade (7) and the two stationary cutting blades (8) formed into the base (119). The cutting units (117) furthermore comprise of a front strap (120a), ring member (123) and a rear strap (120b) means to secure the units to the operator's hand. The front strap (120a), with ring member (123) and a rear strap (120b) means is attached to body (118) via rivets (121). The rear strap (120b) could be a folded over Velcro type strap that is adjusted to the operator's hand through the ring member (123). The curvature of the cutting section of the foliage trimmer (116) as shown in FIG. 34 is adjusted by adjusting the curvature of the operator's hand. Again, the necessary electronic components that generate a desired alternating current such as wires, rectifiers, diodes, resistors, integrated circuits, switches, etc. are not shown, but are well known to those skilled in the art.

An elongated foliage trimmer (135) as shown in FIGS. 37-45, comprising of a cutting section (53), a head body (125), a joint member (126), a front extension tube (127), a front handle curvature adjuster mechanism (136), a rear extension tube (128), and a rear handle mechanism (137) for the spatial orientation of trimmer head body (125) in the many possible hemispherical directions indicated by arrow (149).

The cutting section (53) is made up of a plurality of cutting units (10) articulately connected to each other and trimmer head body (125), via pins (17). The trimmer head body (125) is made up of two relatively symmetrical clamshells (125a, 125b) (as shown in FIGS. 42-52), secured to each other through the openings (177, 179) of clamshells (125a, 125b) respectively, via screws (182). The cutting units (10) are also connected to each other and trimmer head body (125), via a flexible scissor type mechanism (11) secured to top of cutting unit (10) bodies (20) with screws (14) into openings (42). A mounting bracket (178) (shown in FIG. 46-48, 51, 52) formed onto the right clamshell (125a) is provided to allow the securing of the end of the scissor type mechanism (11) to the right clamshell (125a) with a screw (14). The purpose of the flexible scissor type mechanism (11) is to maintain equidistant spacing between cutting units (10) to prevent the distortion of cutting section (53) in its linear position and to facilitate the formation of an even curvature of cutting section (53). The flexible scissor type mechanism (11) flexes and conforms to a convex shape as the cutting section (53) is adjusted as shown in FIG. 42, 43, 52.

Figure 46:
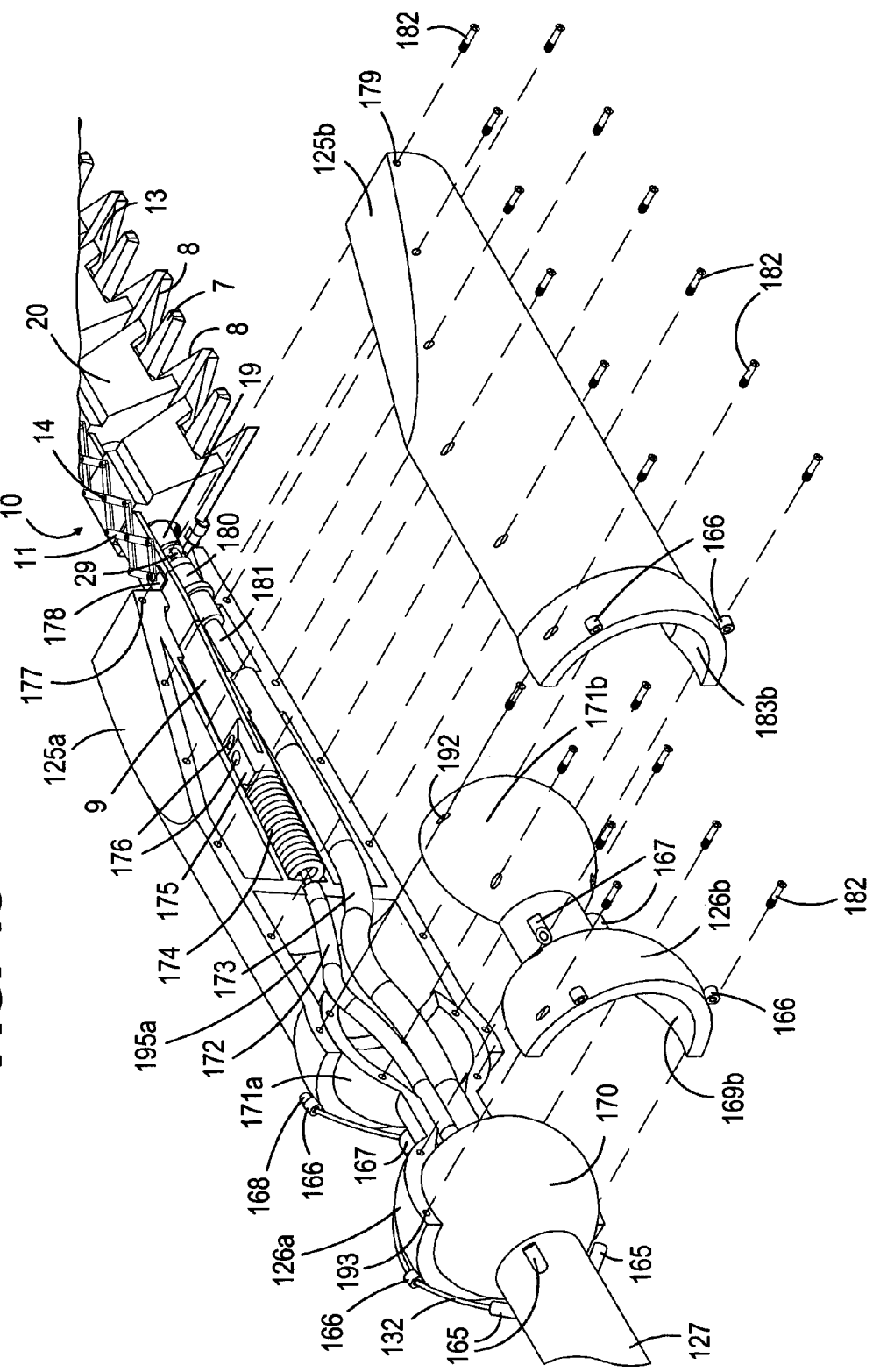
FIG. 46 is a rear exploded view of the trimmer head body.
Figure 47:
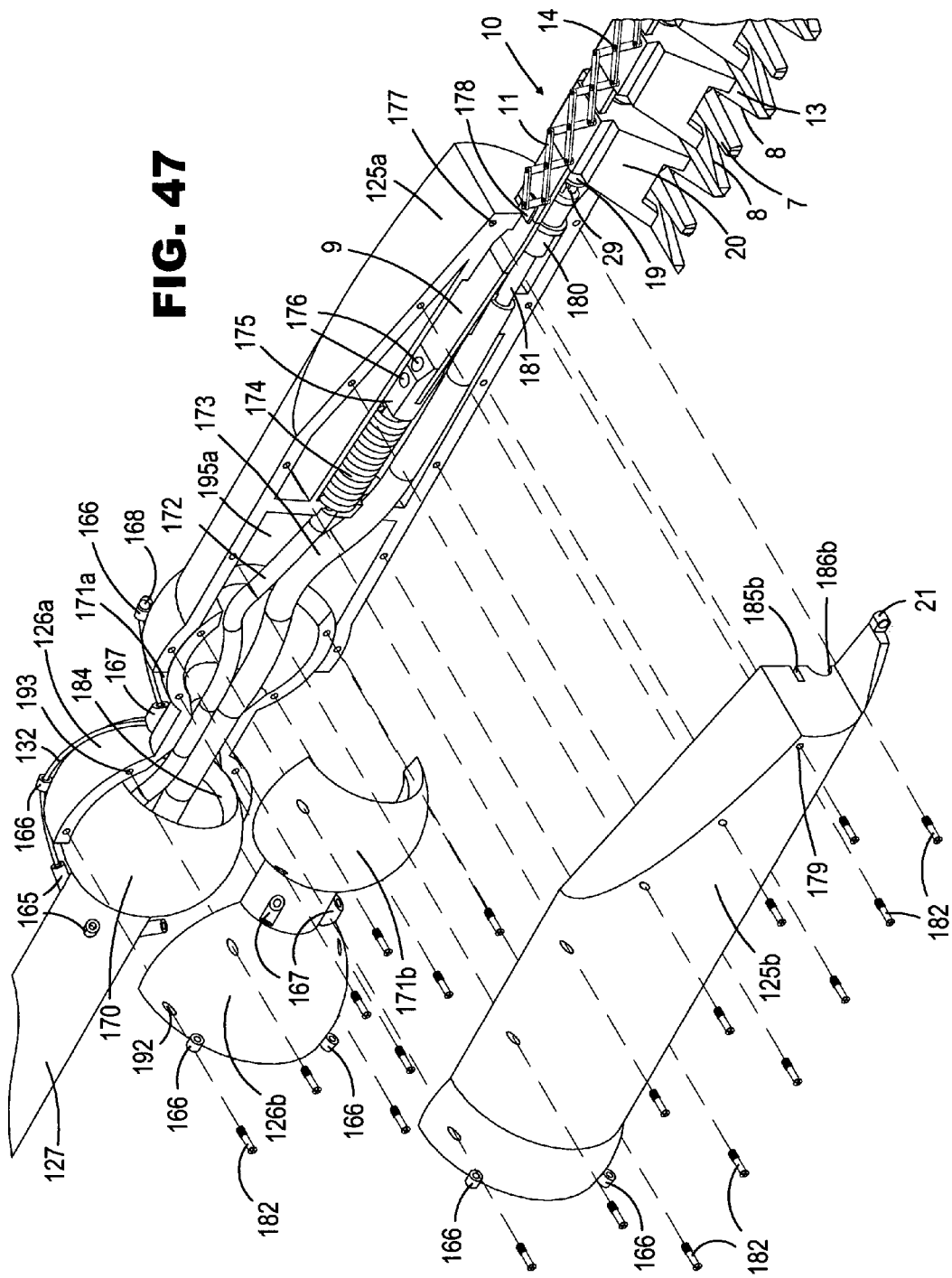
FIG. 47 is a front exploded view of the trimmer head body.
Figure 53:
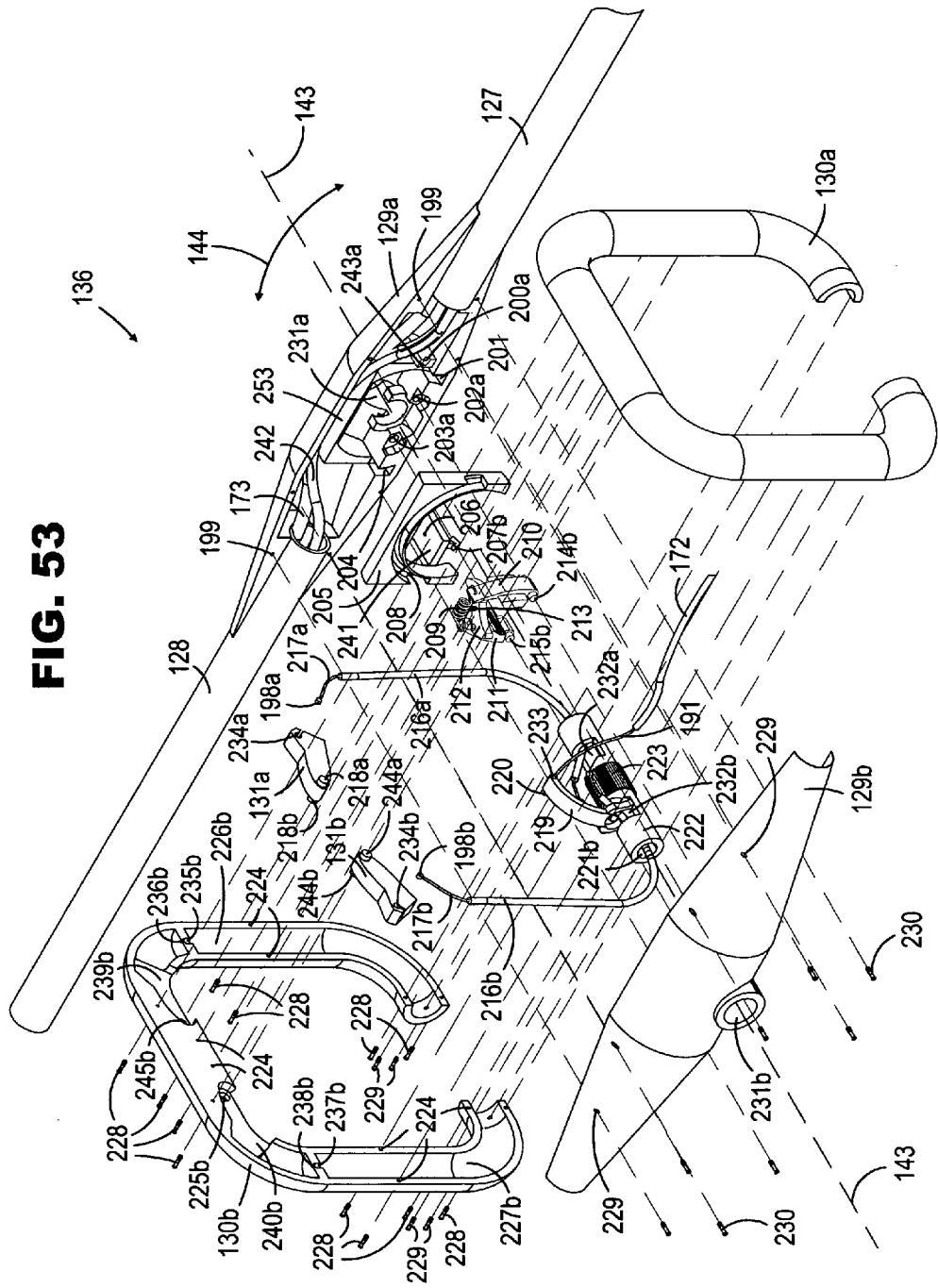
FIG. 53 is an exploded view of the front handle and curvature adjuster mechanism.
Figure 59:
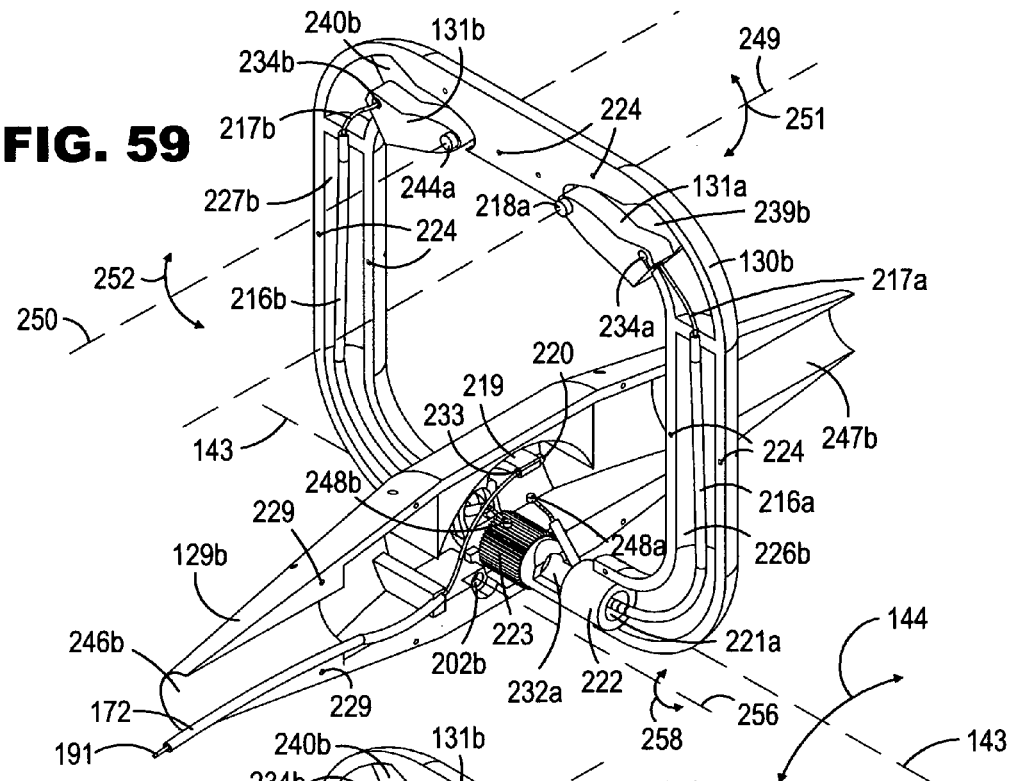
FIG. 59 is a front perspective view of the curvature adjuster mechanism.
Figure 60:
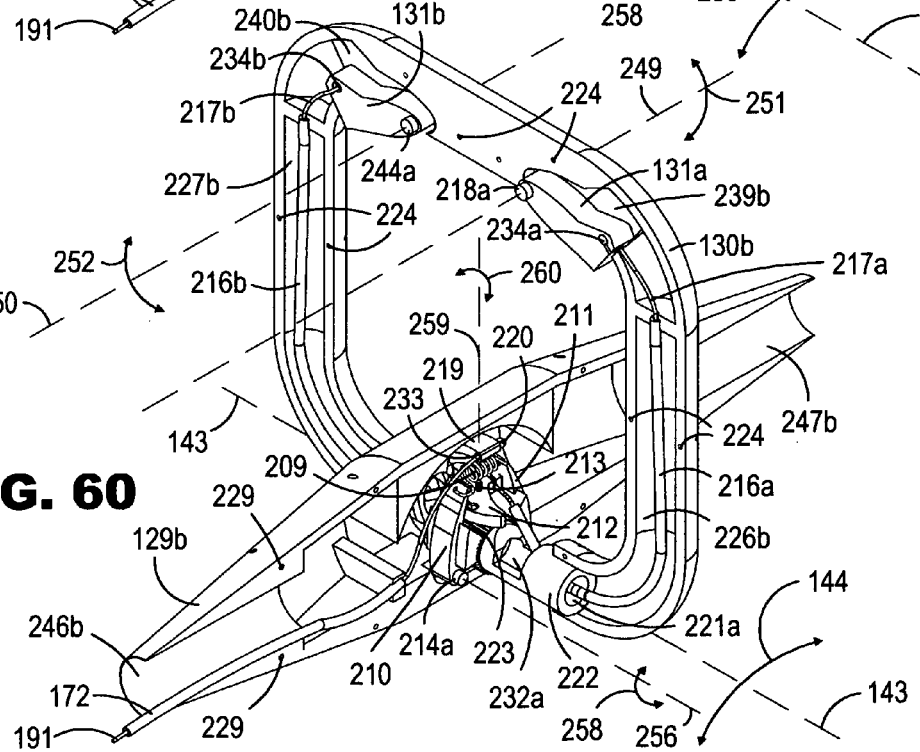
FIG. 60 is a front perspective view of the curvature adjuster mechanism.
Figure 61:
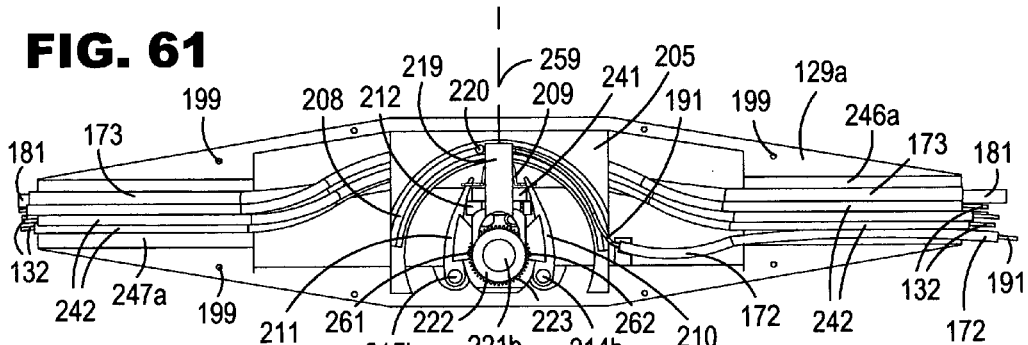
FIG. 61 is a side elevational view of the curvature adjuster mechanism showing the restraining mechanism in the locked position.

The front handle curvature adjuster mechanism (136) (as shown in FIGS. 53-71), is composed of a body (129) made of two relatively symmetrical clamshells (129a, 129b) secured to each other via screws (230) through openings (199, 229). The symmetrical recesses (246a, 246b) formed into clamshells (129a, 129b) respectively, firmly secure the front extension tube (127) therewithin. And the symmetrical recesses (247a, 247b) formed into clamshells (129a, 129b) respectively, firmly secure the rear extension tube (128) therewithin. The flexibly rotatable drive shaft (181) encased in the flexible sleeve (173) and the four flexible control cable sleeves (242) having flexible, slidable inner wires (132) are situated in the recess (253) as shown in FIG. 53, 56, 61, 62. A tubular shaft (222) as shown in FIG. 53, 55, 56, 59-64 is rotatably situated through openings (231a, 231b) of clamshells (129a, 129b) respectively, and situated so the outermost ends of tubular shaft (222) protrudes outside the clamshells (129a, 129b). The tubular shaft (222) having openings (221a, 221b) and openings (232a, 232b) formed therewithin to accommodate the flexible release cable sleeves (216a, 216b) therethrough, and a gear (223) is formed thereon. Also an arm (219) having an opening (233) is integrally formed onto tubular shaft (222). The front handle (130) made of two relatively symmetrical clamshells (130a, 130b) secured to each other via screws (228) through openings (254, 224) and securely attached to the outermost protruding ends of the tubular shaft (222) with screws (229). The clamshells (130a, 130b) of front handle (130) have two release lever (131a, 131b) cavities formed therewithin. Each cavity is made of two symmetrical recesses (239a, 239b and 240a, 240b) and have tubular recesses (245a, 245b and 225a, 225b) respectively formed therewithin to pivotally accommodate the pins (218a, 218b and 244a, 244b) formed onto the two release levers (131a, 131b) respectively. The release levers (131a, 131b) are pivotally displaceable around pivot axes (249, 250) respectively in the directions indicated by arrows (251, 252) respectively. The two release levers (131a, 131b) have recesses (234a, 234b) respectively formed therewithin to securely accommodate the terminating caps (198a, 198b) respectively of the release wires (217a, 217b) respectively. The top ends of the flexible release cable sleeves (216a, 216b) are secured into recesses (235a, 235b and 237a, 237b) respectively, and the release wires (217a, 217b) are allowed to freely slide through recesses (236a, 236b and 238a, 238b) respectively while the flexible release cable sleeves (216a, 216b) are freely situated within the cavities formed from symmetrical recesses (226a, 226b and 227a, 227b) respectively. The bottom ends of the flexible release cable sleeves (216a, 216b) are secured into openings (266a, 266b) respectively of cable sleeve holders (207a, 207b) respectively that are integrally formed onto support member (241) of separating member (205) and the release wires (217a, 217b) are allowed to freely slide therethrough. The separating member (205) shown in FIG. 53, 56, 61, 62, 69-71 has an arcual channel (208) formed therewithin to allow free a clear movement of arm (219) with capped (220) curvature adjustor wire (191) attached through opening (233) in arm (219). The rear end of curvature adjuster cable sleeve (172), that slidably accommodates the curvature adjustor wire (191), is secured into recesses (200a, 200b) formed into clamshells (129a, 129b) respectively and allows the curvature adjustor wire (191) to slidably operate through the recesses (243a, 243b). The curvature adjuster cable sleeve (172), that slidably accommodates the curvature adjustor wire (191), is continually situated through the front extension tube (127) and through opening (184) and flexibly through the hollow clamshells (126a, 126b) of joint member (126) and flexible through cavities (195a, 195b) of clamshells (125a, 125b) respectively of trimmer head body (125) and is secured into recesses (189a, 189b), continually the curvature adjustor wire (191), slidably through openings (196a, 196b) and through the resiliently restraining spring (174) is secured into connecting member (175), which is attached to the flexible curvature adjuster band (9) via rivets (176) as shown in FIG. 46, 47, 51, 52. The separating member (205) is secured in place via the recesses (201, 204) formed into clamshell (129a) and separates the arm (219) from the flexibly rotatable drive shaft (181) encased in the flexible sleeve (173) and the four flexible control cable sleeves (242) having flexible, slidable inner wires (132) that are situated in the recess (253) of the clamshell (129a). A pair of opposing restraining arms (210, 211) with concave gear teeth faces (262, 261) respectively formed thereon, and via their two pins (214a, 214b and 215a, 215b) respectively, are pivotally situated within two sets of two tubular recesses (202a, 202b and 203a, 203b) respectively. The resiliently restraining spring (209) through openings (264, 265) of the opposing restraining arms (210, 211) respectively, exerts a restraining force and forces the opposing restraining arms (210, 211) towards the gear teeth of gear (223) to maintain a locked and secured condition of the front handle curvature adjuster mechanism (136) as shown in FIG. 56, 60, 61, 63, thereby securing the curvature of the cutting section (53). A rotating separator member (212) situated in between and abutting the inner side of the opposing restraining arms (210, 211) is rotatable mounted with screw (213) through opening (267) into opening (206) of support member (241) of separating member (205). This rotating separator member (212) has recesses (263a, 263b) formed therewithin to securely accommodate the terminating caps (248a, 248b) respectively of the release wires (217a, 217b) respectively.

Figure 62:
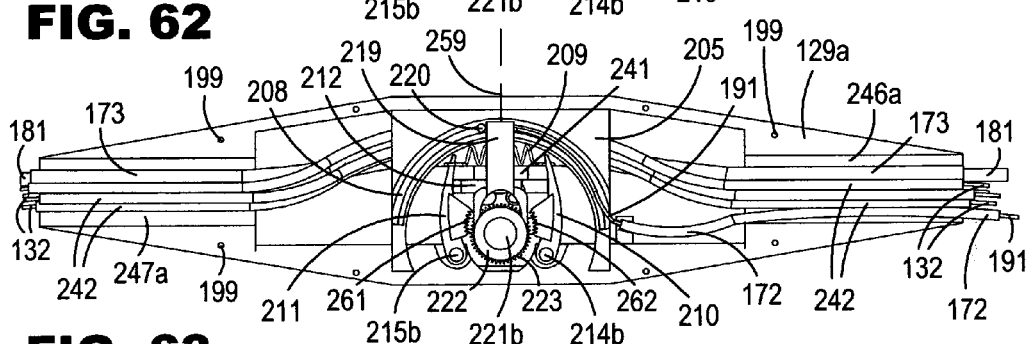
FIG. 62 is a side elevational view of the curvature adjuster mechanism showing the restraining mechanism in the unlocked position.
Figure 63:
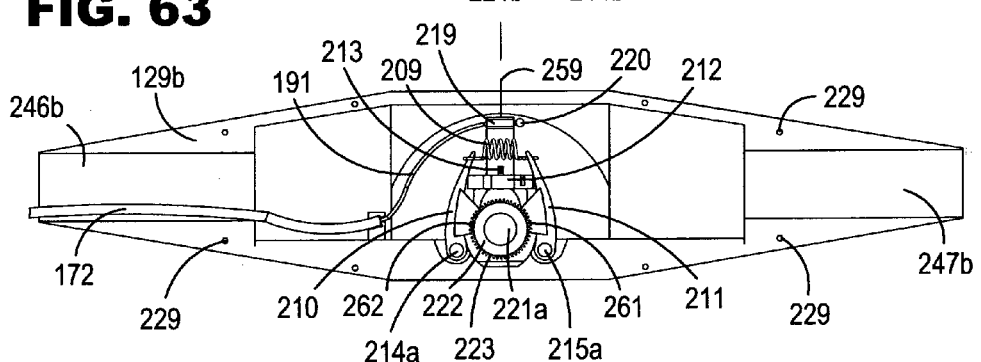
FIG. 63 is a side elevational view of the curvature adjuster mechanism showing the restraining mechanism in the locked position.
Figure 64:
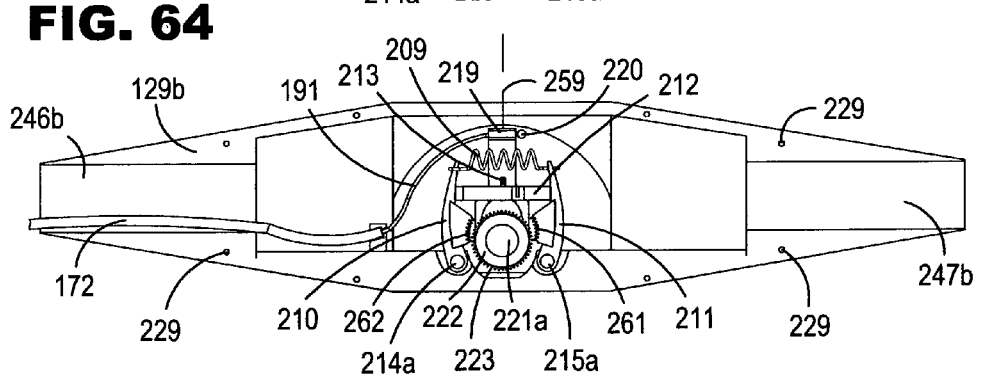
FIG. 64 is a side elevational view of the curvature adjuster mechanism showing the restraining mechanism in the unlocked position.
Figure 65:
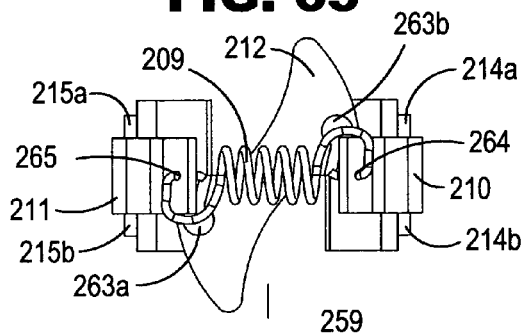
FIG. 65 is a plan view showing the restraining mechanism in the locked position.
Figure 66:
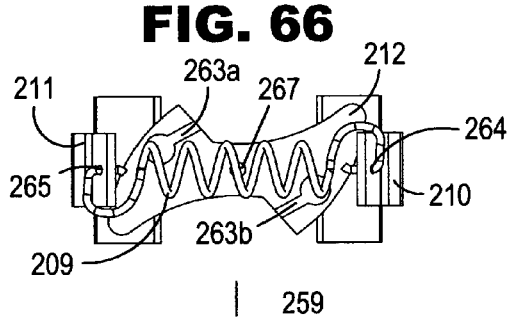
FIG. 66 is a plan view showing the restraining mechanism in the unlocked position.
Figure 67:
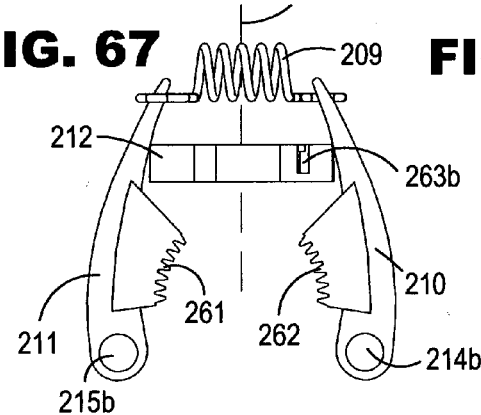
FIG. 67 is a side elevational view showing the restraining mechanism in the locked position.
Figure 68:
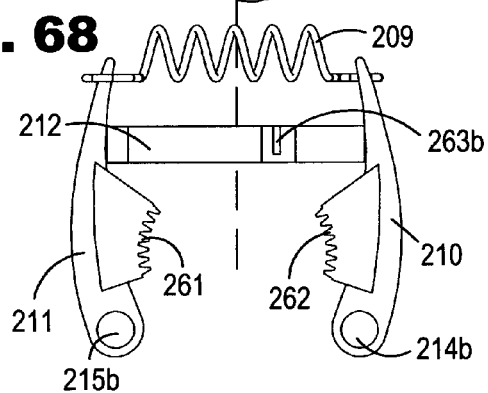
FIG. 68 is a side elevational view showing the restraining mechanism in the unlocked position.
Figure 69:
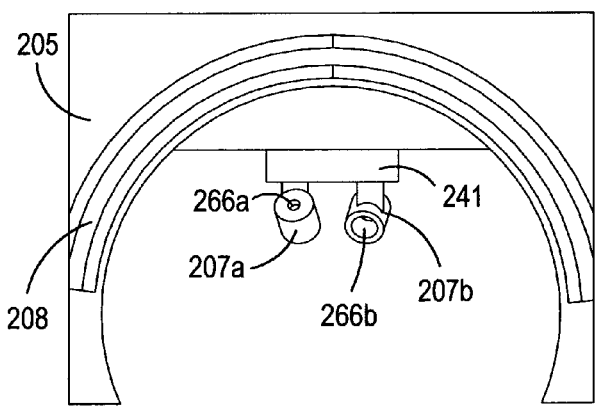
FIG. 69 is a side elevational view of the separating member.
Figure 70:
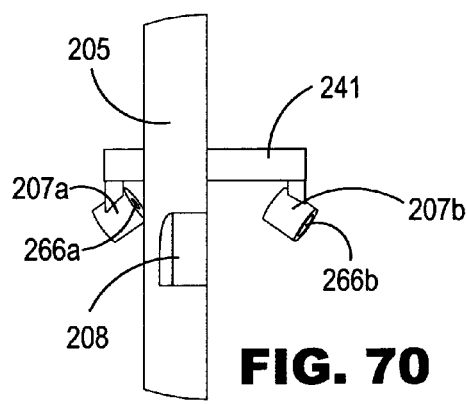
FIG. 70 is a rear elevational view of the separating member.
Figure 71:
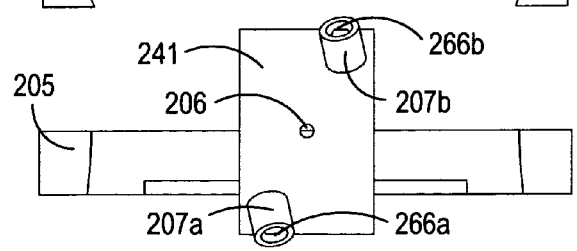
FIG. 71 is a bottom view of the separating member.

The curvature of the cutting section (53) is adjusted with one hand on the front handle (130) of the curvature adjuster mechanism (136) and the other hand on rear handle (142) or on the rear extension tube (128) with fingers engagingly pushing on at least one of the release levers (131a, 131b) of front handle (130), and displacing them around pivot axes (249, 250) respectively, (as shown in FIG. 55 the displaced release lever (131b)), thereby engagingly pulling on at least one of the release wires (217a, 217b) and causing the rotating separator member (212) to rotate around axis (259) and displace the opposing restraining arms (210, 211) around pivot axes (256, 255) respectively, away from tubular shaft (222) as shown in FIG. 62, 64, 66, 68 and disengaging the gear teeth faces (262, 261) of restraining arms (210, 211) respectively from gear (223) of tubular shaft (222), thereby allowing free movement of front handle (130) around pivot axis (143) in the direction indicated by arrow (144). To change the curvature of the cutting section (53), from linear to convex as shown in FIG. 42, 43, the front handle (130) is pivoted around pivot axis (143) towards the front of the elongated hedge trimmer (135) thereby allowing the curvature adjustor wire (191) to slide through the curvature adjuster cable sleeve (172), thereby causing the resiliently restraining spring (174) to release the stored energy in it and push the connecting member (175) and the flexible curvature adjuster band (9), attached thereto, slidably through openings (185a, 185b) and causing the curvature of cutting section (53) to change to the desired convex shape that is needed to properly trim the foliage. When the desired curvature of cutting section (53) is established, with the release of the depressed release lever (131a or 131b) of front handle (130), disengaging the engaged release wire (217a or 217b) and causing the rotating separator member (212) to return to its original position, and cause the resiliently restraining spring (209) through openings (264,265) of the opposing restraining arms (210, 211) respectively to pull the opposing restraining arms (210, 211) towards the gear (223) of tubular shaft (222) and engaging the gear teeth faces (262, 261) of restraining arms (210,211) respectively thereto, thereby securing the curvature of the cutting section (53) into the desired fixed position. And to change the curvature of the cutting section (53) from convex to linear, the front handle (130) is pivoted around pivot axis (143) towards the rear of the elongated hedge trimmer (135) thereby changing the curvature of the cutting section (53) from convex to linear.

The rear body (141) of the rear handle mechanism (137) (as shown in FIGS. 72-90), is composed of two relatively symmetrical clamshells (141a, 141b) secured to each other via screws (360) through the openings (304, 317) of clamshells (141a, 141b) respectively. The symmetrical recesses (301a, 301b) formed into clamshells (141a, 141b) respectively, firmly secure the rear extension tube (128) therewithin as shown in FIG. 73, 82-87. And the symmetrical recesses (302a, 302b) formed into clamshells (141a, 141b) respectively, securely accommodate control wire guide member (329) therewithin. And the symmetrical recesses (307a, 307b) formed into clamshells (141a, 141b) respectively, securely accommodate release wire guide member (330) therewithin. And the symmetrical cavities (305a, 305b) formed into clamshells (141a, 141b) respectively, slidably accommodate the restraining cone (328) and allows it to slide in the direction indicated by arrow (368) therewithin. The restraining cone (328) as shown in FIG. 82-87, 88, 89, freely slides on the surface (331) of protruding member of control wire guide member (329) and on the surface (337) of release wire guide member (330) thereon. In between the restraining cone (328) and the release wire guide member (330) the resiliently restraining spring (327) securely situated.

Figure 72:
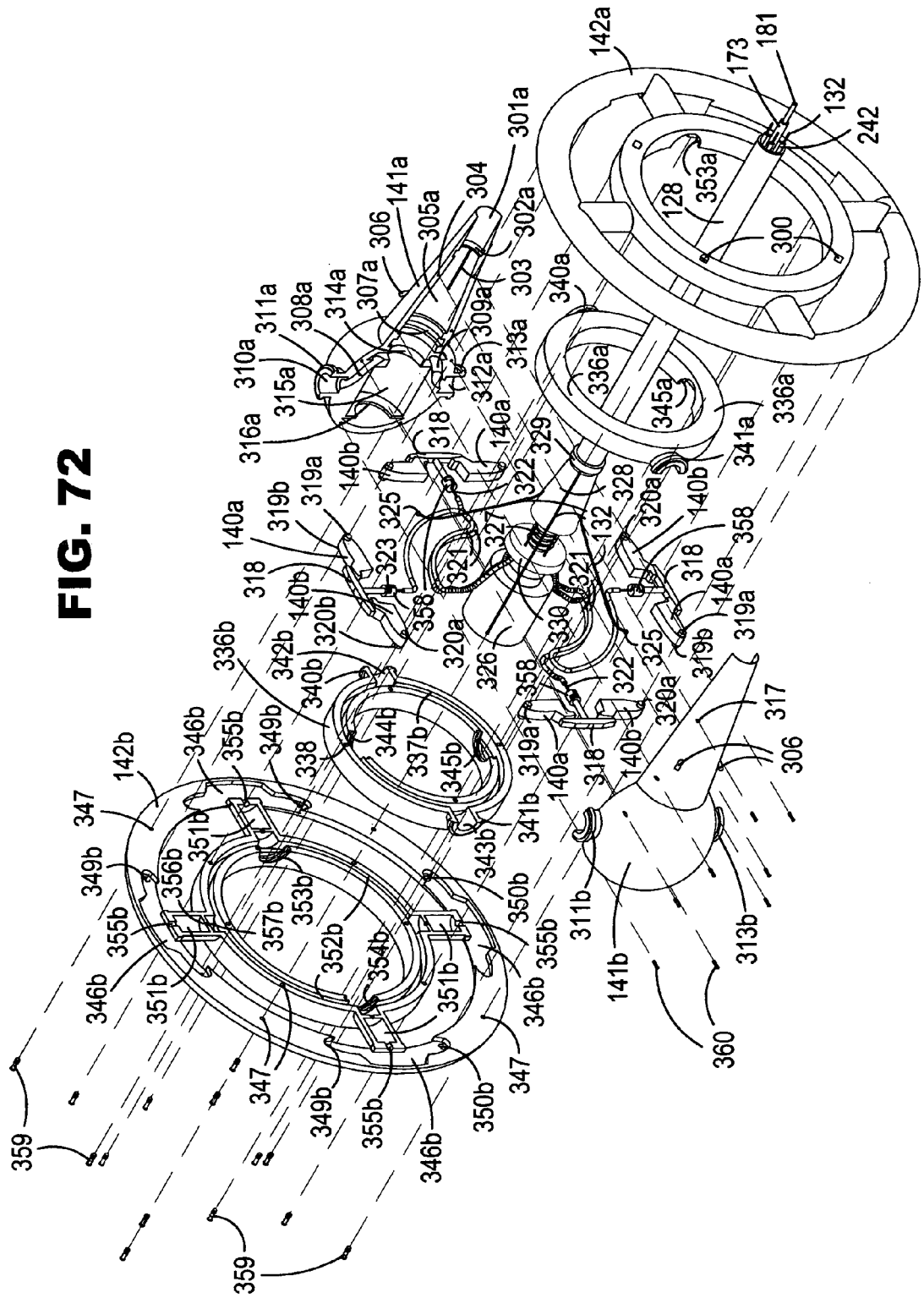
FIG. 72 is an exploded view of the rear handle mechanism for restraining and adjusting the spatial orientation of the trimmer head body and cutting section attached thereto.
Figure 73:
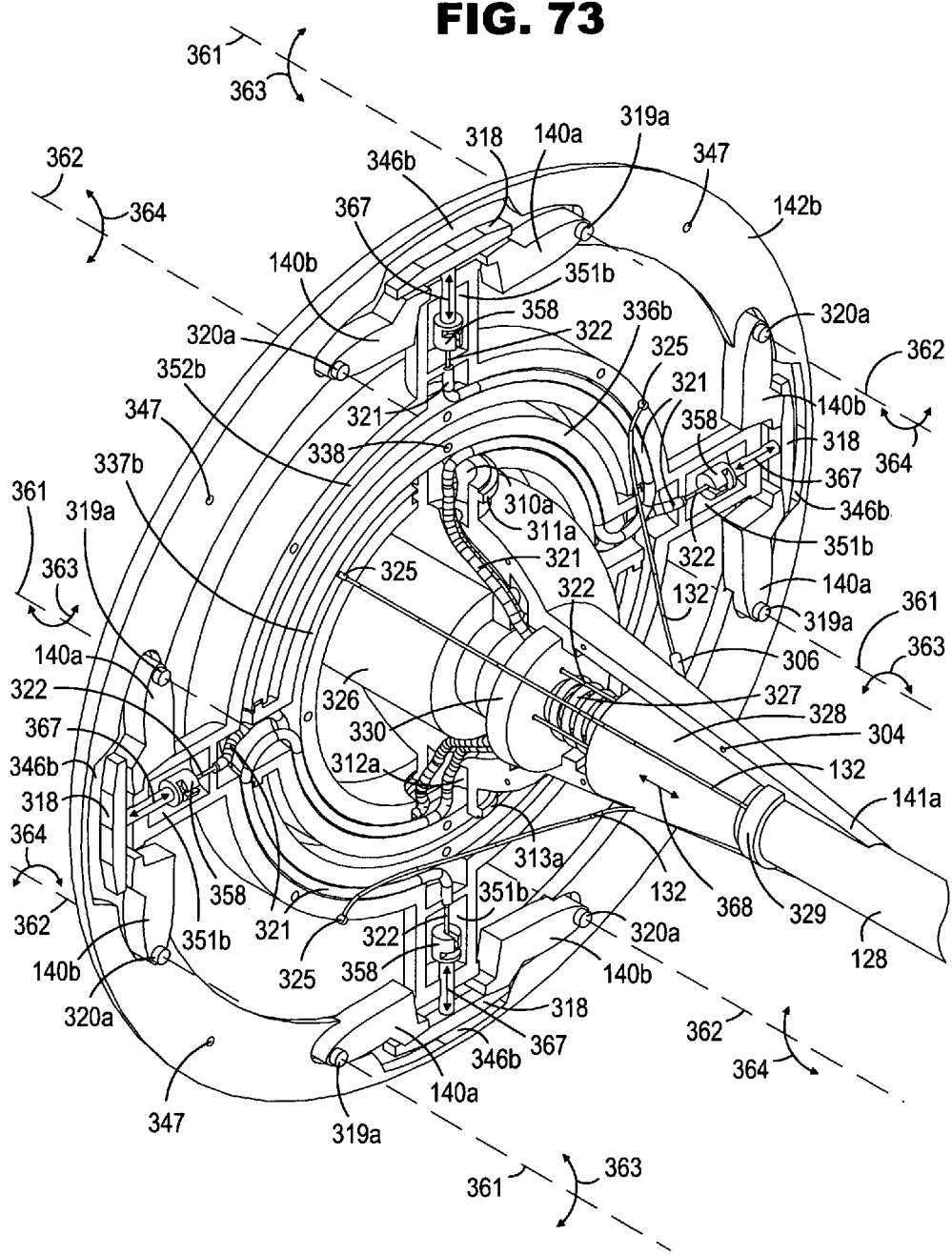
FIG. 73 is a front perspective view of the rear handle mechanism.
Figure 78:
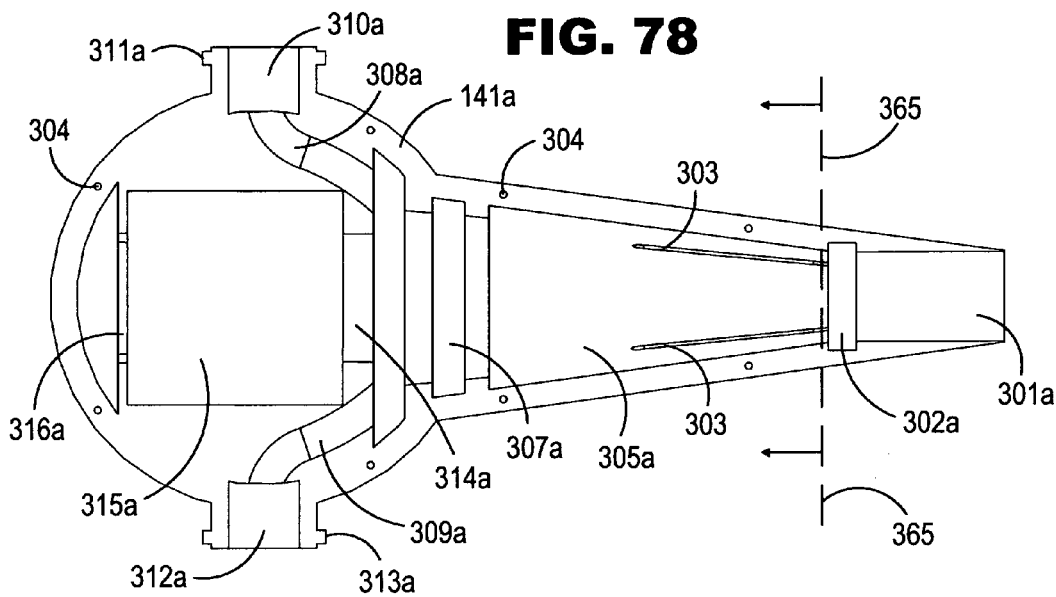
FIG. 78 is a side elevational view of left clamshell of the rear handle mechanism.
Figure 79:
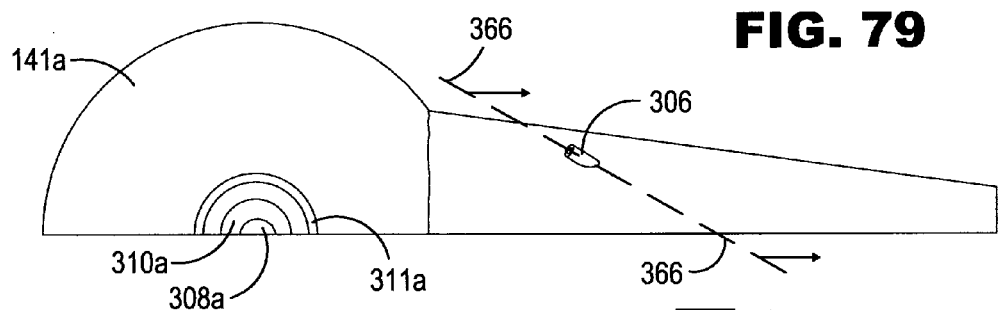
FIG. 79 is a plan view of left clamshell of the rear handle mechanism.
Figure 84:
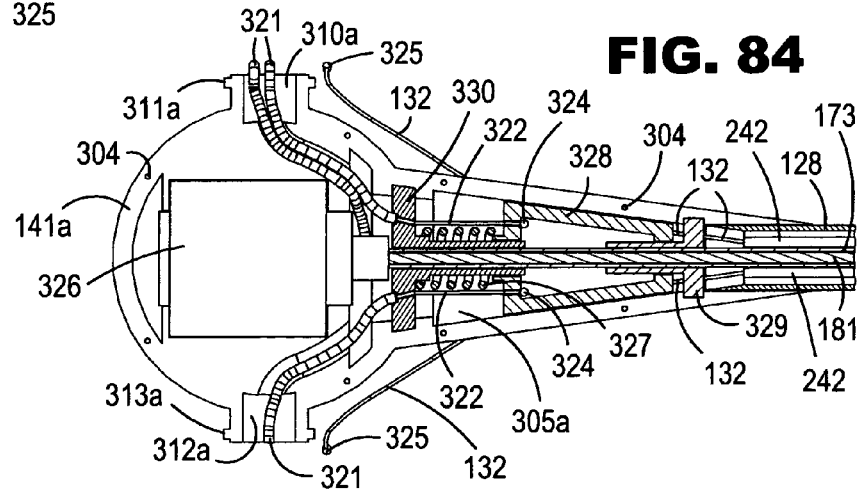
FIG. 84 is a side elevational view and fragmentary sectional view, taken on line 370-370 of FIG. 82, of the internal parts of the restraining mechanism, showing the cable securing cone in the locked position.

The motor (326) as shown in FIG. 72, 73 can be electric and be powered by rechargeable batteries (not shown) or electricity from any outlet (not shown) or from an electricity generator (not shown). The elongated foliage trimmer (135) can also be powered by a gasoline engine (not shown) or compressed air generated by an air compressor (not shown). Also not depicted and not described are the on-off switch, including the conventional dual switching mechanism which is customary on such equipment to ensure the safe operation of the equipment, and the electrical wiring and other electrical and mechanical components which are necessary for the proper operation of the elongated foliage trimmer (135), but are well known to those skilled in the art. The motor (326) is securely encased in recesses (314a, 314b, 315a, 315b, 316a, 316b) formed into clamshells (141a, 141b) of rear body (141). The motor (326) is connected to the flexibly rotatable drive shaft (181) encased in the flexible sleeve (173) that is situated through opening (338) of release wire guide member (330) and through restraining cone (328) and through opening (332) of control wire guide member (329), as shown in FIG. 84, 87, and continually situated through the rear extension tube (128) and flexibly continually situated through the curvature adjuster mechanism body (129) in recess (253) as shown in FIG. 53, 56, 61, 62, and continually situated through the front extension tube (127) and through opening (184) and flexibly through the hollow clamshells (126a, 126b) of joint member (126) and flexible through cavities (195a, 195b) of clamshells (125a, 125b) respectively of trimmer head body (125) and flexible through openings (188a, 188b) and the cable sleeve (173) is secured into recesses (187a, 187b) as shown in FIG. 46, 47, 51, 52. The flexibly rotatable drive shaft (181), rotatably through openings (194a, 194b) connected to a power transfer shaft member (180), rotatably through openings (186a, 186b) and attached via a universal joint (29) connected to a female coupling (19) slidably engaging the male coupling (18) of cutting unit (10) contiguous to trimmer head body (125), thereby transferring power from the motor (326) to the cutting units (10).

In FIGS. 72-77 the two symmetrical clamshells (336a, 336b) form the articulated connecting member, secured to each other with screws (359) through openings (339, 338), which is rotatably attached via the circular rotational guide collars (311a, 311b and 313a, 313b) of clamshells (141a, 141b) respectively of rear body (141) via recess (344a, 344b and 345a, 345b) of the symmetrical clamshells (336a,336b) respectively, and is rotatable around axis (145) in the directions indicated by arrow (147). The rear handle (142) is composed of two symmetrical clamshells (142a, 142b) secured to each other with screws (359) through openings (348, 347), which is rotatably attached via the circular rotational guide collars (340a, 340b and 341a, 341b) of clamshells (336a, 336b) respectively and via recess (353a, 353b and 354a, 354b) of the symmetrical clamshells (142a, 142b) respectively, and is rotatable around axis (146) in the directions indicated by arrow (148). The clamshells (142a, 142b) of rear handle (142) have four release lever cavities formed thereinto. Each cavity is made of two symmetrical recesses (346a, 346b) and have tubular recesses (349a, 349b and 350a, 350b) respectively, formed thereinto to pivotally accommodate the pins (319a, 319b and 320a, 320b) formed onto the four sets of two opposing release levers (140a, 140b) respectively. The release levers (140a, 140b) are pivotally displaceable around pivot axes (361, 362) respectively in the directions indicated by arrows (363, 364) respectively. The four sets of two opposing release levers (140a, 140b) are situated relative to the T-shaped member (318) in such a way that when force is applied to any one of the release levers (140a, 140b), they push the T-shaped member (318) towards the outer edge of the rear handle (142) indicated by arrow (367) (as shown in FIG. 90). The recesses (355a, 355b) and the cavities (351a, 351b) formed into the clamshells (142a, 142b) respectively, of rear handle (142) allow the T-shaped member (318) to slide freely therewithin. The T-shaped member (318) have a recess (372) formed into its lower part (358) that can securely accommodate the terminating cap (323) of the release wire (322) therewithin. One end of release cable sleeve (321) slidably accommodating release wire (322) therethrough is secured into recesses (357a, 357b) of rear handle (142a, 142b) respectively allowing release wire (322) to freely slide through recesses (356a, 356b) of rear handle (142a, 142b) respectively. Two of the four release cable sleeves (321) with release wires (322) slidably therewithin are continually situated through the opposing symmetrical circular channels (352a, 352b) formed into the clamshells (142a, 142b) respectively of rear handle (142) and continually into the cavities (342a, 342b and 343a, 343b). And from that point on all four of the release cable sleeves (321) with release wires (322) slidably therewithin are situated continually through the cavities (342a, 342b and 343a, 343b) and continually through the opposing symmetrical circular channels (337a, 337b) formed into the clamshells (336a, 336b) respectively of the articulated connecting member and continually through, the cavities (310a, 310b and 312a, 312b) and continually through the opposing symmetrical channels (308a, 308b an 309a, 309b) formed into the clamshells (141a,141b) respectively of rear body (141), and the other end of the release cable sleeves is secured into the openings (339) or release wire guide member (330) allowing the release wires (322) to slide therethrough and continually through openings (335) of restraining cone (328) and terminated by caps (324) as shown in FIG. 84, 87.

Figure 80:
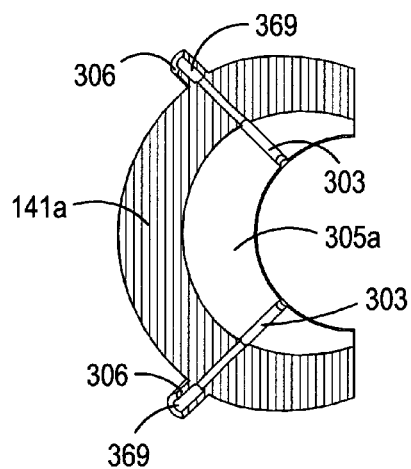
FIG. 80 is a cross-sectional view taken on line 366-366 of FIG. 79 of the left clamshell of the rear handle mechanism.
Figure 81:
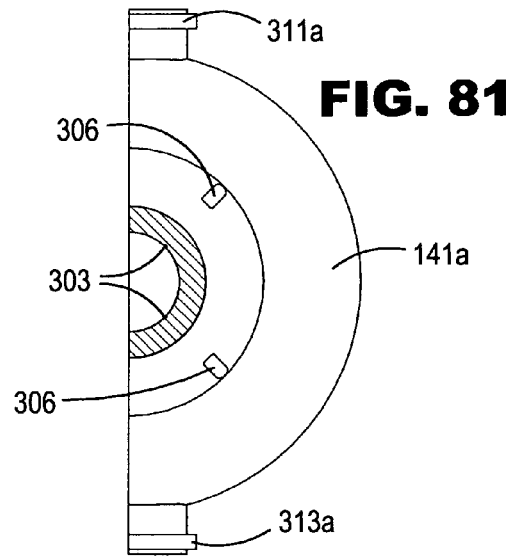
FIG. 81 is a cross-sectional view taken on line 365-365 of FIG. 78 of the left clamshell of the rear handle mechanism.
Figure 82:
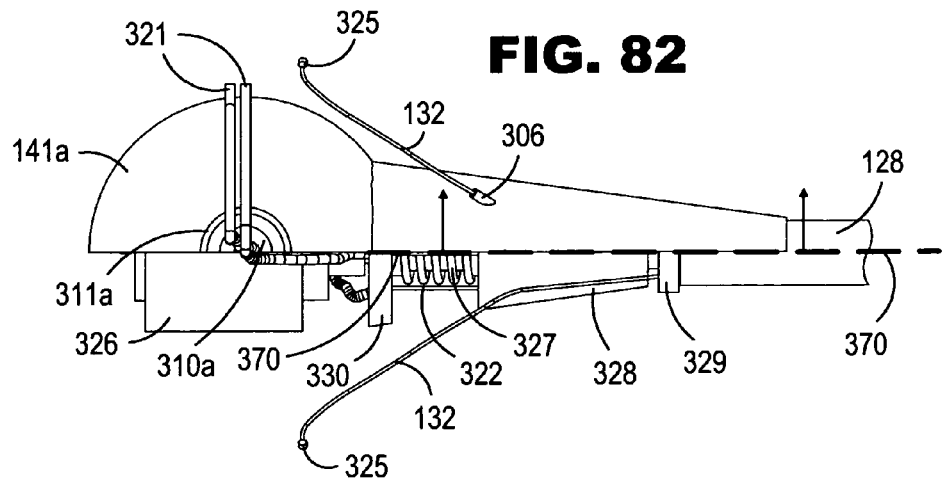
FIG. 82 is plan view of the rear handle mechanism, showing the cable securing cone in the locked position.
Figure 83:
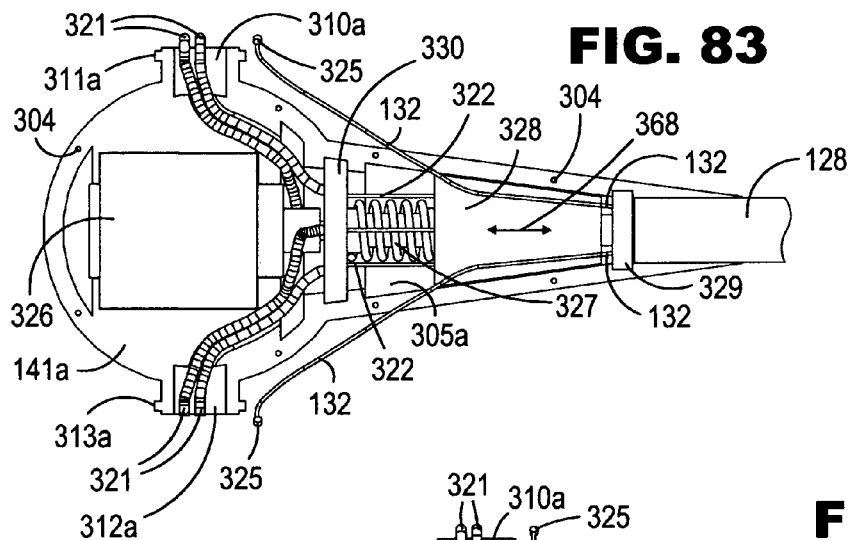
FIG. 83 is a side elevational view of the rear handle mechanism, showing the cable securing cone in the locked position.

The four capped ends (325) of the four control wires (132) are situated through the four wire brackets (300) formed onto clamshell (142a) of rear handle (142) and continually slidably through the openings (369) of the four protruding control wire guide tubes (306) and continually situated (slidably only when the restraining cone (328) is in the unrestrained position as shown in FIGS. 85-87, otherwise the control wires are restrained and secured by the force of the resiliently restraining spring (327) pressing on the restraining cone (328) and pressing the control wires (132) against the wire grooves (303) of clamshells (141a,141b) of rear body (141)) between the four wire grooves (303) of clamshells (141a,141b) and the restraining cone (328), (a cross section of the opening (369) of the protruding control wire guide tubes (306) and the wire grooves (303) is shown in FIG. 80, 81), and continually slidably through the openings (333) of the control wire guide member (329) and continually slidably through the four flexible control cable sleeves (242) and continually slidably through the four protruding control wire guide tubes (165) and continually slidably through the four control wire guide brackets (166) and through the four control wire guide brackets (167) of clamshells (126a, 126b) of joint member (126) and continually through the four control wire brackets (166) of clamshells (125a, 125b) of trimmer head body (125) and terminally secured by the four caps (168).

The control wires (132) exposed to the elements could have individual flexible protective slidable tubular bellows type sleeves (not shown) to protect control wires (132) from dirt and debris between wire brackets (300) and protruding control wire guide tubes (306); and also between control wire guide brackets (166) and protruding control wire guide tubes (165); and also between control wire guide brackets (166) and control wire guide brackets (167); and also between control wire guide brackets (167) and control wire brackets (166).

The hemispherical spatial orientation of the trimmer head body (125) and cutting section (53) attached thereto is achieved via the rear handle mechanism (137). With one hand securely on the front handle (130) or on the rear extension tube (128) of the curvature adjuster mechanism (136) and the other hand on rear handle (142) with fingers engagingly pushing on at least one of the four sets of two opposing release levers (140a, 140b) of rear handle (142), and displacing them around pivot axes (361, 362) respectively, towards the outer edge of rear handle (142) (as shown in FIG. 90 the displaced release lever (140b)), thereby engagingly pushing on one of the protruding arm of the T-shaped member (318) thereby pulling on the release wire (322) and causing the restraining cone (328) to compress the resiliently restraining spring (327) and displace the restraining cone (328) towards the release wire guide member (330) as shown in FIGS. 85-87 and allowing the free movement of control wires (132). To change the hemispherical spatial orientation of the trimmer head body (125) and cutting section (53) attached thereto as shown in FIGS. 40-45, the rear handle (142) is rotated around axis (146) in the directions indicated by arrow (148) or rotated around axis (145) in the directions indicated by arrow (147) thereby forcing the four control wires (132) to slidably move the trimmer head body (125) on the concave surfaces (183a, 183b) formed into clamshells (125a,125b) respectively, on the convex surfaces (171a,171b) formed onto clamshells (126a,126b) respectively, and also causing the joint member (126) to slidably move on the concave surfaces (169a,169b) formed into the clamshells (126a,126b) of the joint member (126) and on the spherical surface (170) formed onto front extension tube (127). When the desired hemispherical spatial orientation of the trimmer head body (125) and cutting section (53) attached thereto is achieved, with the release of the depressed release lever (140a or 140b) of the rear handle (142), disengaging the engaged release wire (322) and causing the resiliently restraining spring (327) to return the restraining cone (328) into its original restraining and securing position, as shown in FIG. 73, 82-84, and pressing the four control wires (132) securely into the grooves (303) of the clamshells (141a,141b) of the rear body (141), thereby securing the spatial orientation of the trimmer head body (125) and cutting section (53) attached thereto into the desired fixed position.

Thus there has been described three novel foliage trimmers that will hopefully alleviate the arduous and time consuming foliage trimming.

I claim:

1. A foliage trimmer comprising:
   a body with a rear handle integrally formed onto the trimmer body;
   a plurality of cutting units articulately juxtaposed and articulately connected to said trimmer body;
   said cutting units forming a cutting section with an adjustable curvature; said adjustable curvature having a flexible band means projecting through said trimmer body and projecting transversely through each of said plurality of cutting units; said flexible band secured to an outermost cutting unit of said plurality of cutting units and secured via a clamp to a handle mechanism means pivotally mounted to the trimmer body;
   said curvature of said cutting section being secured by a restraining mechanism means; said plurality of cutting units connected to each other and said trimmer body by a scissor type means;
   a bellows means situated between each of said plurality of cutting units, and a bellows means situated between said body and said first cutting unit of said plurality of cutting units; said plurality of cutting units each having a snap fit cover means attached thereon.

2. The foliage trimmer as set forth in claim 1, wherein each of said plurality of cutting units have a base formed by two stationary cutting blades;
   said plurality of cutting units each having a double edged cutting blade connected to said bases;
   a motor means output located in said trimmer body and operatively coupled to all of said plurality of cutting units;
   said double edged cutting blades being arcually reciprocated by a drive mechanism operatively coupled to all of said plurality of cutting units and to said motor means; said drive mechanism comprising of a pair of resiliently flexible cams on a rotatable camshaft, the camshaft having a male coupling and a female coupling connected via universal joint on each end of the rotatable camshaft.

3. The foliage trimmer as set forth in claim 1, wherein each of said plurality of cutting units have a base formed by four stationary cutting blades; said cutting units having a primary double edged cutting blade and a secondary double edged cutting blade, and a motor means output located in said body operatively coupled to all of said plurality of cutting units; said double edged cutting blades being arcually reciprocated by a drive mechanism operatively coupled to all of said plurality of cutting units and to said motor means; said drive mechanism comprising of a pair of resiliently flexible cams on a rotatable camshaft, the camshaft having a male coupling and a female coupling connected via a universal joint on each end of the rotatable camshaft; and said secondary double edged cutting blades further comprising a yoke means on the secondary cutting blades that transfers reciprocating force to the secondary double edged cutting blades.

4. The foliage trimmer as set forth in claim 1, wherein each of said plurality of cutting units have a base formed by two stationary cutting blades;
   said plurality of cutting units each having double edged cutting blades arcually reciprocated by electromagnets.

5. The foliage trimmer as set forth in claim 1, wherein each of said plurality of cutting units have a base formed by four stationary cutting blades;
   said plurality of cutting units each having a primary double edged cutting blade and a secondary double edged cutting blade arcually reciprocated by electromagnets.

6. A one hand foliage trimmer comprising:
   a plurality of cutting units articulately juxtaposed and articulately connected to each other, forming a cutting section with adjustable curvature;
   said plurality of cutting units each having a base formed by two stationary cutting blades; double edged cutting blades arcually reciprocated by electromagnets, a strap means for securing said plurality of cutting units to an operator's hand, and a bellows means situated between each of said plurality of cutting units.

7. An elongated foliage trimmer comprising:
   a plurality of cutting units articulately juxtaposed and articulately connected to a foliage trimmer head body;
   said plurality of cutting units forming a cutting section with an adjustable curvature adjustable by a flexible band means; said flexible band means projecting through said trimmer body and projecting transversely through each of said plurality of cutting units; said flexible band means secured to an outermost cutting unit of said plurality of cutting units and to a connecting member via an adjuster wire through a spring to a handle mechanism means pivotally mounted to foliage trimmer head body; said curvature of said cutting section secured by a restraining mechanism means; said plurality of cutting units connected to each other and to said foliage trimmer head body by a scissor type means; said trimmer head body and said cutting section's hemispherical spatial orientation adjustable and restrainable with the rear handle mechanism means; and a bellows means situated between each of said plurality of cutting units and a bellows means situated between said foliage trimmer head body and a first cutting unit of said plurality of cutting units; said plurality of cutting units each having a snap fit cover means attached thereon.

8. The foliage trimmer as set forth in claim 7, wherein each of said plurality of cutting units have a base formed by two stationary cutting blades;
   said plurality of cutting units each having a double edged cutting blade connected to said bases;
   a motor means output located in said foliage trimmer head body and operatively coupled to all of said plurality of cutting units;
   said double edged cutting blades being arcually reciprocated by a drive mechanism operatively coupled to all of said plurality of cutting units and to said motor means; said drive mechanism comprising of a pair of resiliently flexible cams on a rotatable camshaft, the camshaft having a male coupling and female coupling connected via a universal joint on each end of the rotatable camshaft.

9. The foliage trimmer as set forth in claim 7, wherein each of said plurality of cutting units have a base formed by four stationary cutting blades; said cutting units having a primary double edged cutting blade and a secondary double edged cutting blade, and a motor means output located in said foliage trimmer head body operatively coupled to all of said plurality of cutting units; said double edged cutting blades being arcually reciprocated by a drive mechanism operatively coupled to all of said plurality of cutting units and to said motor means; said drive mechanism comprising of a pair of resiliently flexible cams on a rotatable camshaft, the camshaft having a male coupling and a female coupling connected via universal joint on each end of the rotatable camshaft; and said secondary double edged cutting blades further comprising a yoke means on the secondary cutting blades that transfers reciprocating force to the secondary double edged cutting blades.

10. The foliage trimmer as set forth in claim 7, wherein each of said plurality of cutting units have a base formed by two stationary cutting blades;
   said plurality of cutting units each having double edged cutting blades arcually reciprocated by electromagnets.

11. The foliage trimmer as set forth in claim 7, wherein each of said plurality of cutting units have a base formed by four stationary cutting blades;
   said plurality of cutting units each having a primary double edged cutting blade and a secondary double edged cutting blade arcually reciprocated by electromagnets.

\* \* \* \* \*